United States Patent [19]
Sakai

[11] Patent Number: 5,486,018
[45] Date of Patent: Jan. 23, 1996

[54] SUSPENSION SYSTEM FOR FOUR-WHEELED VEHICLES

[75] Inventor: Koji Sakai, Iwata, Japan

[73] Assignee: Yamaha Hatsudoki Kabushiki Kaisha, Iwata, Japan

[21] Appl. No.: 342,248

[22] Filed: Nov. 18, 1994

[30] Foreign Application Priority Data

Aug. 5, 1994 [JP] Japan ................................. 6-184756
Sep. 16, 1994 [JP] Japan ................................. 6-221526

[51] Int. Cl.$^6$ .................................................. B60G 11/26
[52] U.S. Cl. ........................................ 280/714; 280/704
[58] Field of Search .................................... 280/714, 709, 280/698

[56] References Cited

U.S. PATENT DOCUMENTS 5,082,308  1/1992  Jones ....................................... 280/714
5,085,460  2/1992  Takahashi .............................. 280/714
5,098,119  3/1992  Williams et al. ...................... 280/714
5,149,131  9/1992  Sugasawa et al. .................... 280/714
5,269,556 12/1993  Heyring ................................. 280/714

*Primary Examiner*—Kenneth R. Rice
*Attorney, Agent, or Firm*—Knobbe, Martens, Olson & Bear

[57] ABSTRACT

A number of embodiments of suspension systems for vehicles having at least two and, in all illustrated embodiments, four wheels, each of which is independently suspended by a respective shock absorber. The shock absorbers are generally conventional in nature but are interconnected by a system that includes an accumulator and a flow control so as to provide a damping for vehicle characteristics that is independent of the individual damping of each wheel's shock absorber. A wide variety of accumulator structures and flow controls for achieving these purposes are disclosed, as are a number of ways in which various wheels of the vehicle can have their shock absorbers interconnected.

112 Claims, 51 Drawing Sheets

SUSPENSION SYSTEM FOR FOUR-WHEELED VEHICLES

BACKGROUND OF THE INVENTION

This invention relates to a suspension system for suspending a pair of wheels of a vehicle and more particularly to an improved four-wheel suspension system for vehicles.

In a vehicle there are certain advantages in providing independent suspension systems for each of the wheels of the vehicles. With such an arrangement each vehicle wheel is suspended for suspension travel relative to the vehicle body independently of the other. Normally the suspension system includes a spring and a hydraulic damping arrangement. The hydraulic damping arrangement generally includes a cylinder in which a piston is supported and which defines at least one fluid chamber. The cylinder is connected to either the vehicle wheel or the vehicle body. The piston is connected to the other element through a piston rod that extends through one end of the cylinder. An arrangement is provided wherein fluid is displaced from the chamber or chambers upon the relative movement. The rate of fluid displacement is controlled by an orifice and/or check valve-type system for damping the suspension travel.

Although independent suspension systems are desirable, there are instances when it is desirable to interrelate the suspension system of one wheel with that of another. For example, by providing a restricted flow between the wheel or wheels on one side of the vehicle suspension system with those wheels on the other side, it is possible to reduce the leaning of the vehicle when rounding a curve. By providing a front to rear interconnection, pitching or rocking of the vehicle when traveling over undulating surfaces can be controlled.

Generally, it has been the practice to interconnect the suspension units between a pair of wheels by means of interconnecting conduits in which damping mechanisms such as orifices or the like are provided. In addition, the individual unit for each wheel also has a damping arrangement, as aforenoted.

With the type of damping arrangements having the interconnected conduits from one suspension unit to the other, there are a number of disadvantages. In the first instance, the previously proposed systems have required a plurality of separate conduits each interconnecting various parts of the system with the others and each containing its own damping system. As a result, the hydraulic assemblage tends to become complicated.

In addition to this, where there are damping arrangements both in the individual suspension units and in the interconnection between the units, the previous type systems have had a degree of interdependence which adversely affects the type of damping for each mode. For example, when one of the wheels encounters a force, then there is not only the internal damping of each unit which controls the movement. The damping of the interconnecting conduits also affects the amount of actual damping. This makes suspension tuning difficult.

It is, therefore, a principal object of this invention to provide an improved suspension arrangement for two independently suspended wheels of a vehicle with an interconnection to achieve certain types of ride control and wherein the individual damping and the interrelative damping can be tuned and controlled separately.

It is a further object of this invention to provide an improved interconnected suspension arrangement for two wheels of a vehicle wherein the individual damping of each wheel is controlled independently of and separately from the wheel-to-wheel relationship.

One way in which this independent damping control may be obtained is to provide a pair of accumulator or pressure adjusting cylinders, each of which contains a piston and a gas under pressure that acts on the piston in opposition to a fluid chamber which is interconnected with a corresponding fluid chamber of the respective suspension unit. Flow is permitted between the two chambers of the interconnected suspension components only in response to certain types of movement and this flow is controlled by a separate flow control arrangement. This is achieved by coupling the two pistons of the accumulator or pressure adjusting chambers with each other so that they must move simultaneously. By utilizing such an arrangement, the damping characteristics of each suspension unit will be controlled only by its own damping characteristics under certain types of motion. Other types of motion are controlled only by a flow interconnection between the two units and this other control is independent of the internal damping of the individual units.

It is, therefore, a still further object of this invention to provide an improved accumulator or pressure adjusting arrangement for interposition between a pair of independent suspension units of a vehicle.

As has been noted, this type of interconnection using the pressure accumulator or pressure adjusting cylinder requires the pistons of the individual chambers to be affixed to each other. This requires some kind of separate mechanical connection, with conventional types of arrangements, which can be subjected to binding and which complicates the overall accumulator pressure adjusting arrangement.

It is, therefore, a still further object of this invention to provide an improved and compact accumulator pressure adjusting arrangement having a pair of pistons wherein the pistons are integrally formed with each other so as to avoid the use of separate interconnecting mechanisms.

SUMMARY OF THE INVENTION

A first feature of this invention is adapted to be embodied in a suspension system for a vehicle having at least two wheels each supported for suspension movement by the body of the vehicle. A first damping element having a pair of relatively moveable members defining a first fluid chamber is interposed between one of the wheels and the vehicle body for varying the volume of the first fluid chamber upon suspension movement of the one wheel. A first damping means is provided for damping the flow of fluid upon variations in the volume of the first fluid chamber. A second damping element having a pair of relatively moveable members for defining a second fluid chamber is interposed between another of the wheels and the vehicle body for varying the volume of the second fluid chamber upon suspension movement of the other wheel. A second damping means dampens the flow of fluid upon variation in the volume of the second fluid chamber upon such suspension movement. A conduit interconnects the first and second fluid chambers and control means are provided in the conduit for precluding fluid flow through the conduit in response to a first suspension condition and for providing a damped flow through the conduit in response to a second suspension condition.

An accumulator arrangement embodying this invention is also adapted to be employed in a hydraulic suspension system that is comprised of at least two separate hydraulic units. Each hydraulic unit defines at least one fluid chamber and is connected between a respective wheel of the vehicle and a vehicle body for varying the volume of its fluid chamber upon suspension movement of the respective wheel. The accumulator comprises means defining first and second fluid chambers, each adapted to be in fluid communication with a respective one of the hydraulic unit fluid chambers. First and second pistons are supported within the first and second fluid chambers, respectively, of the accumulators. The pistons are biased by a gas under pressure to maintain the first and second fluid chambers in a pressurized state. Means are provided for affixing the first and second pistons of the fluid accumulators for synchronous movement with each other so that the volumes of the first and second fluid chambers of the accumulator are always the same.

Another feature of the invention is adapted to be embodied in an accumulator as defined in the preceding paragraph. In accordance with this feature, the first and second pistons are formed integrally with each other with the first piston being a cylindrical piston and the second piston being an annular piston formed around the outer periphery of the cylindrical piston.

DETAILED DESCRIPTION OF THE PREFERRED EMBODIMENTS OF THE INVENTION

Figure 1:
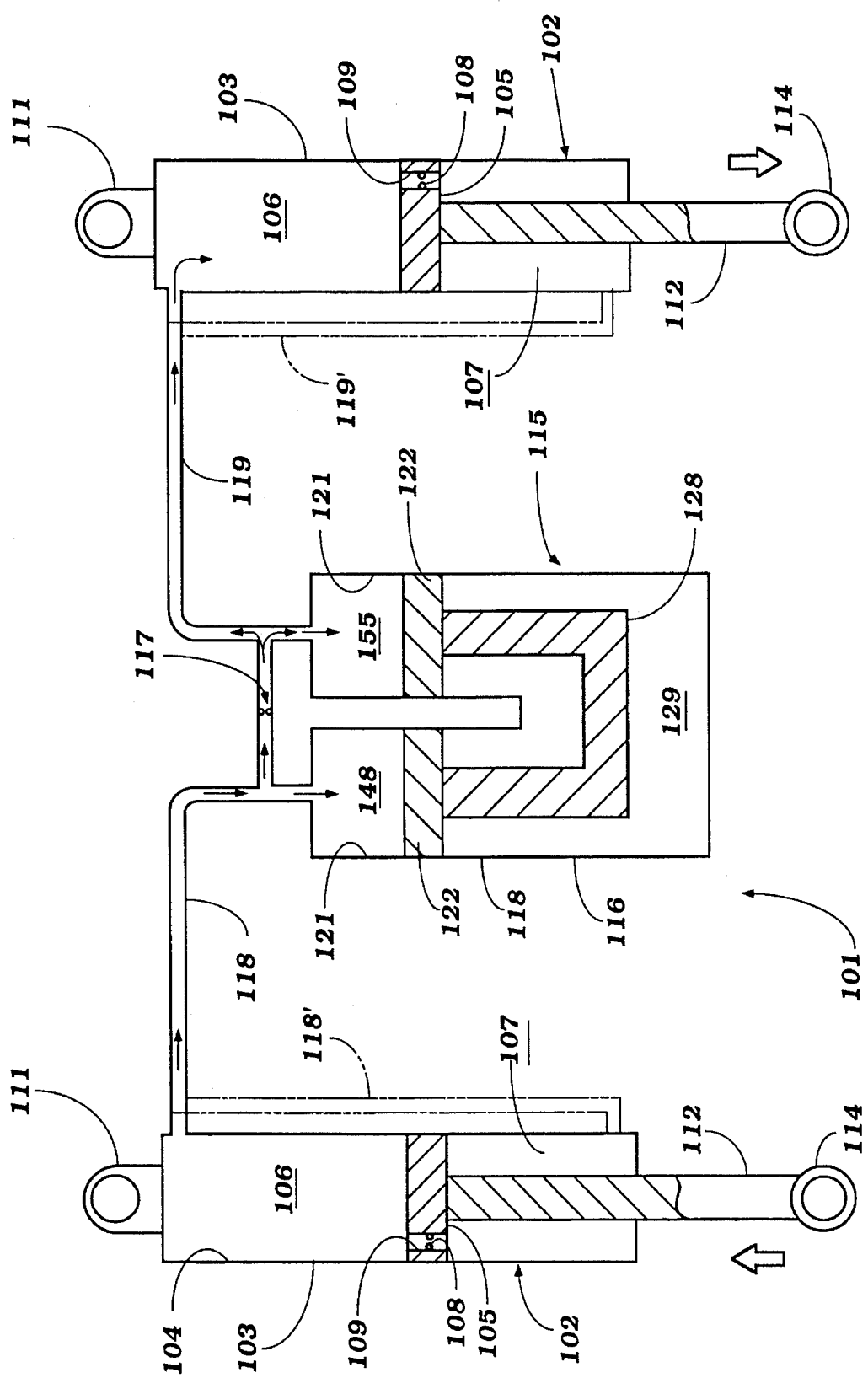
FIG. 1 is a partially schematic cross-sectional view of a vehicle suspension system constructed in accordance with a first embodiment of the invention.
Figure 2:
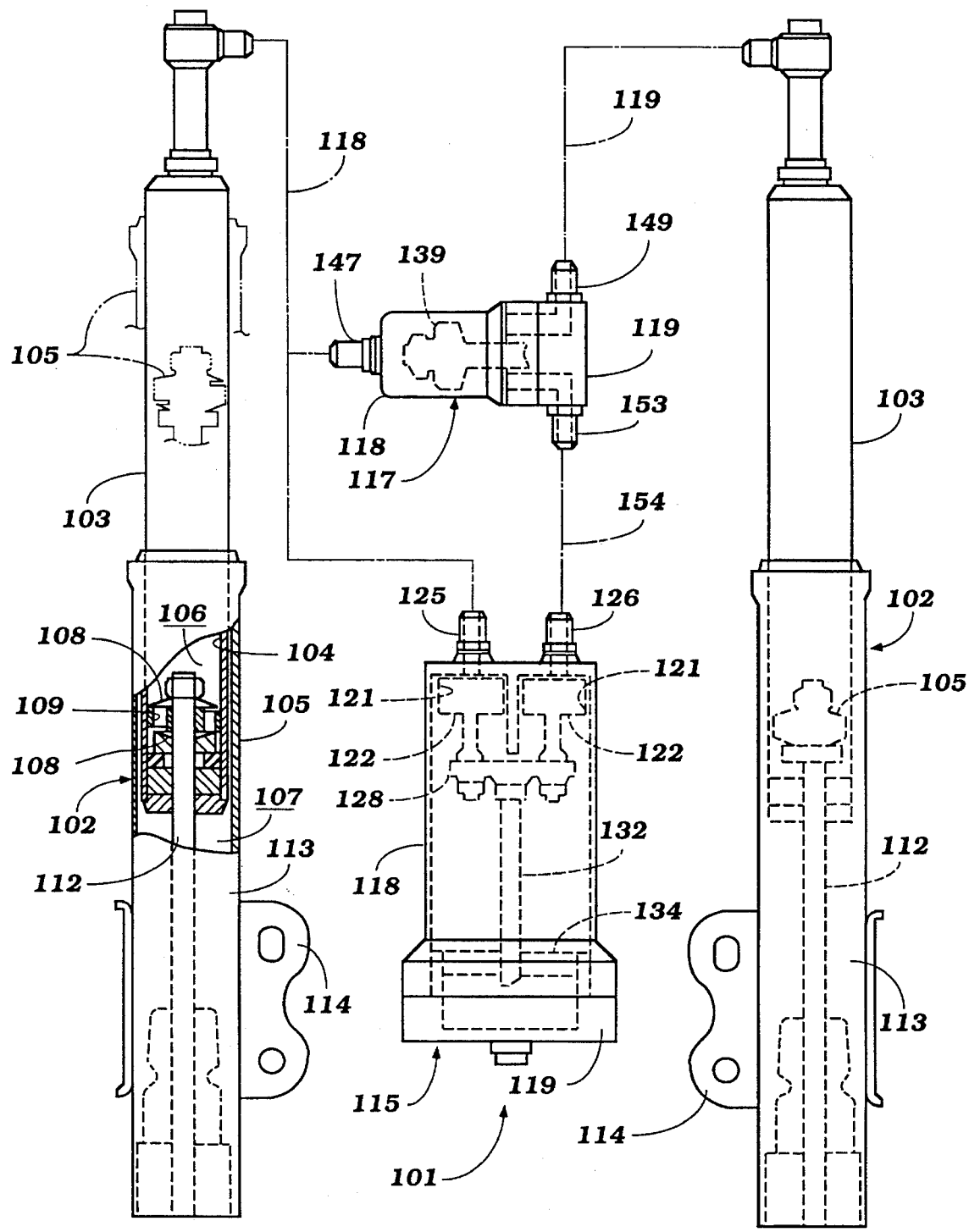
FIG. 2 is a view in part similar to FIG. 1 but shows the components of the suspension system in their actual construction rather than schematically.
Figure 3:
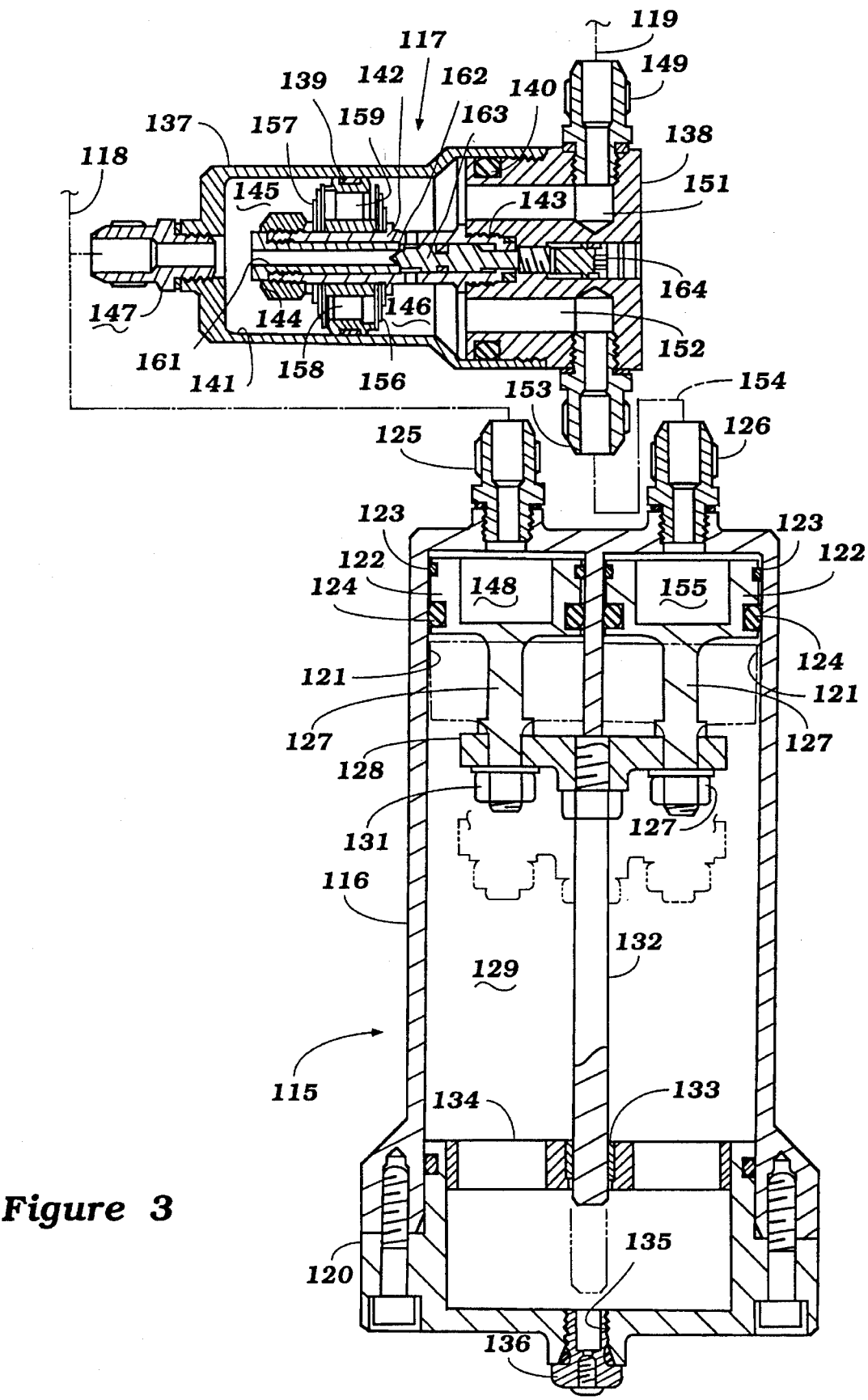
FIG. 3 is an enlarged cross-sectional view taken through the pressure adjusting arrangement in accordance with this embodiment of the invention.

Embodiment of FIGS. 1–3

Referring now in detail to the drawings and first to the embodiment of FIGS. 1–3, a vehicle suspension system constructed in accordance with this embodiment is identified generally by the reference numeral 101. In this embodiment, the suspension unit 101 is associated with a pair of wheels (not shown) of a vehicle and each of which wheels is independently suspended. The suspension system for suspending the wheels from the vehicle body may be of any known type, but it includes a pair of shock absorbers, each indicated generally by the reference numeral 102, each of which is interposed between a respective wheel and the vehicle body. The wheels with which the shock absorbers 102 are associated may either be the front wheels, the rear wheels, a pair of wheels at each side of the vehicle, or other arrangements, as will be described.

The shock absorbers 102 are shown schematically in FIG. 1, but are depicted in more detail in FIG. 2. Generally, conventional-type shock absorbers 102 may be employed, and these include a cylinder 103 that defines a cylinder bore 104 in which a piston, indicated generally by the reference numeral 105, is slidably supported. The piston 105 divides the cylinder bore 104 into an upper chamber 106 and a lower chamber 107. A shock absorbing arrangement, indicated generally by the reference numeral 108, controls the flow through passages 109 formed in the piston 105 for damping the flow between the chambers 106 and 107.

The cylinder 103 is provided with a mounting arrangement, shown schematically in FIG. 1 and indicated generally by the reference numeral 111, that is adapted to be affixed to the vehicle frame or body in a known manner. The piston 105 has connected to it a piston rod 112 which, in the actual physical construction as shown in FIG. 2, is connected to a tubular member 113 which, in turn, has a bracket 114 for attachment to the wheel through its suspension system. The piston rod 112 extends through the chamber 107, and thus displaces a portion of the volume in this chamber.

The damping arrangement 108 for controlling the flow through the passages 109 is shown in more detail in FIG. 2 and comprises a pair of oppositely acting check valves which communicate with respective passages 109. One check valve controls the flow from the chamber 107 to the chamber 106, while the other of the check valve controls the flow from the chamber 106 to the chamber 107. If desired, the pressures at which the check valves open can be varied. In addition to the check valve passages or in lieu of them, fixed or variable orifice passages may also be provided in the shock absorber arrangement 108 and such an embodiment will be disclosed later. Actually, the internal damping system of the shock absorbers 102 may be of any known either fixed or selectively variable type, and in describing some of the other embodiments, other types of shock absorber constructions will be described.

FIG. 2 shows the shock absorbers in their fully extended position in solid lines, and the left-hand side shows the fully compressed state of the shock absorber 102. As may be seen, the cylinder 113 telescopes over the cylinder 112 as the piston 105 moves upwardly.

In accordance with the invention, the shock absorbers 102 are constructed and operate in such a way that when each wheel with which the shock absorber 102 meets an obstacle or obstruction, the wheel can move with its movement being controlled by the shock absorber 102 and independently of the action at the other wheels. However, an arrangement is provided for interrelating the pairs of shock absorbers 102 and providing this interrelationship in such a way that the shock absorbers 102 still operate independently on individual loading of individual wheels but are interrelated with each other in such a way so as to dampen or resist other types of characteristics. Examples of such vehicle control are as to control leaning when rounding a curve, when the wheels with which the shock absorbers 102 are associated are either pairs of front or pairs of rear wheels. Another vehicle control is to reduce pitching when the shock absorbers 102 are associated with pairs of wheels on the same side of the vehicle such as a front and rear wheel. However, this type of vehicle damping is achieved without effecting the individual damping arrangements 108 of the shock absorbers 102. Said another way, this wheel-to-wheel damping is done independently of the characteristics of the individual shock absorbers 102.

This is accomplished by means of a pressure balance accumulator arrangement, indicated generally by the reference numeral 115. Basically, the pressure balance accumulator arrangement is comprised of an accumulator and a flow control 117 which communicates with chambers of the shock absorbers 102. In the embodiment of FIGS. 1–3, the chambers interconnected are the chambers 106, and this is done by means of a pair of passages 118 and 119 that extend from the individual shock absorbers 102, and specifically their chambers 106, to the pressure balance accumulator 115.

Referring again to the operation of the individual shock absorbers 102 and considering the situation when a force is applied, causing the piston 105 to move upwardly in the cylinder bore 103, as shown in the unit at the left-hand side of FIG. 1, fluid will flow through the passages 109 at a rate dependent upon the shock absorbing elements 108. However, because of the presence of the piston rod 112 in the chamber 107, more fluid is displaced from the chamber 106 than can be accommodated in the chamber 107. Conventional shock absorbers employ an accumulator mechanism for accumulating this excess fluid and returning it on reverse movement. Normally, these accumulators are independent of each other. However, as will become apparent, the accumulator mechanism 115 employed in conjunction with this embodiment provides a degree of interdependence between the shock absorbers 102 that are connected by the pressure compensating accumulator system 115. In this way it is possible to have the interrelationship controlled by the unit 115 while the individual wheel damping is independent of this arrangement.

This construction will now be described by particular reference to FIGS. 2 and 3, with the mechanism being shown in most detail in FIG. 3. In this embodiment, the accumulator is formed as a separate unit and is comprised of a generally tubular outer housing 116 that is closed at its lower end by a closure plug 120. The upper end of the housing 116 is formed with a pair of parallel cylinder bores 121 in which accumulator pistons 122 are slidably supported. The accumulator pistons 122 include piston rings 123 and O-rings 124 for providing a fluid-tight seal with the cylinder bores 121. The area in the cylinder bores 121 above the accumulator pistons 122 is charged with a hydraulic fluid in a known manner, and the passageways 118 and 119 from the shock absorbers 102 are connected to these accumulator chambers through fittings 125 and 126, respectively. The pressure balance control valve 117 is interposed between these accumulator chambers in a manner which will be described.

In accordance with an important feature of the invention, the pistons 122 are interconnected for simultaneous movement. This interconnection is provided by having each piston 122 formed with an integral piston rod portion 127 which extends through an interconnecting plate 128 positioned in an accumulator chamber 129 formed below the pistons 122. The piston rods 127 are affixed to the connecting member 128 by means of nuts 131 that are threaded onto tapped ends of the piston rods 127 so as to rigidly connect the pistons 122 to each other for simultaneous movement.

In order to maintain parallel and smooth movement of the pistons 122, a connecting rod 132 has a threaded connection at its upper end to the connecting member 129. The lower end of the rod 132 is slidably supported in a guide bushing 133 formed by a member 134 that is affixed to the closure plug 120 but which is open so as to permit the flow of gas under pressure to the chamber 129.

The chamber 129 is charged with pressure through a fill orifice 135 in a manner which will be described later by reference to another embodiment. A closure plug 136 normally closes this fill opening 135. A suitable inert gas such as nitrogen is charged into the chamber 129 so as to permit the accumulator to function in a well-known manner. However, and as has been noted, since the pistons 122 are interconnected with each other, they will control the balance of pressure in the chambers 106 of the interconnected shock absorbers in a manner which will be described.

The flow control 117 which controls the flow between the chambers 106 of the interconnected shock absorbers 102 will now be described also be reference to FIG. 3 wherein this construction is shown in most detail.

The flow control 117 is comprised of an outer housing that consists of a main housing member 137 and which is closed at one end by a closure plug 138. A piston 139 is contained within a cylinder bore 141 formed by the housing member 137, but is held in place therein. To this end, the piston 139 is received on a post 142 that has a threaded connection 143 to the closure member 138. The piston 139 is held in position on the post 142 by means of a nut 144. As a result, the piston 139 divides the cylinder bore 141 into a first chamber 145 and a second chamber 146.

The first chamber 145 communicates with the chamber 106 of the left-hand shock absorber 102, as shown in FIGS. 1 and 2, via the conduit 118. The conduit 118 cooperates with a fitting 147 that is provided in the housing member 137 and which communicates with the chamber 145. In addition, the conduit 118 is threaded onto the fitting 125 so as to provide fluid flow to a chamber 148 formed by the piston 122 and cylinder bore 121.

The conduit 119 from the right-hand shock absorber 102 in this embodiment is connected to the chamber 146. This is accomplished by means of a first fitting 149 formed in the enclosure 138 and which communicates with a first passage 151 formed therein which communicates the fitting 149 with the chamber 146. A second passage 152 extends from the chamber 146 into the closure 138 and communicates with a second fitting 153 which is connected to the fitting 126 by a conduit 154. This permits fluid to flow to and from the accumulator chamber 155 formed above the remaining piston 122 of the accumulator assembly.

The damping for the vehicle characteristics is controlled, as has been noted, by the flow control device 117, which in essence controls the rate and amount of flow that can exist between the chambers 106 of the interconnected shock absorbers 102. In this embodiment, this control 117 includes a pair of oppositely acting check valves 156 and 157 which control the flow through respective passages 158 and 159 formed in the piston 139. The check valve 156 controls the flow from the chamber 145 to the chamber 146, while the check valve 157 controls the flow in the reverse direction.

In addition to this pressure responsive damping, there is provided a restricted flow path that is constantly open between the chambers 145 and 146. This is formed by a bypass passageway 161 formed within the post 142 that defines a seat 162. A needle valve 163 is slidably supported within the post 142 and has its position controlled by an adjustable stop 164 that is accessible at the end of the closure plug 139. Hence, the adjustment of this orifice and the pressure at which the check valves 156 and 157 open will control the damping characteristics for flow between the shock absorbers 102.

As has been previously noted, the individual shock absorbers 102 generally exhibit normal damping characteristics by their own internal valving when each strikes a respective obstacle. However, the wheel-to-wheel control is provided when the vehicle places a certain type of loading on the shock absorbers, and FIG. 1 shows a condition where one shock absorber, the left one, is under compression and the other shock absorber, the right one, is under expansion. This condition may exist when rounding a curve, for example, when turning right, wherein the offhand shock absorber will experience a compressive load while the inboard shock absorber will experience a tensile load. It is under this condition that the accumulator and flow control 117 which make up the pressure controlling accumulator structure 115 will function to control the amount of body lean.

Under this condition, the piston 105 of the left-hand shock absorber will move upwardly and compress the fluid in the chamber 106. As has been previously noted, some flow occurs through the passage 109 and flow restriction 108 to the chamber 107. However, more fluid is displaced from the chamber 105 than can be accommodated in the chamber 107 because of the presence of the piston rod 117 in this lower chamber. This fluid is displaced through the passage 118, as shown by the arrows in FIG. 1.

At the same time, on the other hand, the piston 105 of the right-hand shock absorber 102 will want to move downwardly, and fluid will be displaced from the chamber 107 through the flow control 108 to the chamber 106. However, more fluid is required to make up the volume of the chamber 106 than will be displaced from the chamber 107, again because of the presence of the piston 112 in the chamber 107. This fluid will normally be made up from the accumulator in conventional shock absorbers.

With this construction, however, fluid is being displaced from the chamber 106 of the left-hand shock absorber 112, which causes its associated piston 122 to move downwardly and increase the volume of the accumulator chamber 148. However, the piston 122 associated with the accumulator chamber 115 needs to move upwardly to displace fluid from this chamber into the chamber 106 of the right-hand shock absorber 102 to accommodate the downward movement of the piston 105. Since the pistons 122 are interconnected by the interconnecting member 128, they must move together, and in this instance they will both tend to move downwardly. The difference in flow must therefore pass through the flow restriction 117 provided by the orifice determined by the needle valve 163 and its seat 162 and the opening pressure of the check valve 156. As a result, this damping mechanism provided by the flow control 117 will control the resistance to lean of the vehicle body in this embodiment. Thus, it should be apparent that each wheel is able to absorb its own independent shocks due to road conditions while the wheel-to-wheel connection is controlled by the pressure compensating accumulator device 115.

In the embodiment as thus far described, the chambers 106 of the two interconnected shock absorbers have been communicated with each other through the pressure compensating accumulator 115. However, the chambers 107 could be so connected, and such alternate connections are indicated at 118' and 119'. Also, both sets of chambers can be interconnected, or cross connections may be made. That is, the chamber 106 of one shock absorber can be communicated with the chamber 107 of the other shock absorber, depending upon the results which are desired to be obtained.

From the foregoing description, it should be readily apparent that in order to obtain the desired vehicle damping characteristics independent of the individual wheel damping characteristics, it is necessary that the volume of fluid displaced to the accumulator chamber associated with each chamber of the shock absorber must be the same for a given movement of the piston of the shock absorber relative to its cylinder. Thus, the pistons 122 must have the same effective area, and the pistons 122 must be connected to move together by the connecting member 128, as in this embodiment.

Figure 4:
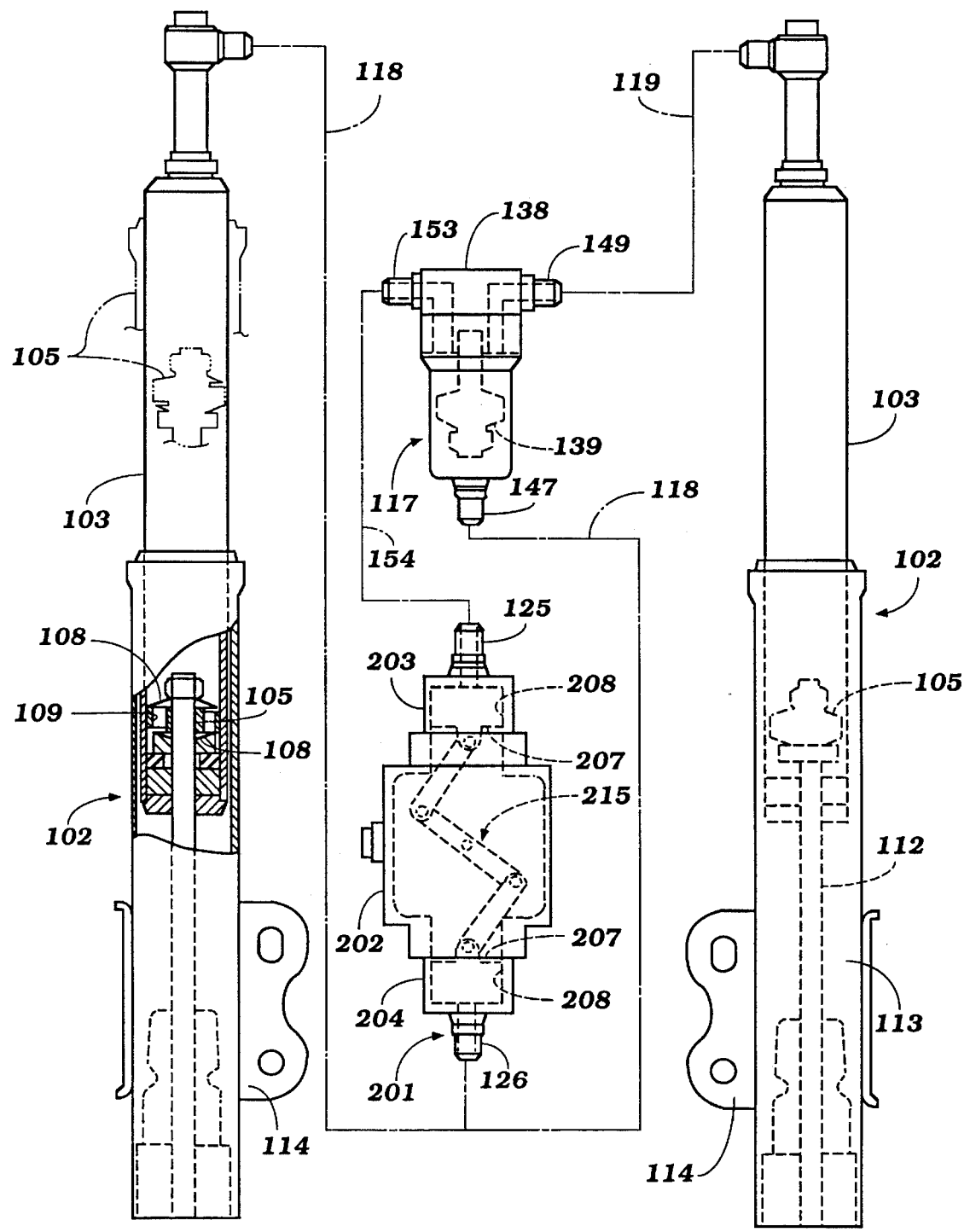
FIG. 4 is a side elevational view, in part similar to FIG. 2, with portions broken away, of another embodiment of the pressure adjusting unit of the invention.
Figure 5:
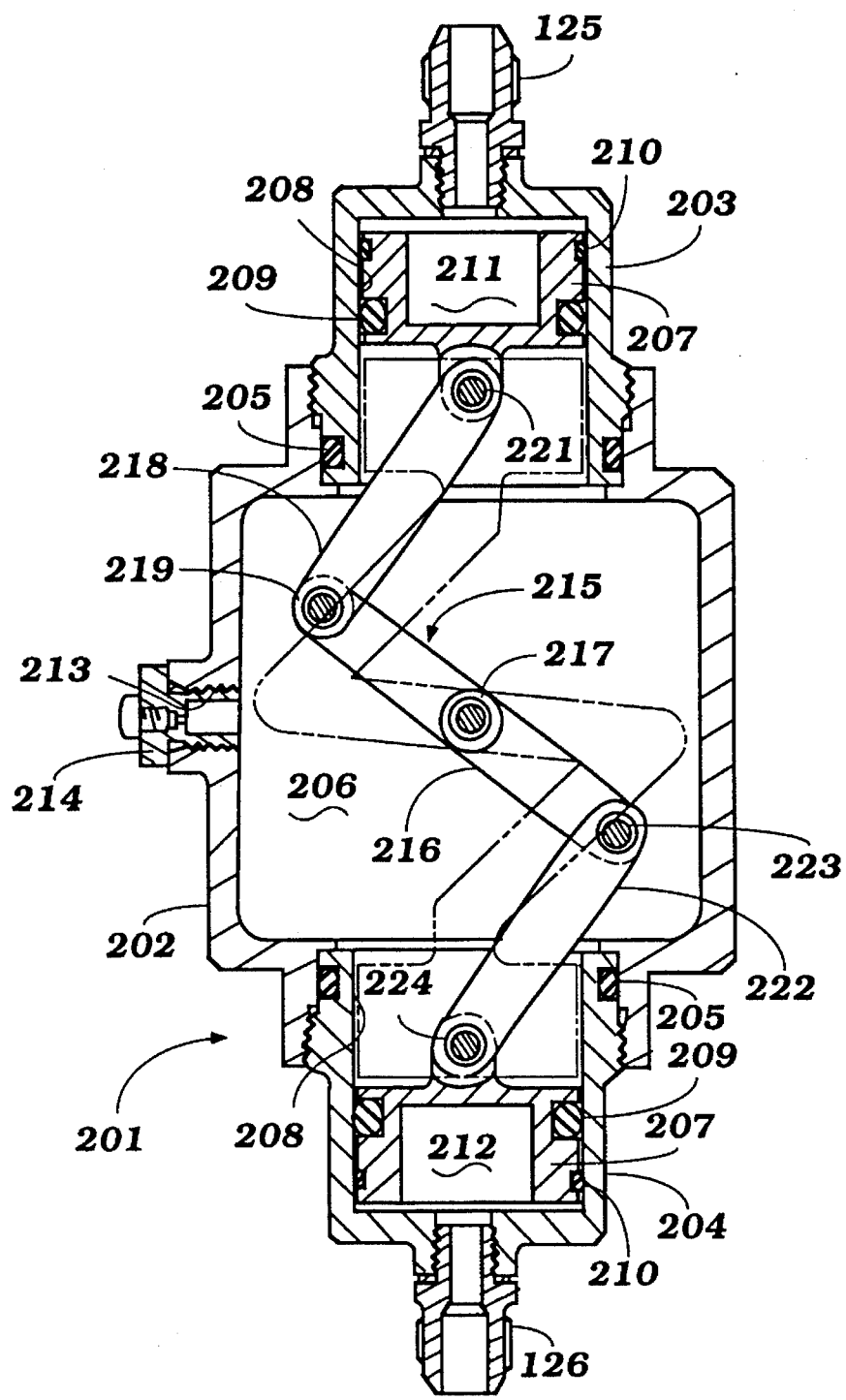
FIG. 5 is an enlarged cross-sectional view showing how the pressure adjusting pistons of this embodiment are interconnected to each other for simultaneous movement.

Embodiment of FIGS. 4 and 5

Other types of accumulator chambers can be employed that achieve the same result, and FIGS. 4 and 5 show another type of accumulator chamber that achieves this result, and in this embodiment the accumulator device is indicated generally by the reference numeral 201. The unit is shown in a complete system in FIG. 4, and since the basic shock absorbers and interconnecting passageways are the same or substantially the same, these have been identified by the same reference numerals and will be described again only insofar as is necessary to understand the construction and operation of this embodiment.

In this embodiment, the accumulator device 201 is comprised of an outer housing 202 having oppositely open ends which are closed by means of respective closure plugs 203 and 204. These closure plugs carry O-ring seals 205 that provide a sealing engagement with the main housing 202 and which define an accumulator pressure chamber 206 that is formed between pistons 207 that are slidably supported in cylinder bores 208 formed in the end closures 203 and 204. The pistons 207 carry O-ring seals and piston rings 209 so as to provide a seal for the pressure chamber 206 and hydraulic chambers 211 and 212 formed by the pistons 207 and their closure plugs 203 and 204, respectively. The fittings 125 and 126 go into the end closures 203 and 204, respectively, and are connected to their respective shock absorbers 102 and the pressure control 117 in the manner previously described.

The inert gas, such as nitrogen, is charged into the chamber 206 through a fitting 213, which is normally closed by a closure plug 214.

In order to ensure that the pistons 211 and 212 move at the same time and in opposite directions, an interconnecting three-bar linkage, indicated generally by the reference numeral 215, is provided. This linkage is contained within the gas pressure chamber 206. This linkage 215 is comprised of a first link 216 that is pivotally supported by the housing 202 on a pivot pin 217 which spans the housing 202. One end of the link 215 is connected to the piston 207 that defines the fluid chamber 211 by a second link 218. One end of the second link 218 is connected to the link 216 by means of a pivot pin 219. The other end is connected to the piston 207 by a pivot pin 221.

In a like manner, the other end of the link 216 is connected to the piston 207 that defines the fluid chamber 212 by a third link 222. To this end, the link 222 is connected to the other end of the link 216 by a pivot pin 223. The opposite end of the link 222 is connected to the piston 207 by a pivot pin 224. As a result of this construction, when one piston 207 associated with its respective chamber 211 or 212 is displaced in one direction to cause either a decrease or increase in the volume of its respective chamber, the other piston must move in an opposite sense so that the same amount of fluid will be displaced either to or from both chambers 211 and 212. Thus, the cylinder bores 208 of the end closures 203 and 204, respectively, have the same diameter.

It should be readily apparent from the foregoing description that the construction is such that the wheels associated with the respective shock absorbers both encounter the same load at the same time, they will operate in a conventional manner, with the damping being controlled solely by the internal damping unit 108 of the individual shock absorber 102. However, where different loadings are accomplished or when the tendency is to move in the opposite directions (one wheel going up and the other wheel going down), then the damping will be controlled by the damping arrangement 117 independently of that of the individual shock absorbers 102.

Vehicle Applications (FIGS. 6–13)

Various ways in which this can be utilized in conjunction with the wheels of a four-wheeled vehicle will be described by reference to FIGS. 6–13. Each of these figures shows schematically four shock absorbers 102, each associated with a respective wheel at the front and rear and left and right sides of the vehicle, as indicated by the appropriate legends in these figures. It should be understood that these arrangements may be employed with not only the embodiments thus far described (FIGS. 1–3 and FIGS. 4 and 5), but also with the embodiments which will be described later.

Figure 6:
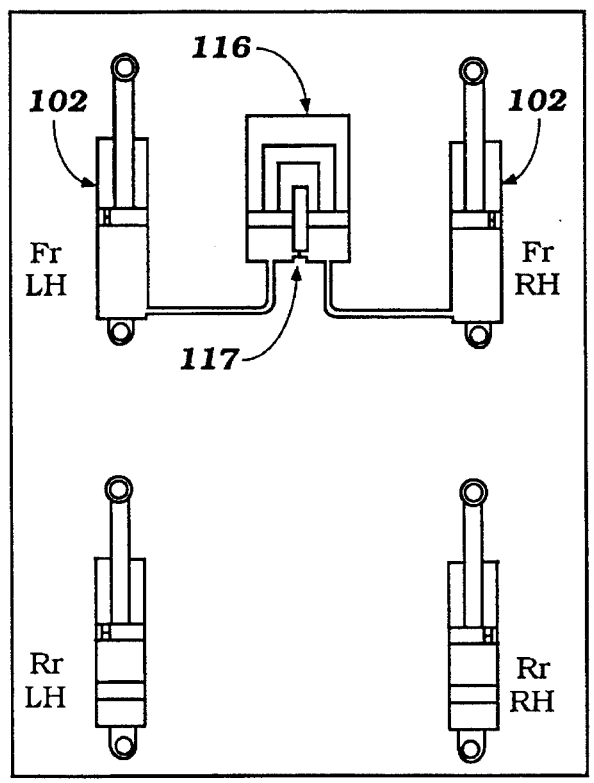
FIGS. 6–13 are schematic views showing different ways how the invention may be applied to a four-wheel vehicle.

FIG. 6 is a connection of the type which has been described wherein the interconnected shock absorbers are associated with the front wheels of a four-wheel vehicle. This arrangement controls leaning when cornering. That is, it provides suspension control in response to turning of the vehicle rather than striking of bumps.

Figure 7:
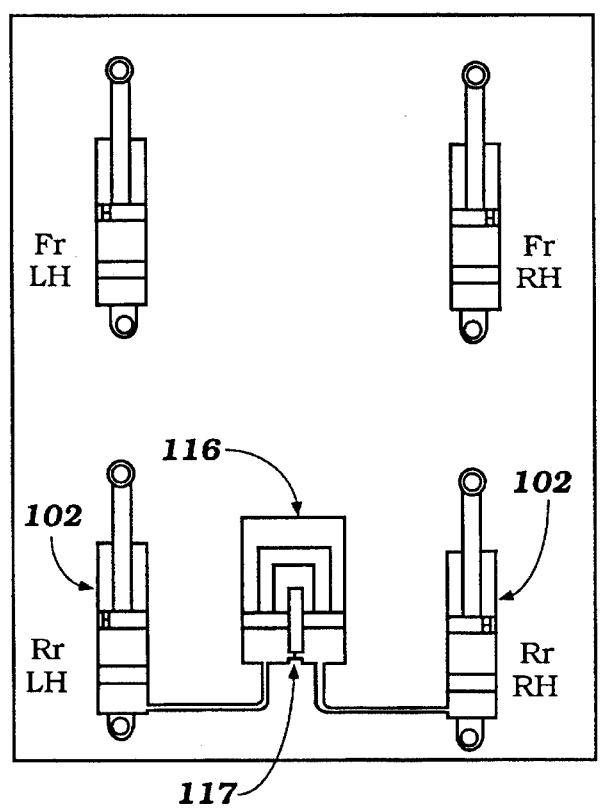
Figure 8:
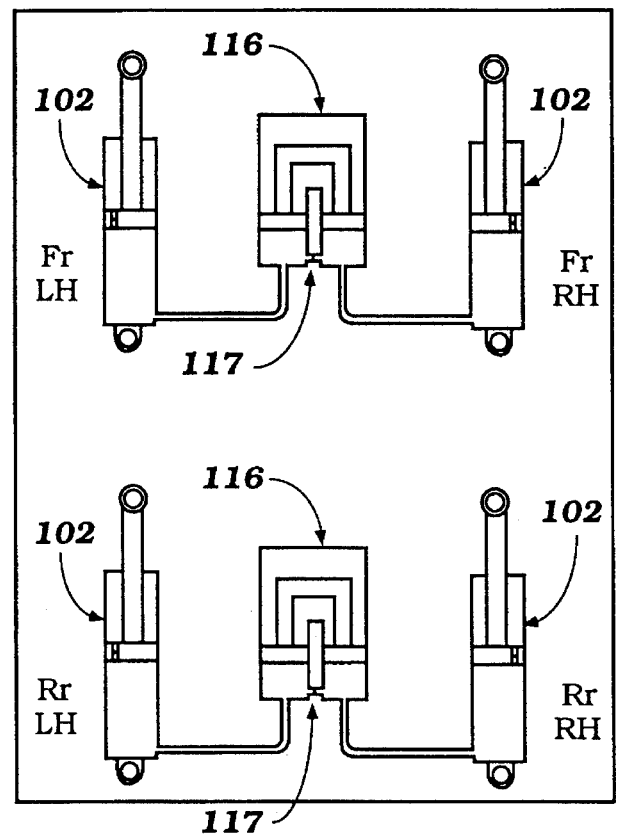

FIG. 7 shows an arrangement wherein there is a similar connection between the rear wheels, and FIG. 8 shows an arrangement wherein both the front and rear wheels are connected, but through different pressure compensating accumulator arrangements.

Figure 9:
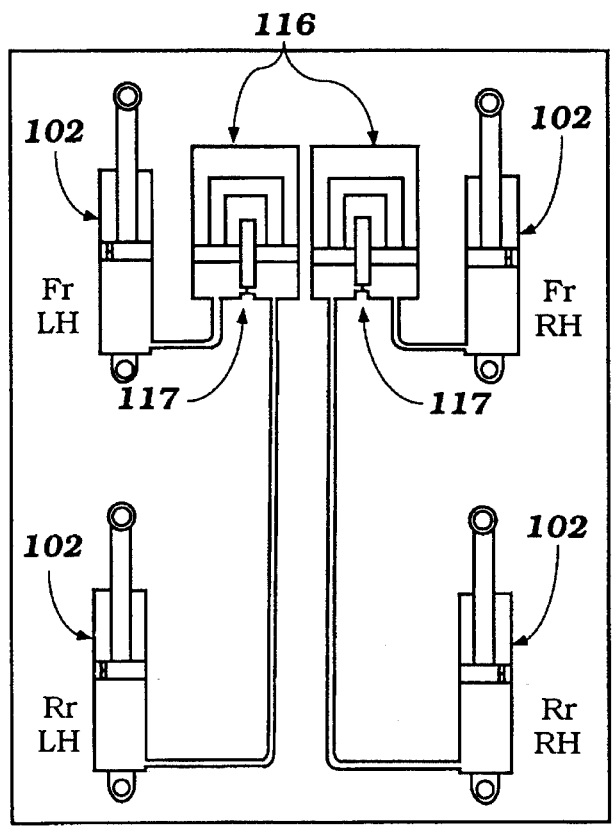

FIG. 9 shows an arrangement wherein the shock absorbers at each side of the vehicle are interconnected through respective pressure compensating accumulator arrangements, there being one at each side. This type of arrangement reduces the likelihood of pitching of the vehicle body when traveling over an undulating surface.

Figure 10:
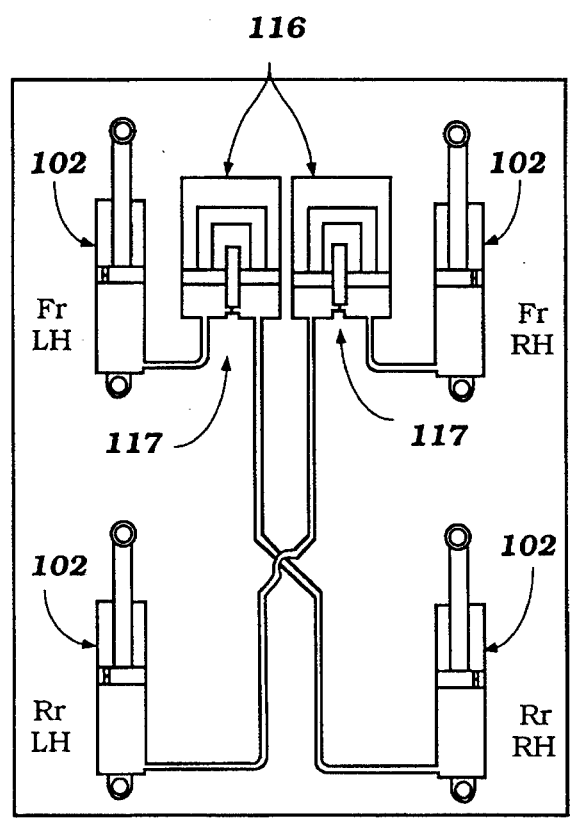

FIG. 10 is an embodiment which shows an arrangement wherein the cross corner wheels of the vehicle are interconnected by the pressure compensation accumulator arrangements. That is, the left front and right rear shock absorbers 102 are connected through a pressure compensating accumulator, and the left front, right rear shock absorbers are connected. This type of arrangement is effective for restraining pitching and rolling and also restrains vehicle body movement from a combination of pitching and rolling.

Figure 11:
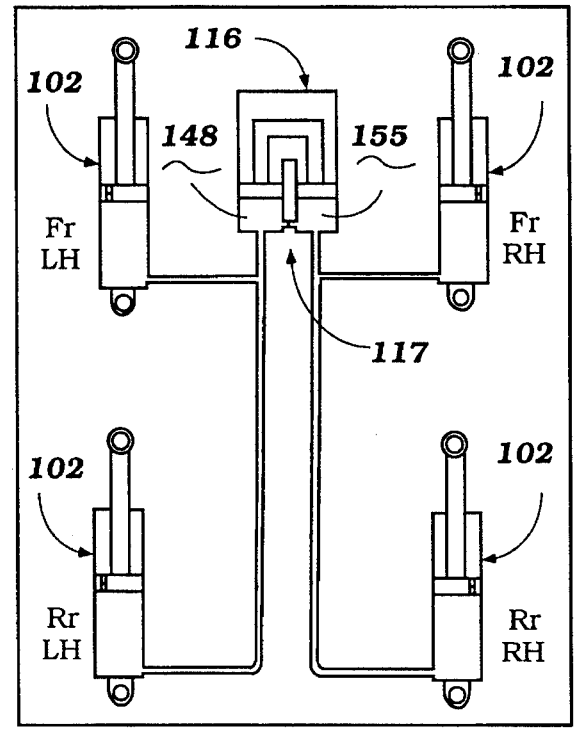

FIG. 11 shows an embodiment wherein one pressure compensating accumulator arrangement is employed interconnecting all four wheels of the vehicle. In this illustrated embodiment, the left-hand wheels are connected to one accumulator chamber 148, while the shock absorbers associated with the right-hand wheels are connected with the other accumulator chamber 155. This has the effect of reducing the likelihood of body lean or rolling when rounding curves. This system is also effective to improve damping when only a single wheel encounters an obstruction in the road.

Figure 12:
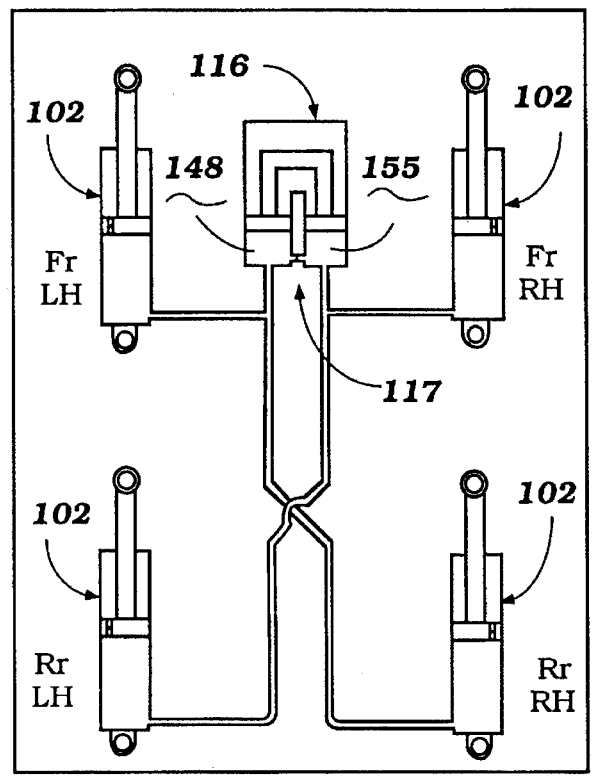

FIG. 12 shows another embodiment using a single pressure compensating accumulator arrangement including the flow restricting device 117 and accumulator chamber 116 for all wheels. In this embodiment, the wheels at cross corners of the vehicle are interconnected to respective of the accumulator chambers 148 and 155. In this embodiment, the shock absorbers associated with the left front and right rear are connected to the chamber 148 and that of the front right and left rear are connected to the chamber 155. This arrangement reduces the likelihood of pitching and also rolling, and further provides added damping when only one wheel encounters an obstruction.

Figure 13:
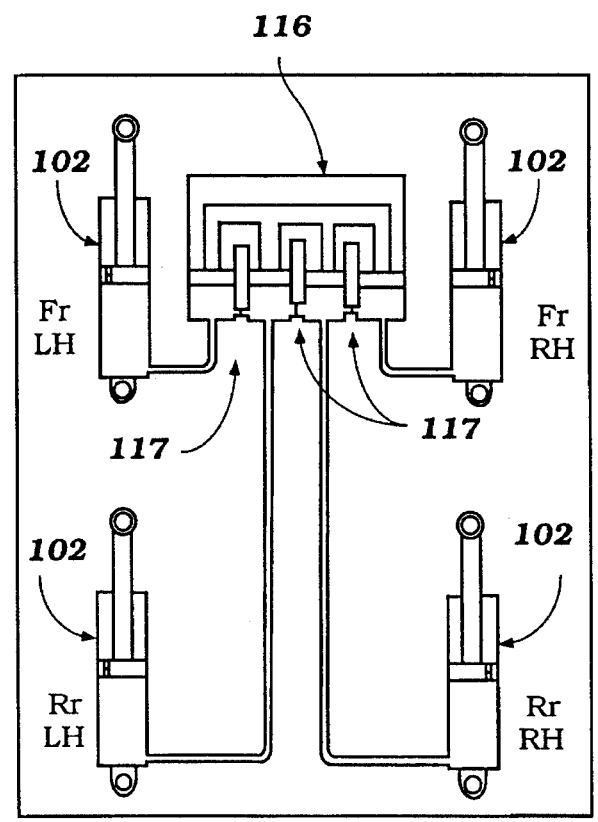

In the embodiments thus far described, each accumulator includes a pair of interconnected pistons. FIG. 13 shows an embodiment wherein a single accumulator 165 and flow restriction arrangement 117 is provided with four pistons, one for each shock absorber, and all pistons are interconnected for simultaneous movement. This arrangement provides pitch and roll control, as well as improves damping for individual wheels.

Embodiment of FIGS. 14–17

FIGS. 14–17 show a further embodiment of the invention, which is generally similar to the embodiment of FIGS. 1–3, and for that reason, components of this embodiment which are the same as those of the previous embodiment have been identified by the same reference numerals. This embodiment differs from the previous embodiment in the form of the flow controlling device, indicated generally by the reference numeral 251 in this embodiment, which replaces the flow controlling unit 117 of the previous embodiment. Basically, this flow controlling device includes, in addition to the check valves and needle valve restriction, an accumulator chamber, and the operation is generally the same. Because of this, only the construction of the flow control device 251 will be described by reference to these figures.

The flow controlling device 251 includes an accumulator chamber portion, indicated generally by the reference numeral 252, which comprises a housing 253 which defines an internal cylinder bore 254 that is received upon a threaded end 255 of a combined end closure housing 256. An O-ring seal 257 provides a seal between the housing pieces 253 and 256, and defines a hydraulic fluid accumulator chamber 258.

A floating accumulator piston 259 is supported in the cylinder bore 254 of the housing piece 253. The piston 254 carries a piston ring 261 and an O-ring 262 for sealing the hydraulic chamber 258 from a pressurized gas chamber 263. An opening 264 is formed in the housing piece 253 and receives a closure plug 265 that is provided with an O-ring seal 266 to close the opening 264. The closure plug 265 further has an elastic plug 267 formed in it through which a hypodermic-type needle may be inserted when a second closure plug 268 threaded into the closure plug 265 is removed. A suitable gas under pressure may then be filled into the accumulator chamber 263. Preferably, an inert gas such as nitrogen is employed.

At the end opposite the accumulator chamber 252, the housing member 256 supports a pair of flow controlling valve assemblies, indicated by the reference numerals 269 and 271, respectively. Each flow controlling valve assembly 269 and 271 is substantially the same in construction as the embodiment of FIGS. 1–3. However, since they are shown in greater detail, each will be described again utilizing new reference numerals in conjunction with this figure. However, like components of each of the valves 269 and 271 will be identified by the same reference numerals.

Each valve 269 and 271 is comprised of an outer housing 272 that is threaded onto a respective portion of the housing member 256 with an O-ring seal 273 being interposed there between for sealing purposes. A piston 274 is provided in a cylinder bore 275 of each housing piece and divides it into two separate chambers. For ease of description, the chambers associated with the valve 269 are designated as 276 and 277, while the chambers of the valve 271 are indicated at 278 and 279.

The pistons 274 carry seals 281 on their outer periphery that engage and seal the bores 275. The pistons 274 are received on respective posts 282 that are affixed to the housing 256 through a threaded connection 283. An O-ring seal 284 provides a seal at the end of this threaded connection.

The pistons 284 are retained on the posts 282 by means of nuts 285 with respective check valves 286 and 287 disposed on opposite sides of the piston 274. The check valve 287 controls the flow through a first series of passages 288 which communicates the chamber 276 with the chamber 277 of the valve assembly 269 and the chamber 278 with the chamber 279 of the valve assembly 271.

The check valves 286 control the flow through a second series of passages 289 which extend through the pistons 274 and communicate the chamber 277 with the chamber 276 of the valve assembly 269 and the chamber 279 with the chamber 278 of the valve assembly 271.

In addition, the post 282 is provided with through passageway 291 that defines a valve seat at one end that is controlled by a needle valve 292. The needle valves 292 carry O-ring seals 293 so as to provide a seal.

Each needle valve 292 is engaged by a respective adjusting screw 294 that is threaded into the housing piece 253 and which carries an O-ring seal 295. Bores 296 in the housing piece 256 permit access to the socket heads of the screws 294 for adjustment purposes. A detent mechanism 297 is carried by each adjusting screw 294 and operates to provide a click stop arrangement with the housing so as to permit the operator to selectively adjust the size of the orifice that bypasses the check valves 286 and 287 so as to adjust the flow characteristics, as will be described.

The chamber 277 of the valve 269 communicates with the accumulator chamber 258 through a passage 298 formed in the housing member 256. In a like manner, the chamber 279 of the valve assembly 271 communicates with the accumulator chamber 258 through a passageway 299 formed in the housing 256. The chambers 277 and 279 communicate with each other through the passages 298, 299 and the accumulator chamber 258.

Figure 14:
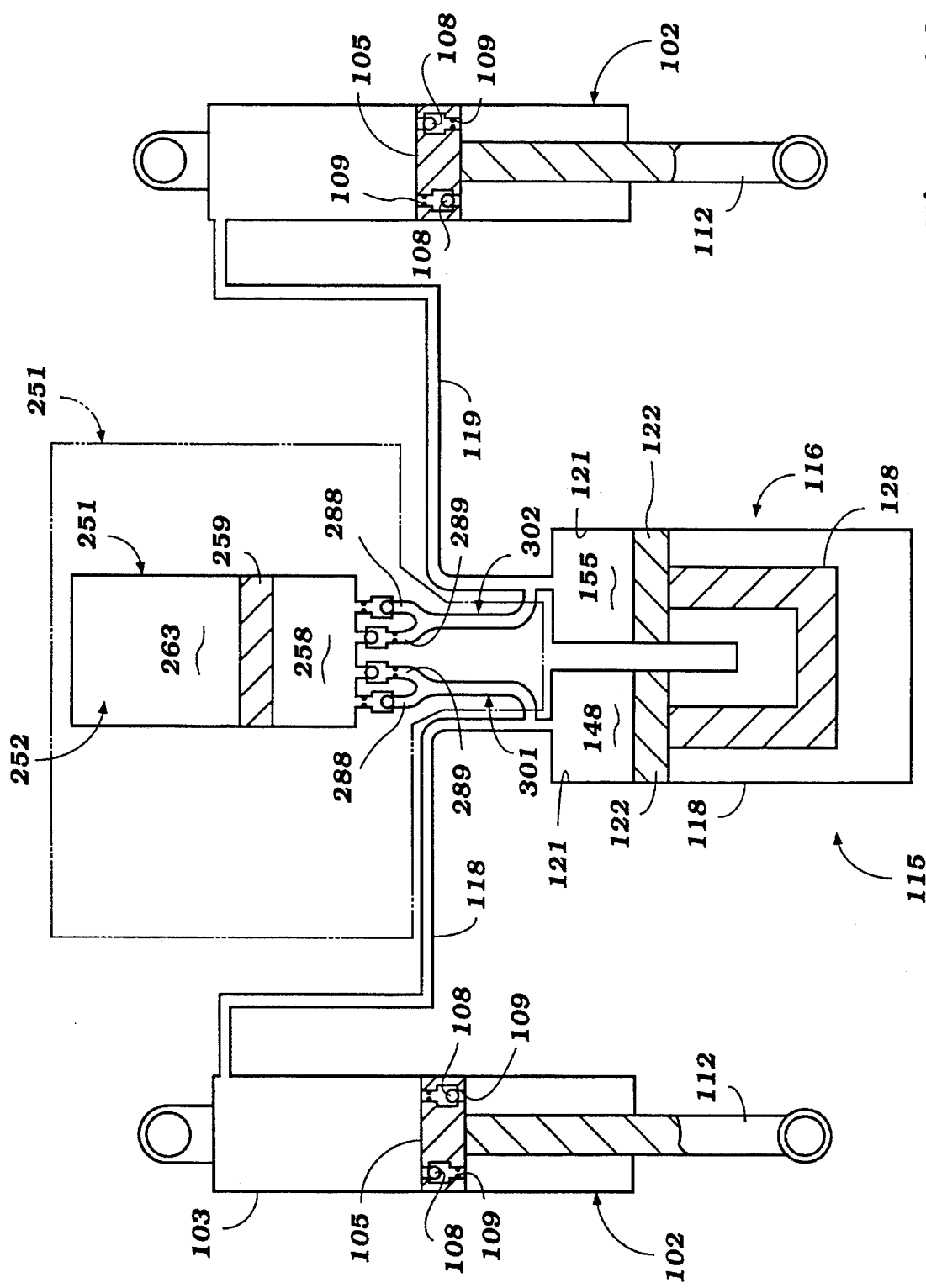
FIG. 14 is a schematic cross-sectional view, in part similar to FIG. 1 and shows a further embodiment of the invention.
Figure 15:
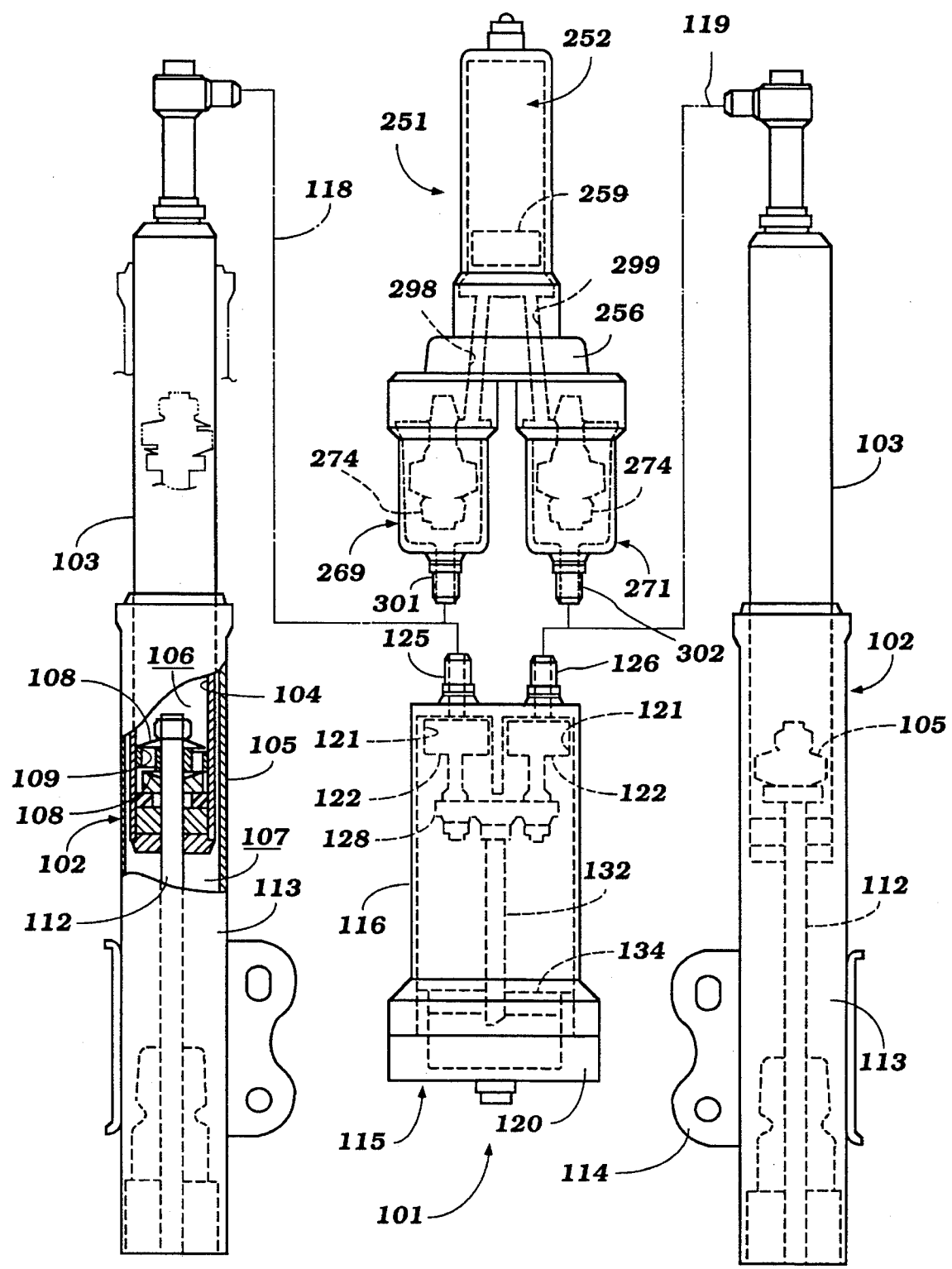
FIG. 15 is an elevational view in less schematic fashion of the suspension arrangement of FIG. 14 with certain portions broken away.
Figure 16:
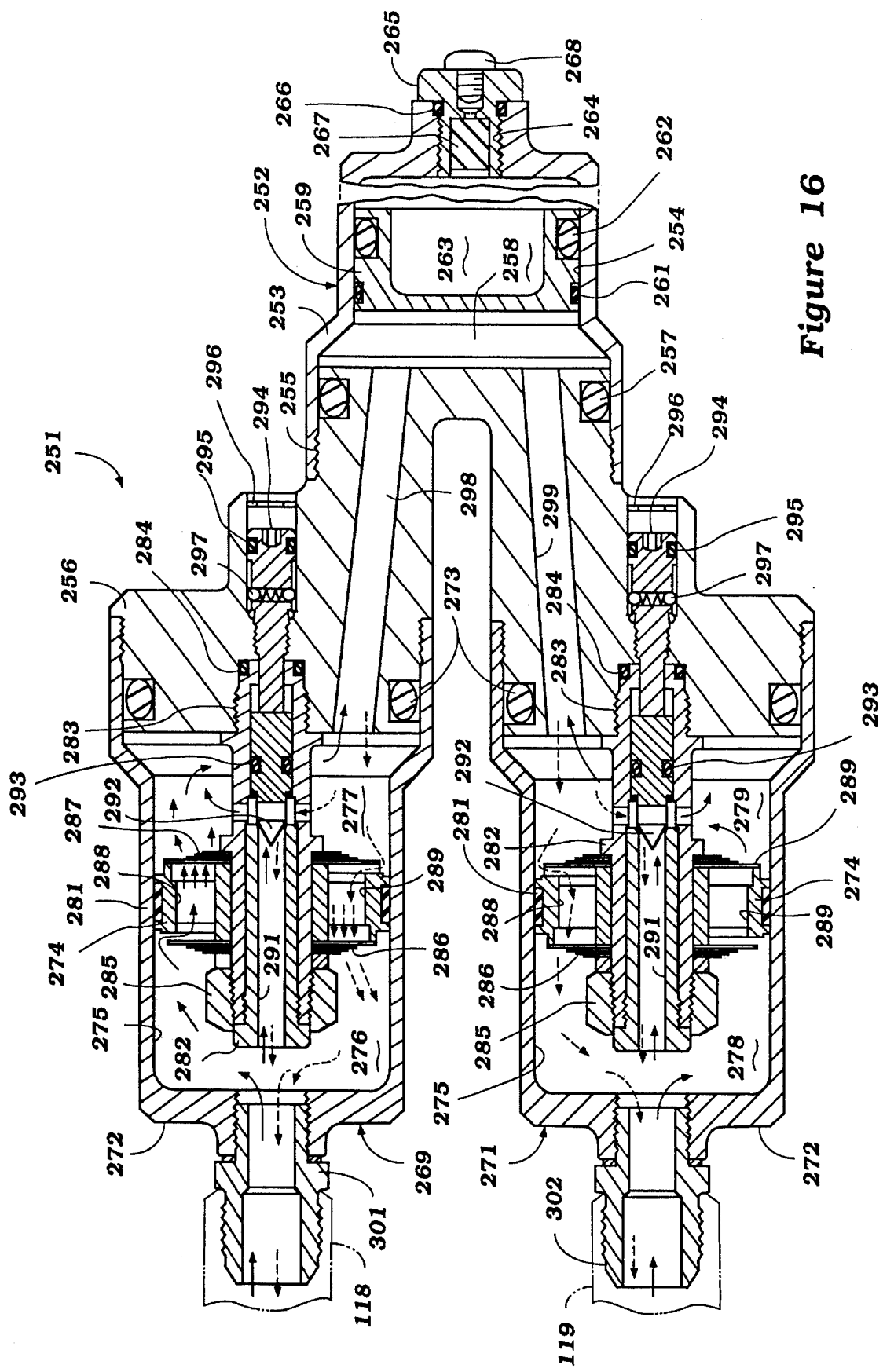
FIG. 16 is an enlarged cross-sectional view of the pressure adjusting arrangement of this embodiment.

A first fitting 301 communicates the chamber 276 of the valve 269 with the conduit 118 associated with the left hand shock absorber 102 as seen in FIGS. 14 and 15. In a similar manner, a second fitting 302 connects the conduit 119 with the chamber 278 of the flow control valve 271.

The operation of this embodiment will be described by reference to FIG. 17. The pressure in the chambers 106 of the shock absorbers 102 and 103 is indicated as P1 and P2, respectively. This same pressure P1 and P2 will also exist in the chambers 148 and 155 of the accumulator 116 due to the fact that these chambers are in open, unrestricted communication with these respective chambers. The chamber pressure in the accumulator 258 of the flow control device 251 and specifically its accumulator portion 252 is indicated at P3 whereas the gas pressure in the accumulator chamber 264 is indicated at P4. In a steady state condition, these pressures will all be equal. That is:

P1=P2=P3=P4

Figure 17:
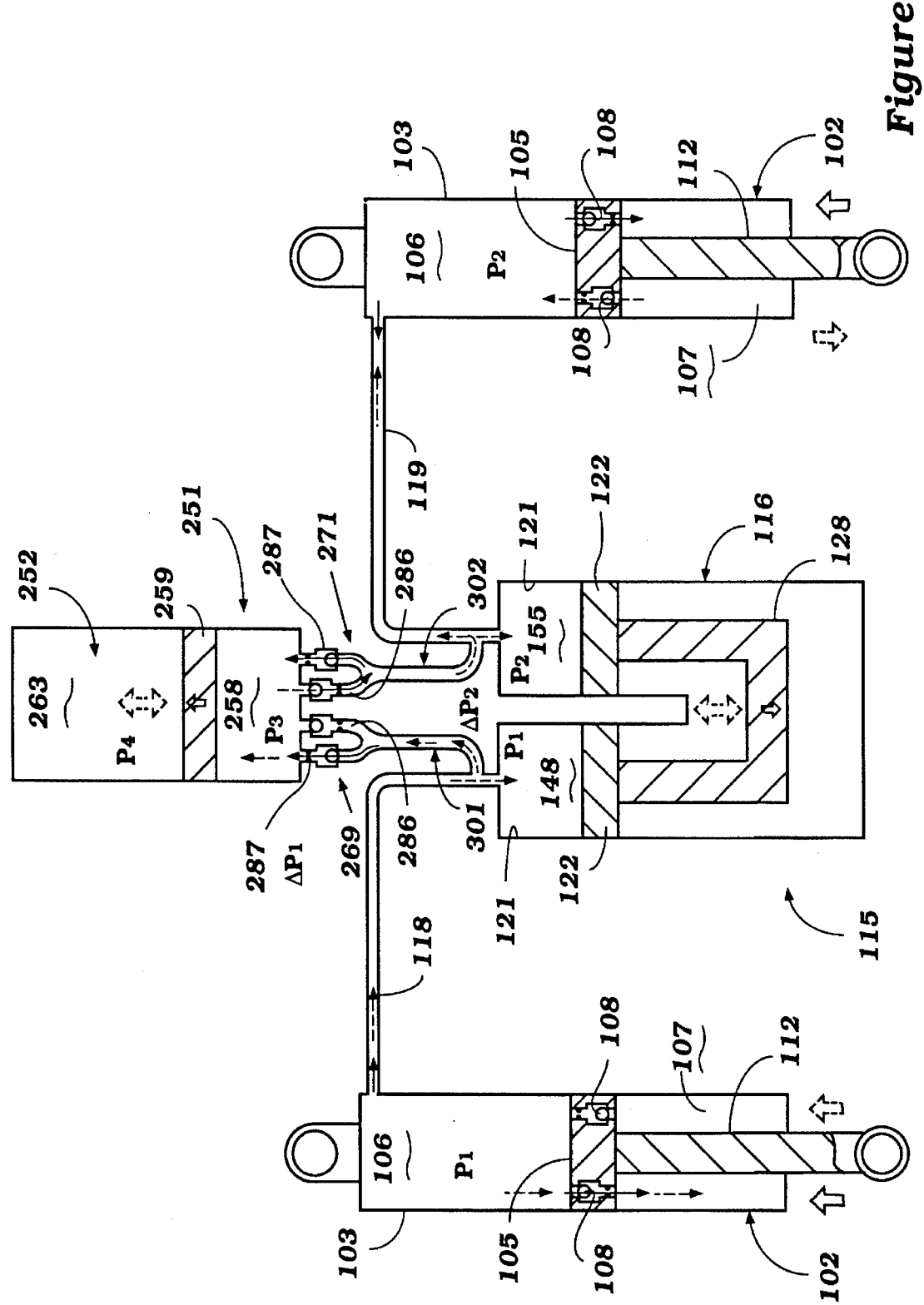
FIG. 17 is a schematic view in part similar to FIG. 14 and shows the fluid flow through the system in accordance with certain types of suspension movement.

If the wheels associated with each of the shock absorbers 102 encounter an obstruction in the road of equal magnitude and at the same time, the pistons 105 will be forced upwardly in each shock absorber 102 as shown by the solid arrows in FIG. 17. When this occurs, one of the check valves 108 of each shock absorber will open so as to permit flow from the respective chambers 106 to the lower chambers 107 in which the piston rods 112 are disposed. As before, the excess fluid displaced from the chambers 106 is forced through the conduits 118 and 119. Since there is no restriction to flow into the accumulator chambers 148 and 155, while the check valves 287 associated with the pressure regulating accumulator 251 require a predetermined pressure to open, the fluid will be displaced into the accumulator chambers 148 and 155. Since the volume of displacement is the same, the pistons 122 can move in unison due to the interconnecting bridge 128 and all of the fluid displaced will flow into the accumulator 115.

If, however, the forces on the vehicle are such that the piston 105 of the left hand shock absorber 102 is forced upwardly and the piston 105 of the right hand shock absorber 102 moves downwardly, as shown by the broken line arrows, then the flow occurs as shown by the broken line arrows in FIG. 17. If the wheels with which the shock absorbers 102 are associated are at opposite sides of the vehicle, this type of force will be encountered when rounding a curve, as previously described in conjunction with the other embodiments.

When this occurs, fluid from the chamber 106 of the left hand shock absorber 102 will again open one of the check valves 108 and cause flow into the chamber 107. The excess fluid displaced from the chamber 106 of this shock absorber will flow into the conduit 118.

At the same time, the piston 105 in the right hand shock absorber will tend to move downwardly and fluid will be displaced upwardly into the chamber 106 from the chamber 107 through opening of the respective shock absorbing check valve 108 in the right hand piston 107. This causes flow to occur from the conduit 119 into the chamber 106 of the right hand shock absorber to make up the volume.

Since the accumulator chamber pistons 122 associated with the chambers 114 and 155 tend to move in opposite directions under this type of loading, but are restrained by the interconnecting member 128, the fluid flow actually occurs through the pressure controlling accumulator 251. That is, fluid will flow from the conduit 118 through the fitting 301 to open the check valve 287 and pressurize the accumulator chamber 258 of the flow controller 251. This pressure then will open the valve 286 and cause flow from the chamber 258 to the right hand shock absorber through the conduit 119. As a result, this movement is dampened by the flow through the flow controlling device 251 similar to the preceding embodiments. However, the dampening action will be caused by the pressure resistance of the check valves 287 and 286 which are indicated ΔP1 and ΔP2 respectively. This then controls the damping in this direction. It should be noted that the dampening of the valves 286 and 287 may be made different from each other. For example, if the resistance of the outflow check valves 286 is made larger than that of the inlet check valves 287, then it is possible to make the resistance against expansion of the right hand shock absorber less than the example given so as to restrain the inside of the vehicle body from rolling and the transient rolling properties of the entire vehicle body is reduced.

Also it is possible to restrain initial rolling and improve responsiveness by changing the dampening at the throttle member of the flow controller provided by the needle valves 292.

During this operation there may be some movement of the pistons 122 in the accumulator chambers 114 and 155, depending upon the total affect of the system, and it is to be understood that those skilled in the art can readily understand how with the disclosed structure the desired suspension characteristics can be retained to prevent vehicle movements in response to vehicle forces as opposed to forces encountered by the wheels when striking objects.

Vehicle Applications

The embodiment of FIGS. 14–17, like the embodiment of FIGS. 1–3, and the embodiment of FIGS. 4 and 5, may be utilized in a wide variety of arrangements between wheels of a vehicle such as a 4-wheel vehicle. FIGS. 14–17 show connections which can be made from one side to the other (both fronts, both rears, or one connection between the fronts and another similar connection between the rears. In addition, the arrangement can be used at the same side of the vehicle where both wheels at each side are connected by an arrangement as shown in FIGS. 14–17. These arrangements can be similar to those shown in FIGS. 6–13 and some specific examples are shown in FIGS. 18 and 19.

Figure 18:
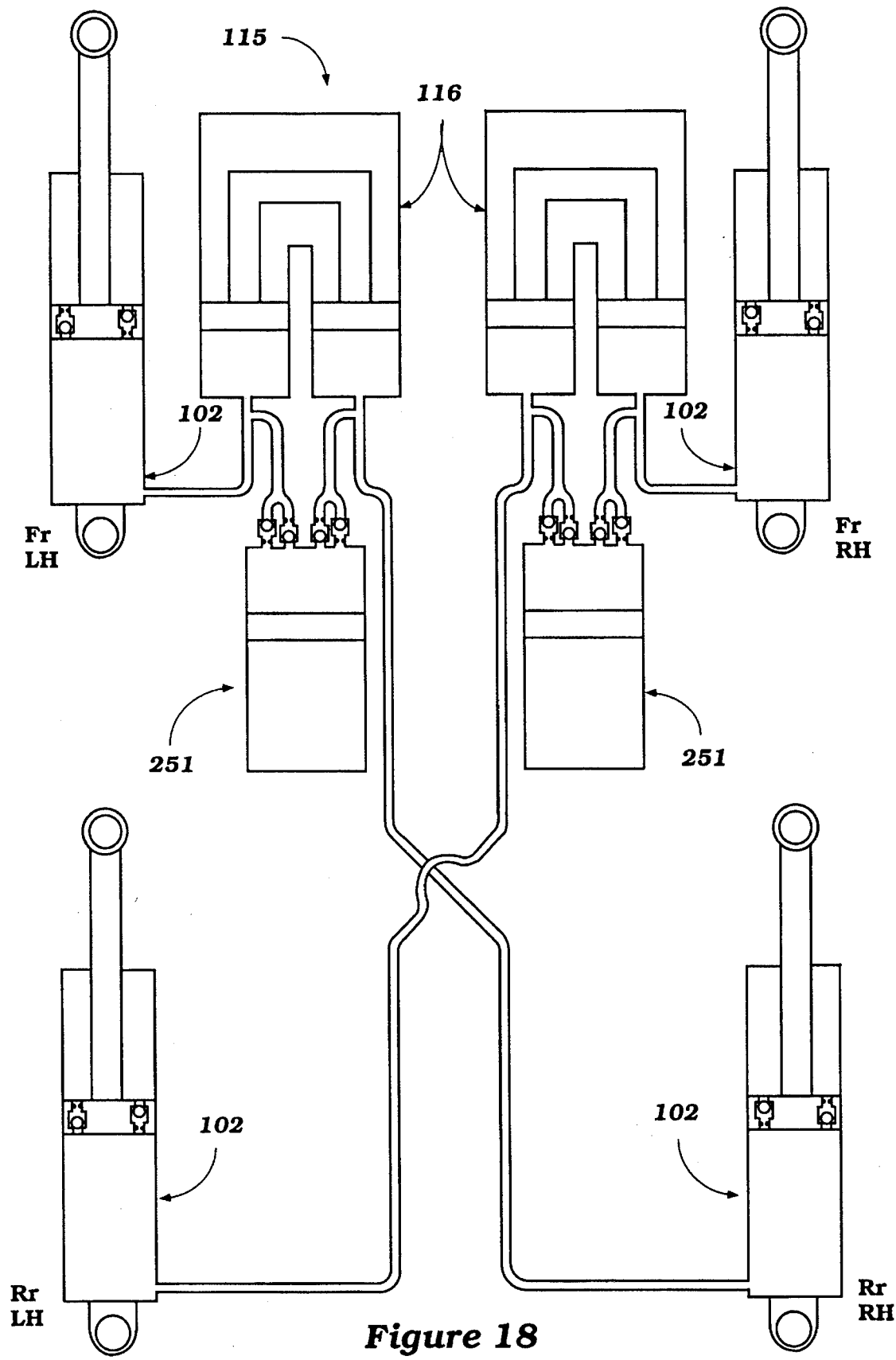
FIG. 18 is a schematic view of an automotive vehicle showing one way in which the embodiment of FIGS. 14–17 may be employed.

In FIG. 18, like FIG. 12, there is a cross-connection between the left front, right rear and right front left rear shock absorbers which will tend to resist both rolling, pitching and a combination of these forces. Since the components are the same, the same reference numerals have been employed to designate these components.

Figure 19:
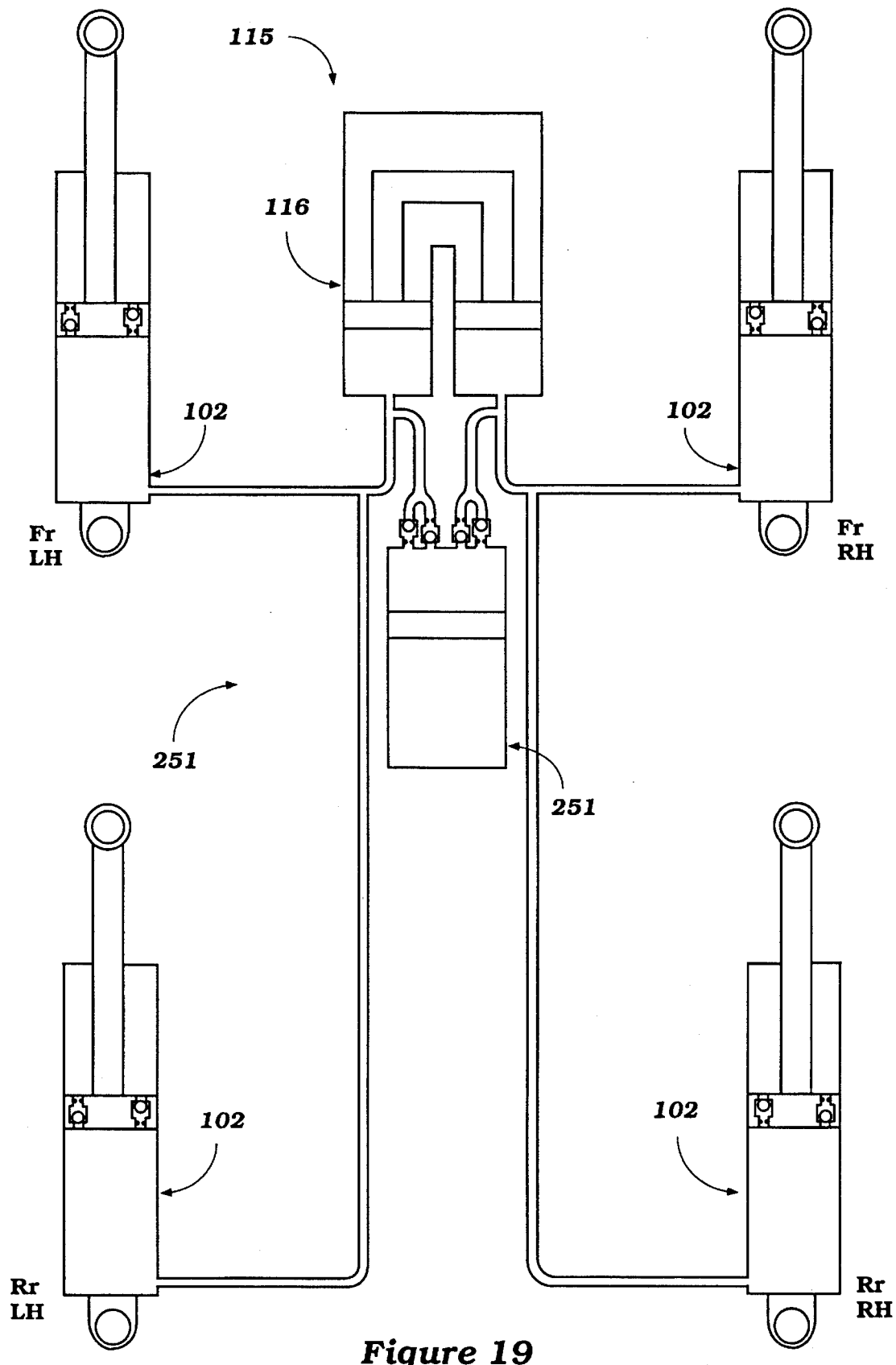
FIG. 19 is a schematic view, in part similar to FIG. 18, and shows another way in which the embodiment of FIGS. 14–17 may be embodied in a vehicle application.

FIG. 19 shows an embodiment like that of FIG. 11 wherein both side shock absorbers are connected to one branch of the accumulator and controller and both shock absorbers on the other side are connected to the other branch of the accumulator. This will have the same results as that previously described arrangements.

Figure 20:
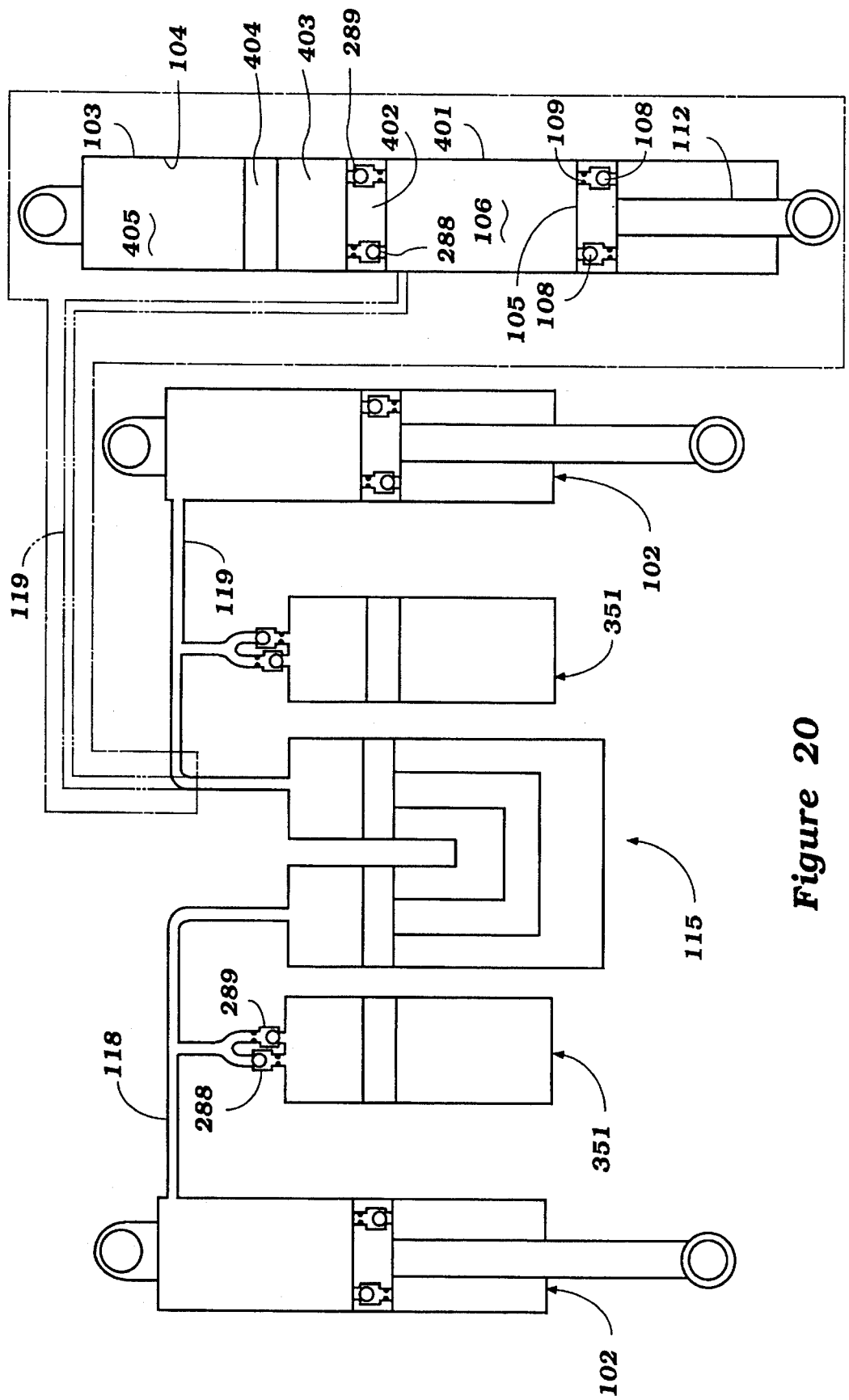
FIG. 20 is a schematic cross-sectional view, in part similar to FIGS. 1, 4 and 14 and shows a still further embodiment of the invention.

Embodiment of FIG. 20

In the embodiment of FIGS. 14–17, a single accumulator throttle control member 251 has been interposed between the conduits 118 and 119. It is also possible, however, to utilize an arrangement wherein each of the shock absorbers 102 is provided with its own throttle control accumulator member and FIG. 20 shows such an embodiment. In this embodiment, the throttle control accumulator members are indicated generally by the reference numerals 351. It should be noted that each has a pair of check valves 288 and 289, each communicating with a respective one of the conduits 118 and 119. In all other regards, this embodiment is the same as that of FIGS. 14–17 and, like the other embodiments described, it can be connected to the wheels of the vehicle in any relationship.

Also, FIG. 20 shows a still further embodiment of the invention wherein the pressure regulating accumulators 351 are incorporated directly within the shock absorbers 102. In this embodiment, the shock absorbers are indicated generally by the reference numeral 401 (only one of which is shown) and each includes the piston 105 and check valves 108 and passages 109 for controlling the flow.

In this embodiment, a fixed partition 402 is provided in the cylinder bore 104 of the cylinder housing 103 and contains the flow controlling check valves 288 and 289 as previously described. Thus, the partition 402 divides the chamber 106 into an upper fluid chamber 403 in which an accumulator piston 404 is slidably supported. A pressurized gas chamber 405 is formed above the floating accumulator piston 404. The operation of this embodiment should be readily apparent from the foregoing description.

Figure 21:
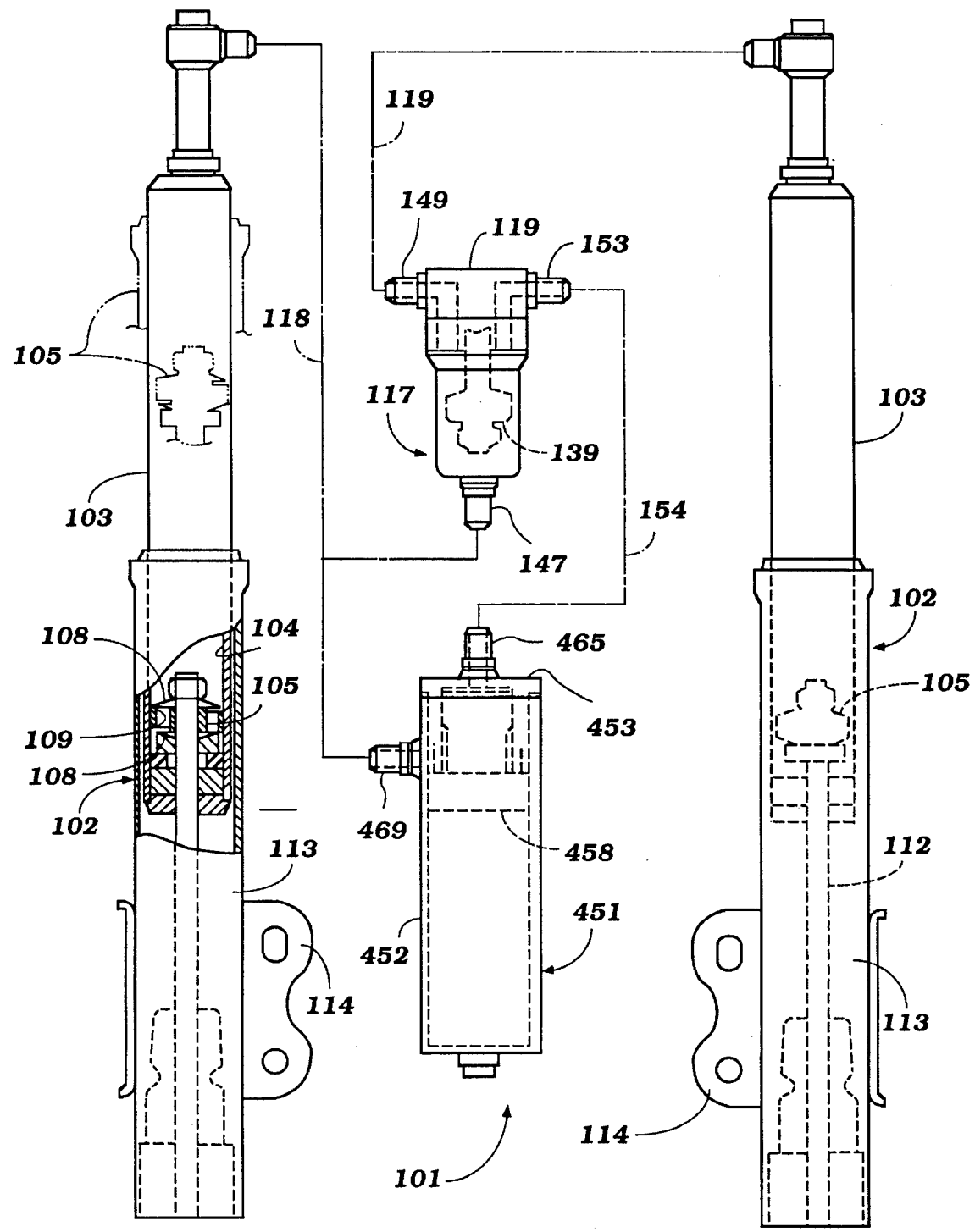
FIG. 21 is a side elevational view, in part similar to FIGS. 2, 4 and 15 and shows yet another embodiment of the invention.
Figure 22:
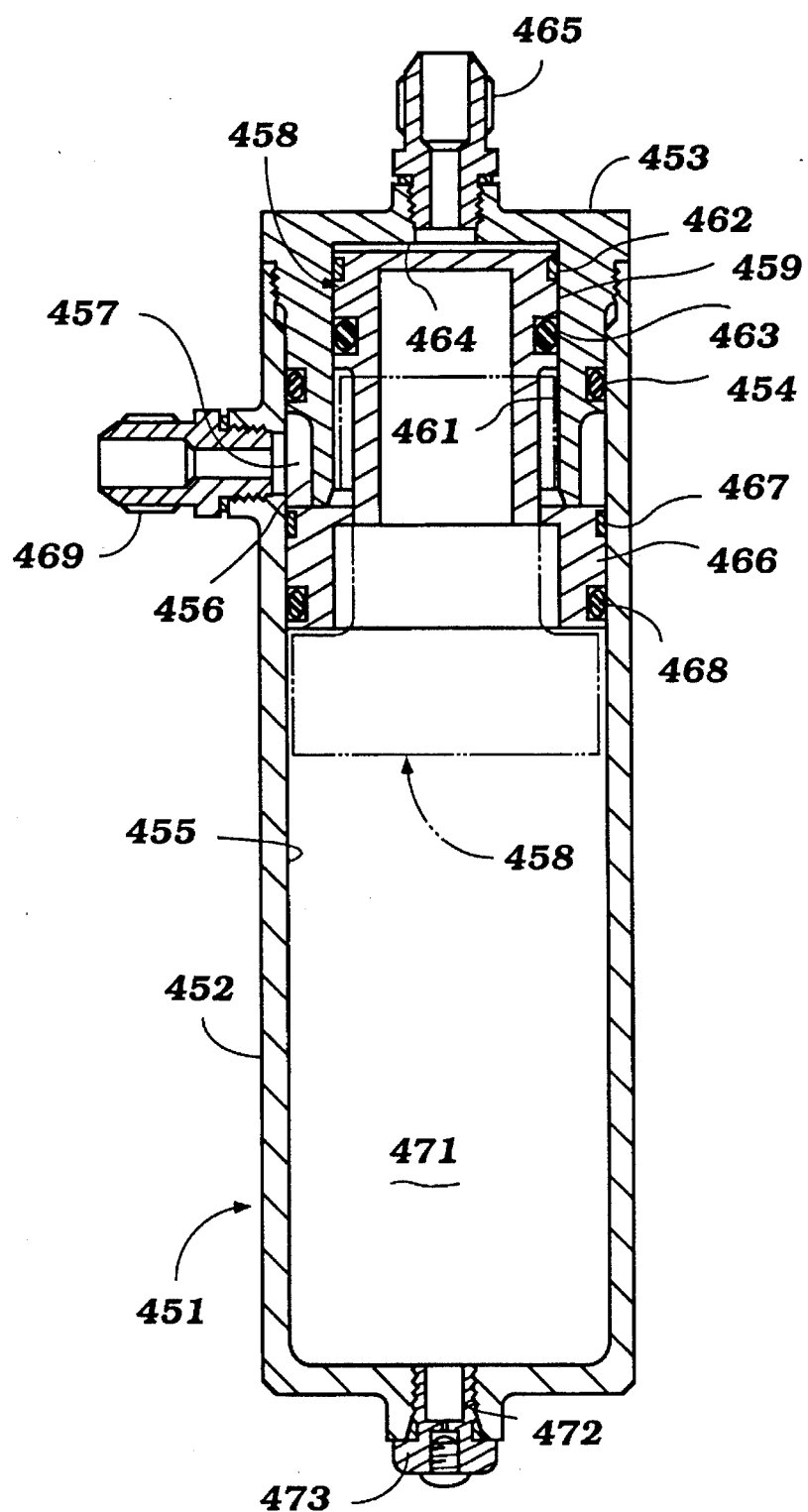
FIG. 22 is an enlarged cross-sectional view of the accumulator assembly employed in the embodiment of FIG. 21.

Embodiment of FIGS. 21 and 22

In the constructions as thus far described, the accumulator that interconnects the two shock absorbers has employed two separate but interconnected pistons to achieve the desired suspension characteristics for the ride and control the body of the vehicle. This includes either a connecting bar, as shown in the embodiment of FIGS. 1–3, or a connecting linkage, as shown in the embodiments of FIGS. 4 and 5. This type of arrangement has several disadvantages. First, there is the problem of maintaining alignment and common movement. In addition, there is the problem of forming two separate cylinders and ensuring that their configuration is such that the movement of the associated pistons can be assured.

FIGS. 21 and 22 show another embodiment of the invention wherein the two accumulator chamber pistons are formed from a common member, and thus eliminates some of the disadvantages of the previously described constructions. This embodiment will now be described by particular reference to FIGS. 21 and 22, which are generally the same as the embodiment of FIGS. 1–3, except the accumulator device, indicated generally by the reference numeral 451, is constructed in accordance with this embodiment. Where the other components are the same or substantially the same, they have been identified by the same reference numerals and will be described again only insofar as is necessary to understand the construction and operation of this embodiment.

The pressure balancing accumulator is comprised of an outer housing consisting of a main housing member 452 and a closure member 453 that has a threaded connection to the open upper end of the main housing member 452. An O-ring seal 454 provides a seal between the closure 453 and a main cylinder bore 455 of the housing member 452. It should be noted that the closure member 453 has a skirt portion 456 that is spaced inwardly from the cylinder bore 455 to define an annular chamber 457 for a purpose which will be described.

A composite piston assembly, indicated generally by the reference numeral 458, has a first smaller diameter portion 459 that is slidably supported within a bore 461 formed by the closure portion 453. The piston portion 459 carries a piston ring 462 and O-ring 463 for sealing engagement with this cylinder bore 461. This construction forms a first accumulator chamber 464. This accumulator chamber communicates with the right-hand shock absorber 102 through the conduit 154 from the control valve 117 through a fitting 465 fixed to the end of the closure member 453.

Below the piston portion 459, the composite piston 458 has a second larger diameter portion 466 that is in sealing engagement with the housing cylinder bore 455. The piston portion 466 carries a piston ring 467 and O-ring seal 468 for sealing with the cylinder bore 455. The chamber 457 communicates with the left-hand shock absorber 102 through the conduit 118 via a fitting 469 that is fixed in the housing 452 and which communicates with the annular gap 457.

The composite piston 458 thus defines a first effective hydraulic area by the cross-sectional area of the piston portion 459 and a second effective hydraulic area defined by the surface of the piston portion 466 disposed radially outwardly of the lower part of the piston portion 459. This annular piston area has the same effective cross-sectional area as the area of the piston portion 459 so that in essence the two hydraulic chambers of this accumulator have exactly the same effective volume. Hence, on a given degree of axial movement of the composite piston 458, equal amounts of fluid will be transferred to the two shock absorbers 102 or from them.

The area below the composite piston 458 forms a gas pressurized accumulator chamber, indicated generally by the reference numeral 471. Like the preceding embodiments, this chamber 471 is charged with a pressurized inert gas through an opening 472 formed at the lower end of the housing member 451 and closed by a closure plug 473. A construction of the type shown in FIG. 16 may be employed for charging the pressurized inert gas into the volume 471.

FIG. 22 shows the composite piston 458 in solid lines in its uppermost position and in phantom lines at approximately the lower end of its stroke. It is believed that from the foregoing description the operation of this embodiment will be apparent to those skilled in the art.

Figure 23:
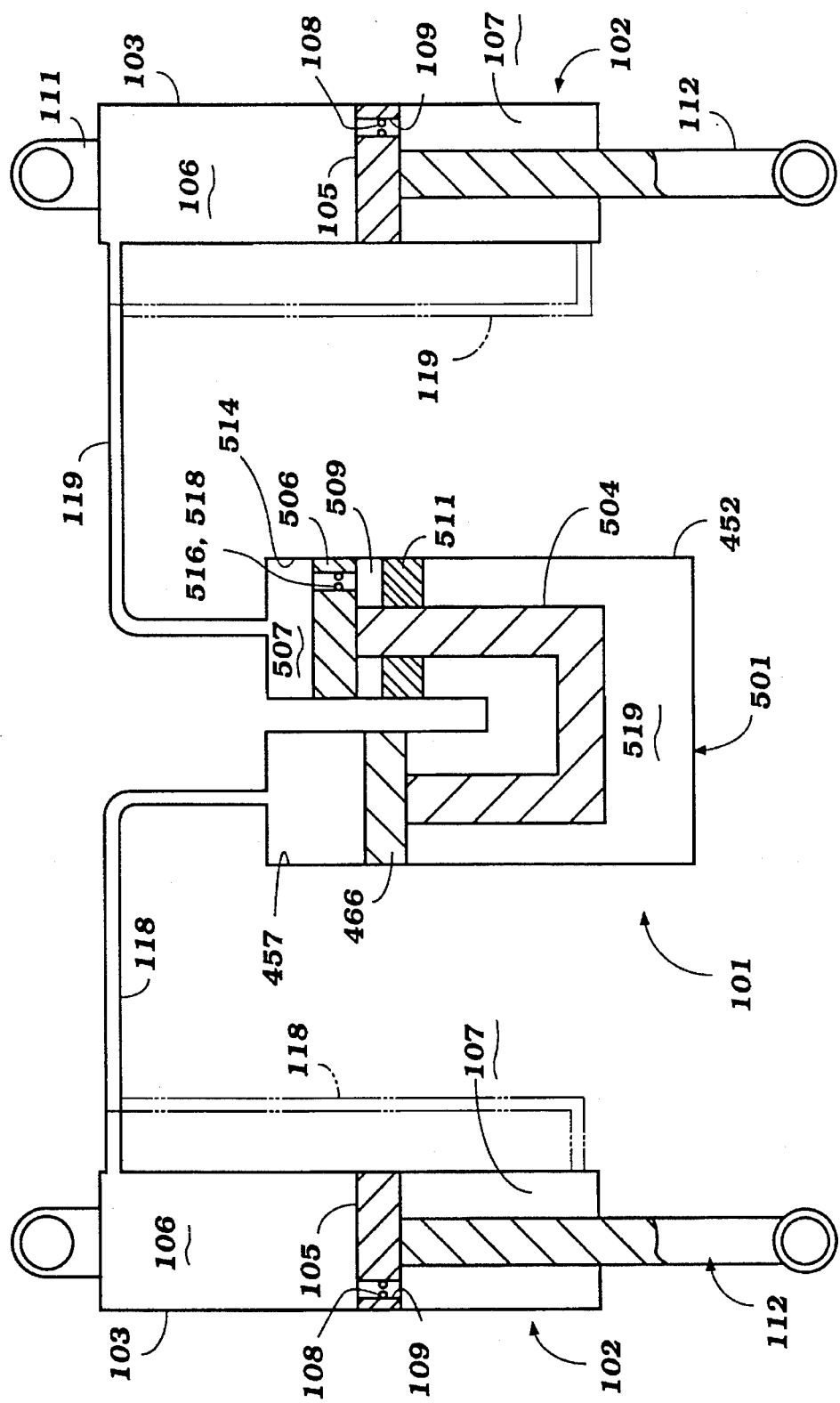
FIG. 23 is a schematic cross-sectional view, in part similar to FIGS. 1, 4, 14 and 20 showing yet another embodiment of the invention.
Figure 24:
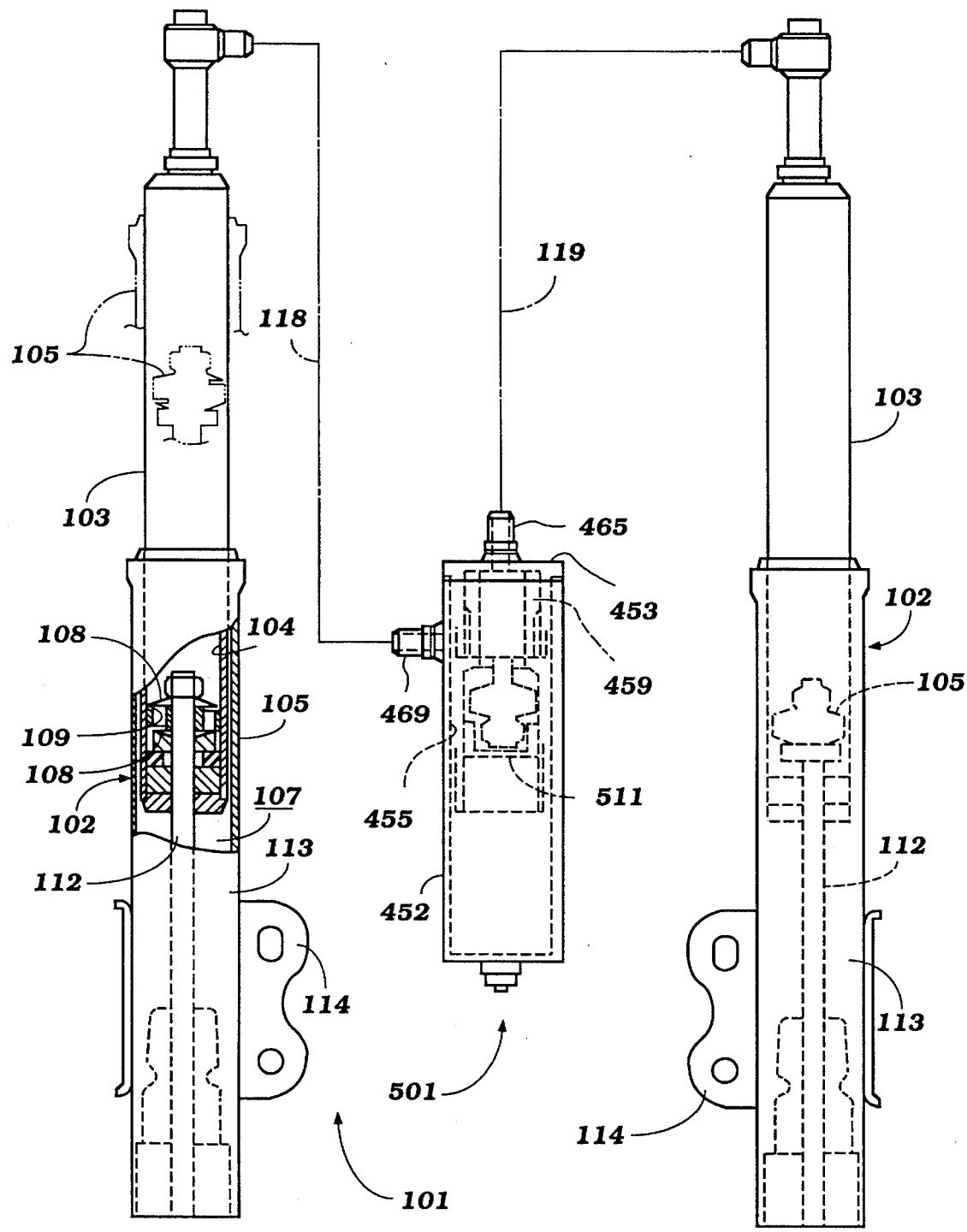
FIG. 24 is a side elevational view, in less schematic fashion, of the embodiment of FIG. 23.
Figure 25:
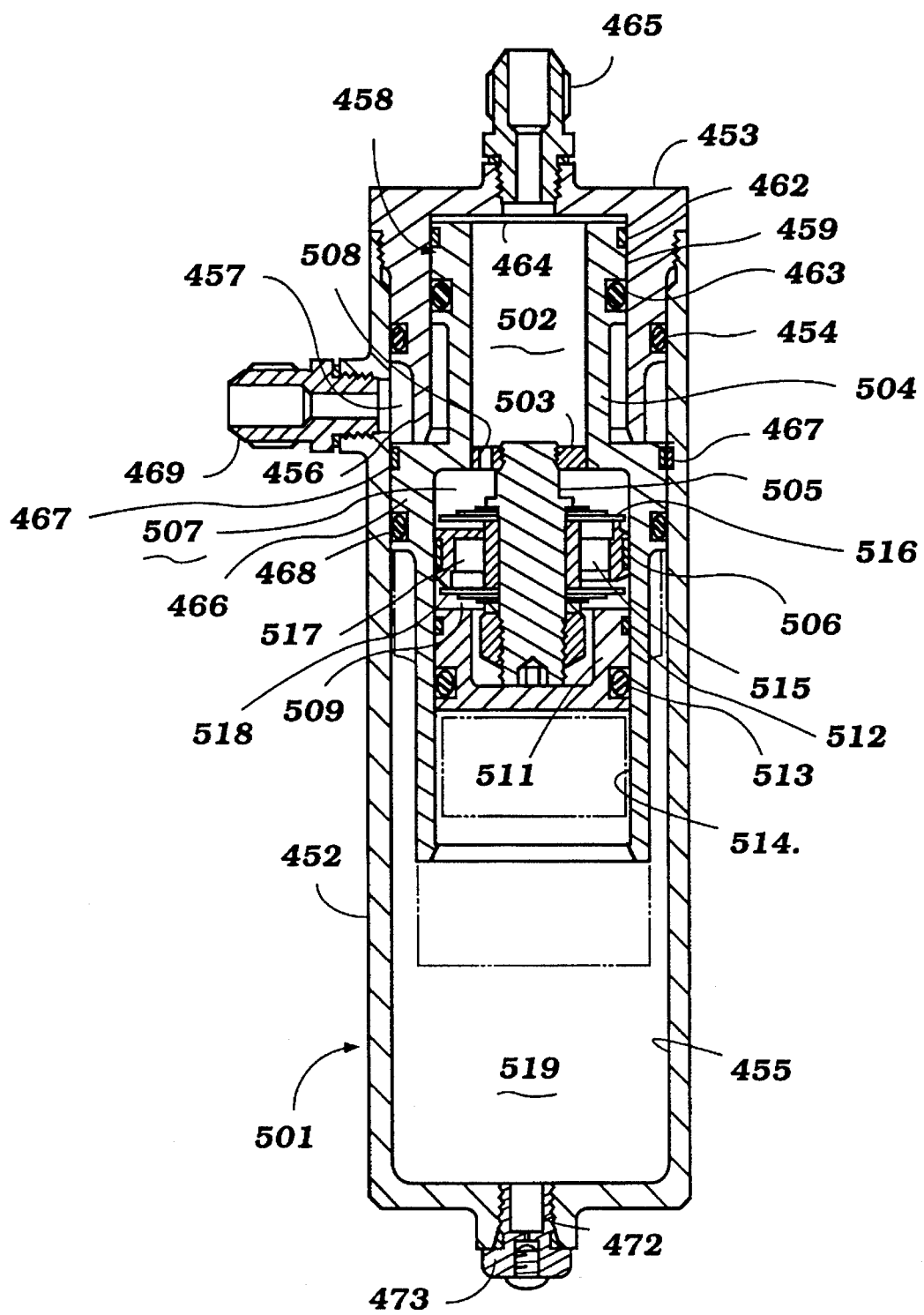
FIG. 25 is a cross-sectional view showing the accumulator pressure adjusting arrangement of this embodiment.
Figure 26:
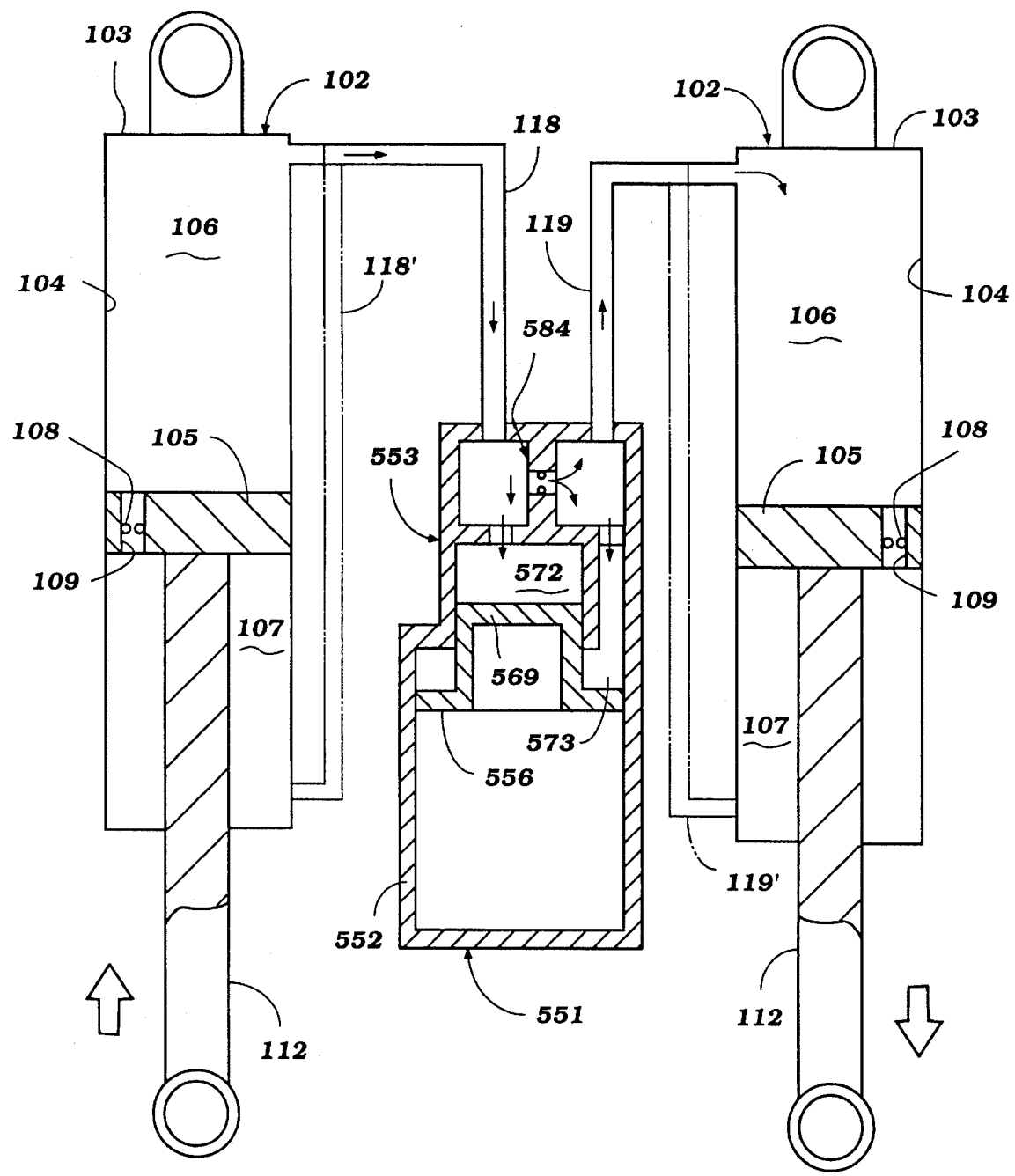
FIG. 26 is a partially schematic cross-sectional view, in part similar to FIGS. 1, 4, 14, 17 and 23 and shows yet a further embodiment of the invention.

Embodiment of FIGS. 23–25

In the embodiments of the invention as thus far described, the flow controlling valve that controls the damping characteristics between the two connected shock absorbers 102 has been positioned externally of the pressure balance accumulator chamber. FIGS. 23–25 show another embodiment of the invention wherein this valve is actually contained within the accumulator. Except for this difference, the embodiment is the same as those previously described, and where that is the case, components of this embodiment which are the same or substantially the same as those previously described have been identified by the same reference numerals and will not be described again.

In this embodiment, the accumulator, indicated generally by the reference numeral 501, has the concentric piston arrangement of the embodiment just described (FIGS. 21 and 22), although the system is shown schematically in FIG. 23 by splitting the pistons into two separate parts. Because of the similarities of the accumulator 501 to the accumulator 451 of the previously described embodiment where components of the accumulator are the same or substantially the same, they have also been identified by the same reference numerals and will be described again only insofar as is necessary to understand the construction and operation of this embodiment.

In this embodiment, the upper portion 459 of the piston assembly 458 acts as a piston, but is not shaped like a conventional piston. Rather, it is formed with a hollow opening 502 through which fluid from the chamber 464 may pass in a downward direction. A plate 503 is fixed to the piston assembly 458 at the lower end of a cylindrical portion 504 thereof. A post 505 is fixed to the plate 503 and carries a dividing piston 506. The dividing piston 506 forms an upper chamber 507 below the plate 503 through which fluid may flow through a number of passages 508.

A further chamber 509 is formed below the piston 506 and above a floating piston 511 that carries seals 512 and 513 for slidable contact with a bore 514 formed in a lower portion of the piston assembly 508.

A first series of passages 515 are formed in the dividing piston 506 and have check valves 516 at one end thereof which control the flow from the chamber 509 above the floating piston 511 to the chamber 507. A second series of passages 517 are formed in the dividing piston 506 and have the flow therethrough controlled by a second pressure responsive check valve 518 for flow from the chamber 507 to the chamber 509. The area below the floating piston 511 forms a chamber 519 that is filled with an inert gas through the fill opening 472 in the manner previously described.

The floating piston 511 has an effective cross-sectional area which is the same as the effective area of the piston portion 466 of the piston assembly 458. This is the annular area around the cylindrical portion 504 to the cylinder bore 455 of the housing 452.

The way this system operates will be described by reference to the schematic view of FIG. 23 and FIG. 25. Assuming first the condition when the wheels associated with both of the shock absorbers 102 receive the same load at the same time, fluid will be displaced from the chambers 106 in an amount equal to the displacement of the piston rods 112 through the conduits 118 and 119, as aforedescribed. The fluid from the passage 118 enters the annular chamber 457 and acts upon the piston portion 466 to urge it downwardly. At the same time, fluid from the passage 119 will enter the chamber 464 through the fitting 465, and this fluid will, if of the same displacement as that entering the chamber 457, cause the dividing piston 506 to move downwardly along with the floating piston 511. It should be noted that the post 505 can and does engage the floating piston 511 under this condition. As a result, there will be no flow through the check valves 516 or 518, and there will be no interconnection damping when the shock absorbers 102 each receive the same load at the same time, as with the previously described embodiments.

If, however, there is a load tending to compress the left-hand shock absorber 102 and cause the right-hand shock absorber 102 to expand, as with rounding a curve if the shock absorbers are associated with the wheels at opposite sides of the same end of the vehicle, then fluid will be displaced from the chamber 106 of the left-hand shock absorber 102 through the conduit 118 into the annular fluid chamber 457 to act on the piston portion 466 and urge it downwardly. This will, of course, compress the gas in the chamber 519 further.

However, at the same time, the chamber 106 of the right-hand shock absorber 102 will be expanding and more fluid is required in the chamber 106 of the shock absorber than can be made up from the chamber 107 due to the presence of the piston rod 112. Therefore, there is an interdependent control that will be exerted by the check valves in the dividing piston 506 (check valves 516 and 518). Thus, this embodiment will operate as with the previously described embodiments and can control either rolling when used in side- to-side arrangements or pitching when used in fore and aft connections. In addition, this unit can be cross connected in any of the arrangements as previously described so as to provide a combined functional control.

Also, as has been previously noted, rather than interconnecting the chambers 106 of the shock absorbers 102 with each other, the chambers 107 can be interconnected, and such alternate interconnections are shown at 118' and 119' in FIG. 23.

Embodiment of FIGS. 26–35

In the embodiments of the invention as thus far described, the communicating conduitry between the two interconnected shock absorbers has included a flow control valve that provides the damping for the interrelated control of the vehicle body. In each embodiment, this has included an adjustable fixed orifice and a pair of pressure responsive check valves which control the flow in respective directions. In the embodiments as thus far described, these damping characteristics are in essence adjusted upon initial assembly and remain fixed.

However, it is also possible to provide an arrangement wherein some or all of the damping parameters can be controlled during the actual operation of the device, and such an embodiment will now be described by particular reference to FIGS. 26–35. This embodiment uses the concentric piston type of accumulator, and therefore the components have been identified by the same reference numerals as previously applied, except for the construction of the pressure compensating accumulator and its valve structure, which will be assigned new reference numerals for this embodiment. In addition, these figures show further constructural details that can be employed with the previously described embodiments, including assembly and charging techniques, as previously referred to.

The pressure balance accumulator of this embodiment is indicated generally by the reference numeral 551 and is comprised of an outer housing made up of a lower piece 552 (FIG. 30) and an upper piece 553 (FIGS. 29 and 30) that have a threaded connection with an O-ring seal 554 positioned therebetween. The lower piece 552 defines a cylinder bore 555 in which a large diameter portion 556 of a compound piston, indicated generally by the reference numeral 557, is slidably supported. The piston portion 556 carries a piston ring 558 and O-ring seal 559 so as to define an annular accumulator chamber 561 there beneath.

This accumulator chamber is charged with a pressurized inert gas, in a manner which will be described later, through a fill opening 562 at the bottom thereof. The fill opening 562 is closed, in the manner previously described, by a closure plug 563 that carries a resilient sealing member 564 and which is provided with a small aperture 565 through which a hypodermic needle may be inserted for pressurizing the chamber 561. The opening 565 is closed by a small closure plug 566.

The compound piston 557 has a cylindrical portion 567 that extends upwardly through a bore 568 formed in the cover piece 553 and forms a second, cylindrical piston portion 569 at its upper end. This piston portion 569 carries a piston ring 571 for sealing engagement with the cylinder bore 568.

A first fluid chamber 572 is formed above the head of the piston portion 569, and a second, annular fluid chamber 573 is formed around the piston portion 562 and between the cylinder bores 568 and 555 that acts on the annular piston portion 556. The effective area of the annular piston portion 556 is the same as the effective area of the cylindrical piston portion 569 for the reasons already described.

The area of the closure member 553 above the fluid chamber 572 forms a further fluid chamber that is divided by a piston 574 into a first portion 575 and a second portion 576. A flow controlling valve assembly is associated with the piston 574, in a manner which will be described, for controlling the flow between the chambers 575 and 576.

The chamber 575 communicates with the conduit 118 through a banjo fitting 577 (FIG. 28) which is received in an opening 578 in the housing piece 553 and which communicates directly with the chamber 575. In a similar manner, the conduit 119 communicates with the chamber 576 through a banjo fitting 579 which communicates with an opening 581 formed in the housing piece 553.

As with the previously described embodiments, the piston 574 is fixed on a post 582 by means including a nut 583. A valving arrangement (indicated schematically at 584 in FIG. 26) controls the flow between the chambers 575 and 576 so as to provide the vehicle damping characteristics, as generally described with the previous embodiments.

This valving assembly includes a first series of passages 585 that extend through the piston 574 from the chamber 575 to the chamber 576 and which terminate in valve seat portions 586. A plate-type check valve 587 is affixed between the piston 574 and the nut 585 and controls the opening and closing of the annular seat 586 and, accordingly, the flow from the chamber 575 to the chamber 576. No flow can occur from the chamber 576 to the chamber 575 through the passages 585 due to the nature of the check valve 587.

Flow from the chamber 576 to the chamber 575 can occur through a series of second passages 588 formed in the piston 574 and which terminate in an annular valve seat groove 589. A second plate-type check valve 591 is affixed between the post 582 and the piston 574 and controls the flow through the passages 588. When opened by adequate pressure, the plate type valve 591 will permit flow from the chamber 576 to the chamber 575. Flow in the reverse direction through the passages 588 is precluded by the check-type nature of the valve 591.

In addition to the flow permitted by the chambers 575 and 576 by the check valves 587 and 591, there is an orifice-type flow path between these chambers, as with the previously described embodiments. However, in accordance with a feature of this embodiment, the flow area of this passage can be controlled electronically in response to vehicle characteristics by a solenoid assembly, indicated generally by the reference numeral 592.

This solenoid assembly includes an outer case 593 that is threaded into a tapped opening 594 formed in the cover piece 553 and which is sealed thereto by an O-ring 595. A solenoid, indicated generally by the reference numeral 596, is potted within the housing piece 593. This solenoid 596 includes a winding 597 which encircles an armature 598 that is slidably supported within the potting material 599 that holds the winding 597 in place.

This armature 598 is engaged with a spool-type valve 601 that is slidably supported within a bore 602 formed in the post 582. The spool-type valve 601 has a through bore 600 so that it will not act as a piston and will be pressure balanced. The spool-type valve 601 controls the effective area of a flow path between the chambers 575 and 576. This flow path is defined by a plurality of radially extending passages 603 formed through the post 582 in communication with the chamber 575. In addition, a second passage or plurality of passages 604 extends through the post 582 from the bore 602 and communicates with passages 605 formed in the piston 574 which, in turn, intersects the passages 588 and thus have open communication with the chamber 576.

Figure 29:
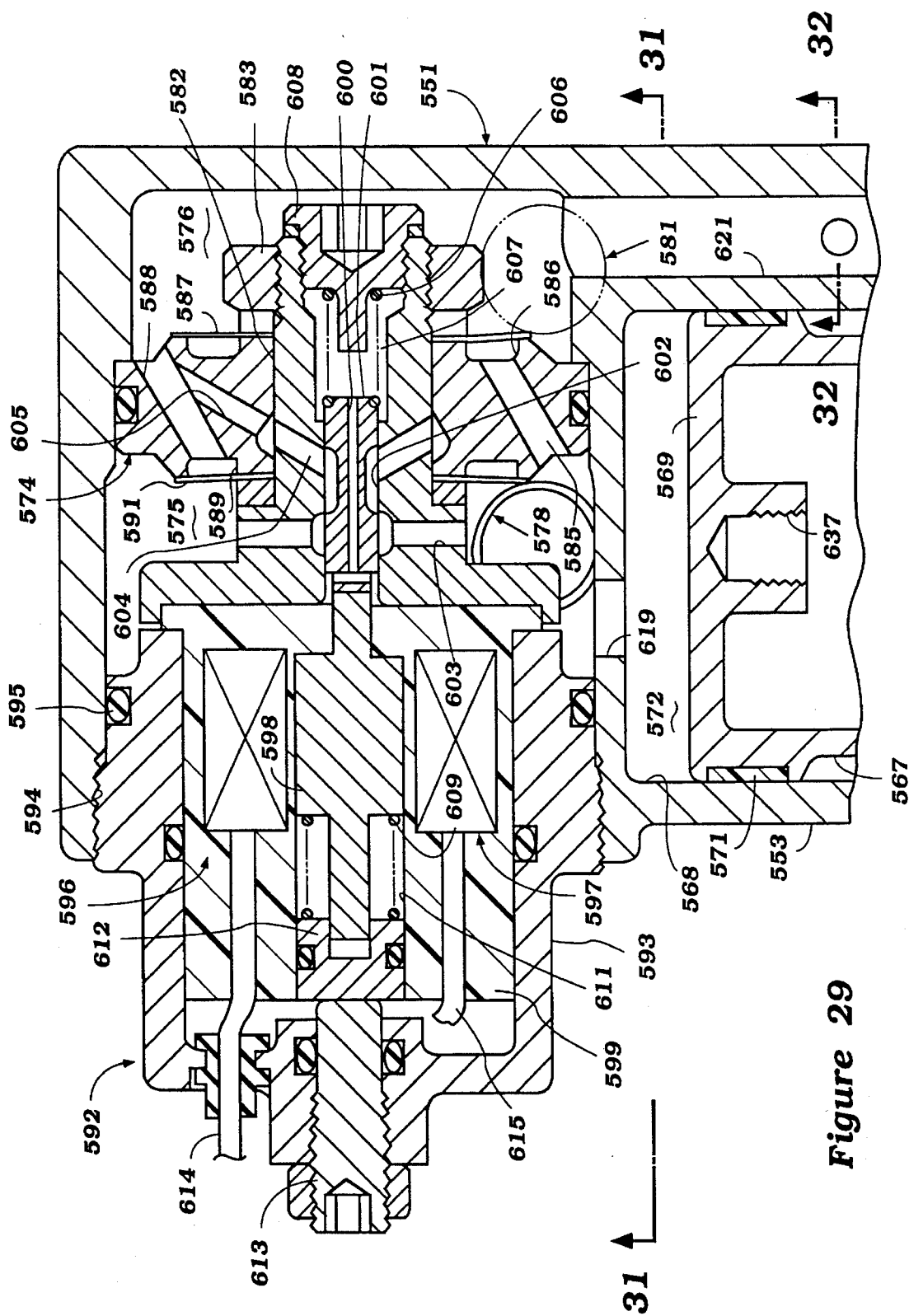
FIG. 29 is an enlarged cross-sectional view taken along the line 29—29 of FIG. 27.

A first coil compression spring 606 is received in a counterbore 607 at the outer end of the post 582 and is loaded by an adjustable stop 608. This spring 606 urges the spool-type valve 601 toward a fully opened position, as shown in the solid-line view of FIG. 33. A second coil compression spring 609 is received within a bore 611 of the potting material 599 and engages the armature 598. This spring 609 is loaded by a stop 612 which is, in turn, engaged by an adjustable screw 613 so that its tension and preload can be adjusted. The spring 609 urges the armature 598 and the valve spool 601 toward a fully closed position, as shown in FIG. 29 and in the phantom-line view of FIG. 33.

Figure 27:
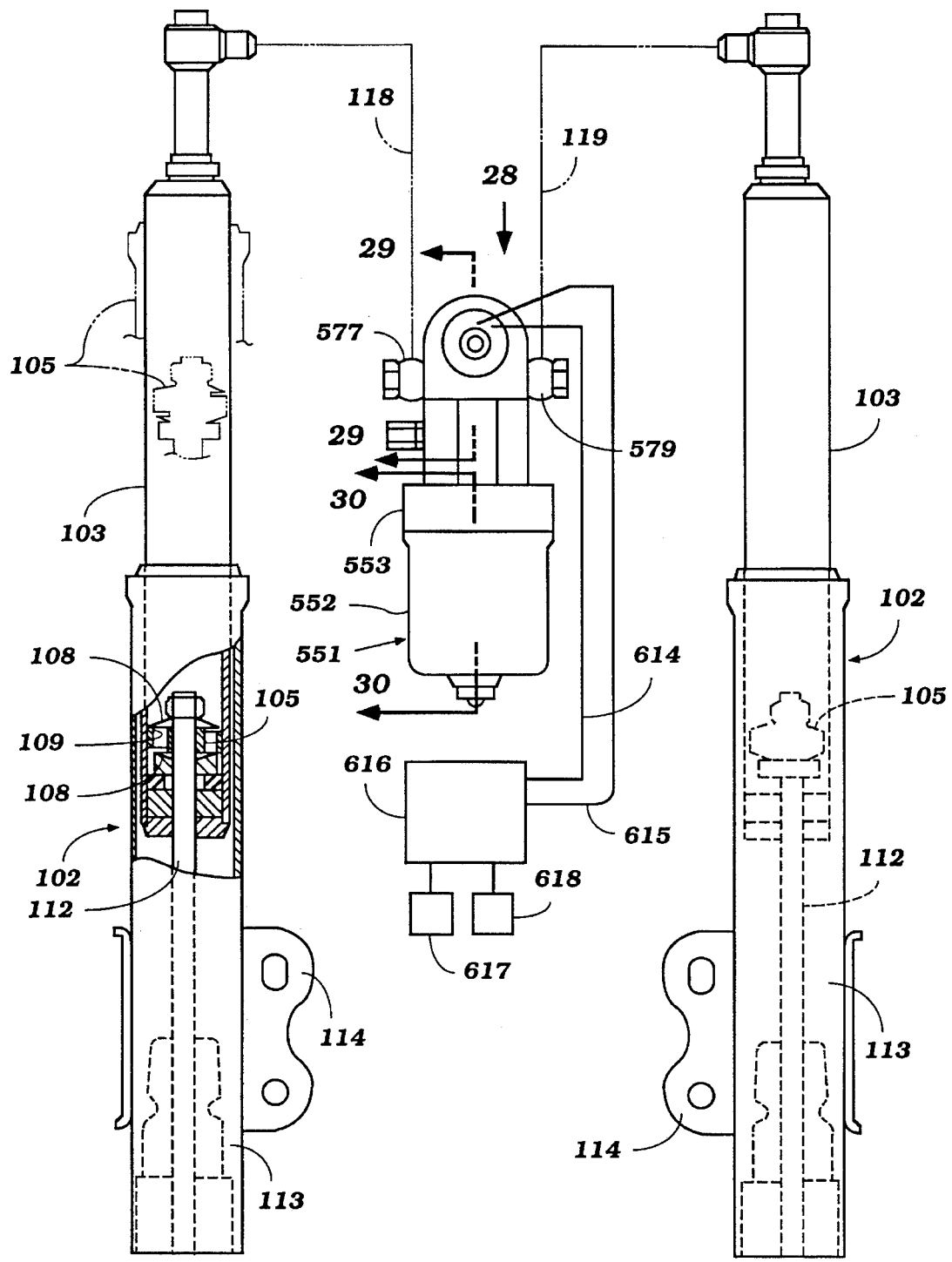
FIG. 27 is a side elevational view, in less schematic form, of the embodiment shown in FIG. 26, with a portion broken away.
Figure 28:
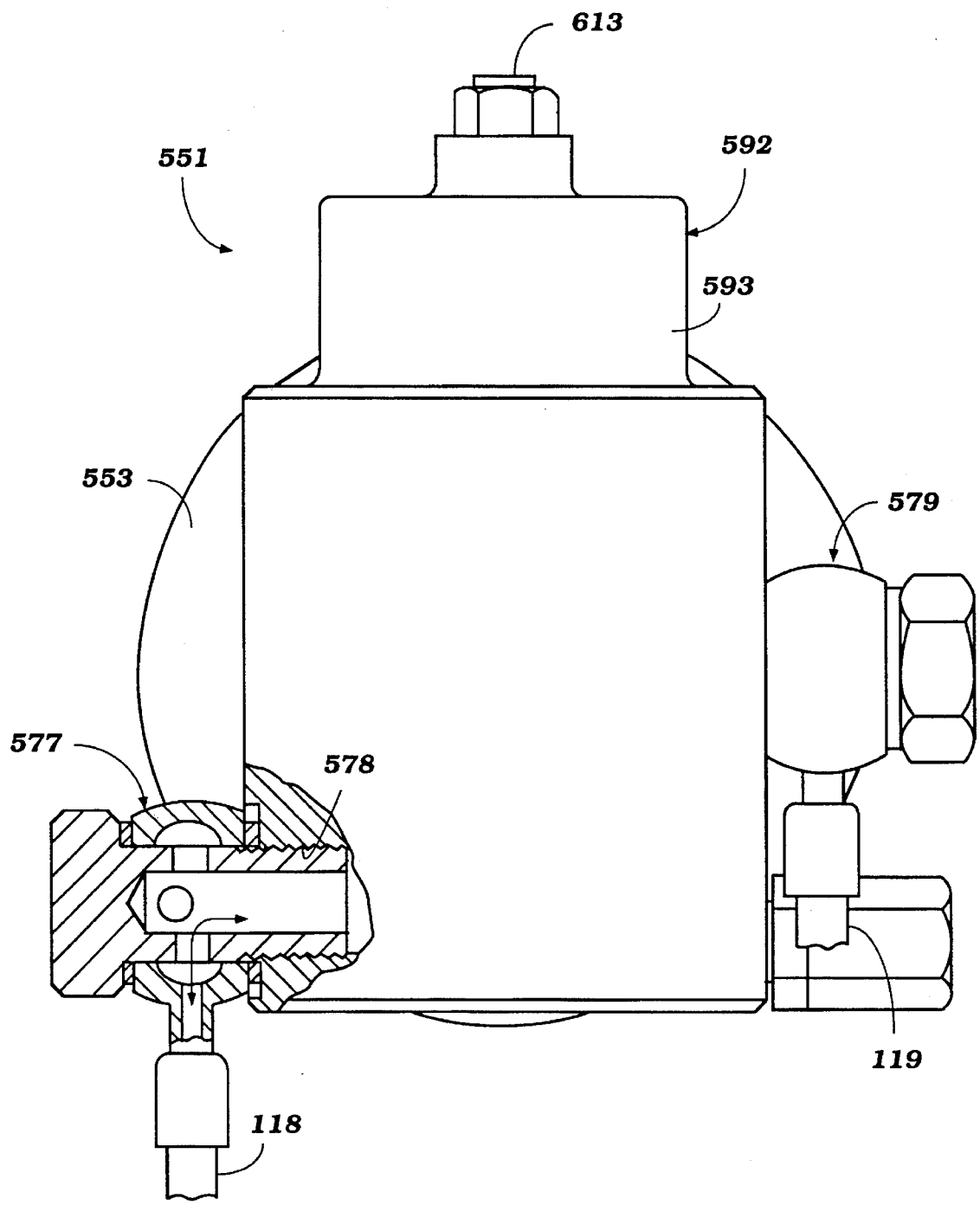
FIG. 28 is a top plane view, with portions broken away, taken in the direction of the arrow 28 in FIG. 27.

The windings of the solenoid coil 598 are connected by means of conductors 614 and 615 to a suitable control, which is shown schematically in FIG. 27 and is indicated generally by the reference numeral 616. This control 616 may be preprogrammed in accordance with any type of desired control strategy and receives signals from vehicle condition sensors, such as a vehicle speed sensor 617 and a steering angle sensor 618. This type of control is desirable when the shock absorbers 102 are associated with wheels at the opposite side of a vehicle and the pressure compensated accumulator 551 is utilized to control the rolling of a vehicle when cornering in a manner which will be described.

Figure 30:
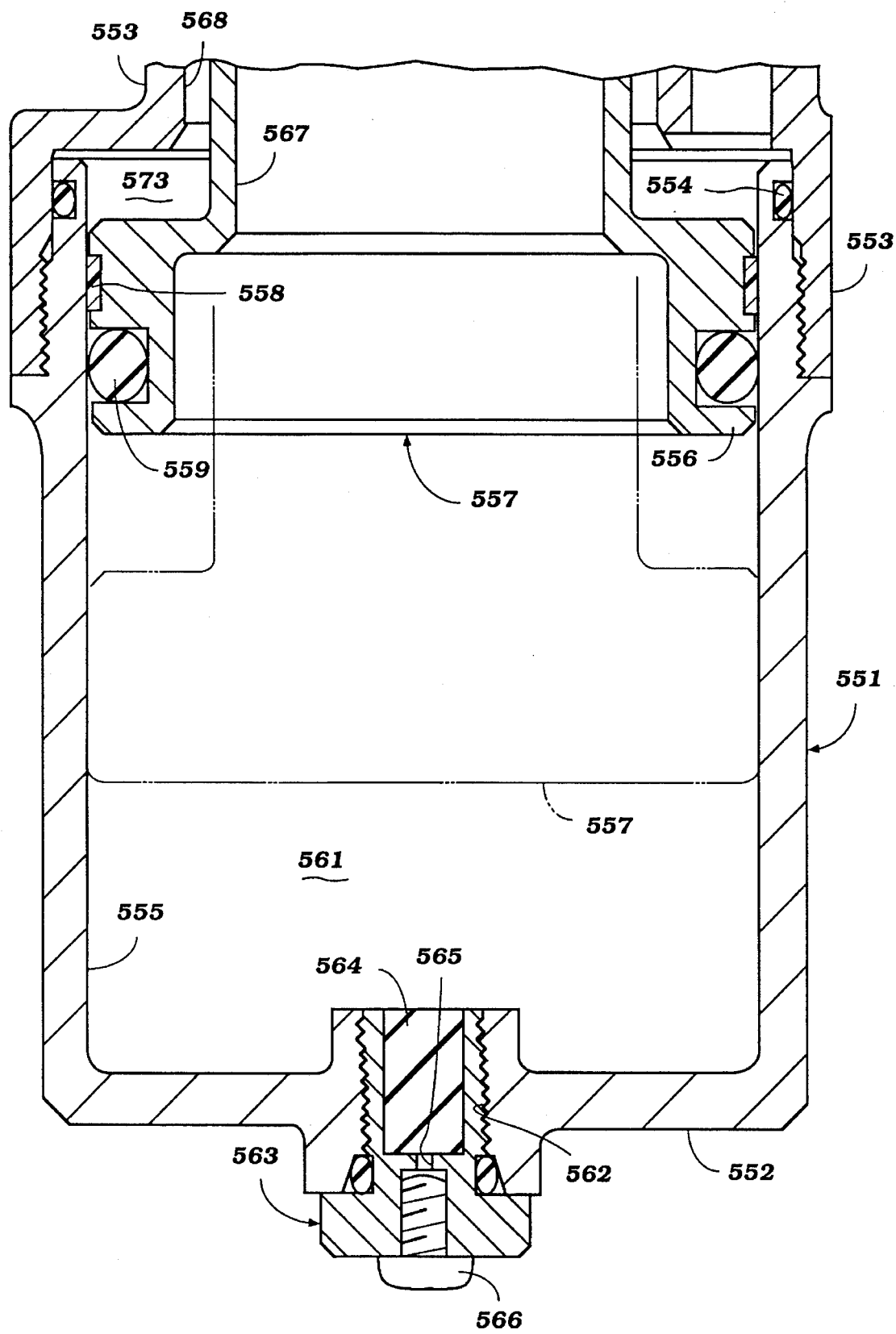
FIG. 30 is an enlarged cross-sectional view taken along the line 30—30 of FIG. 27.
Figure 31:
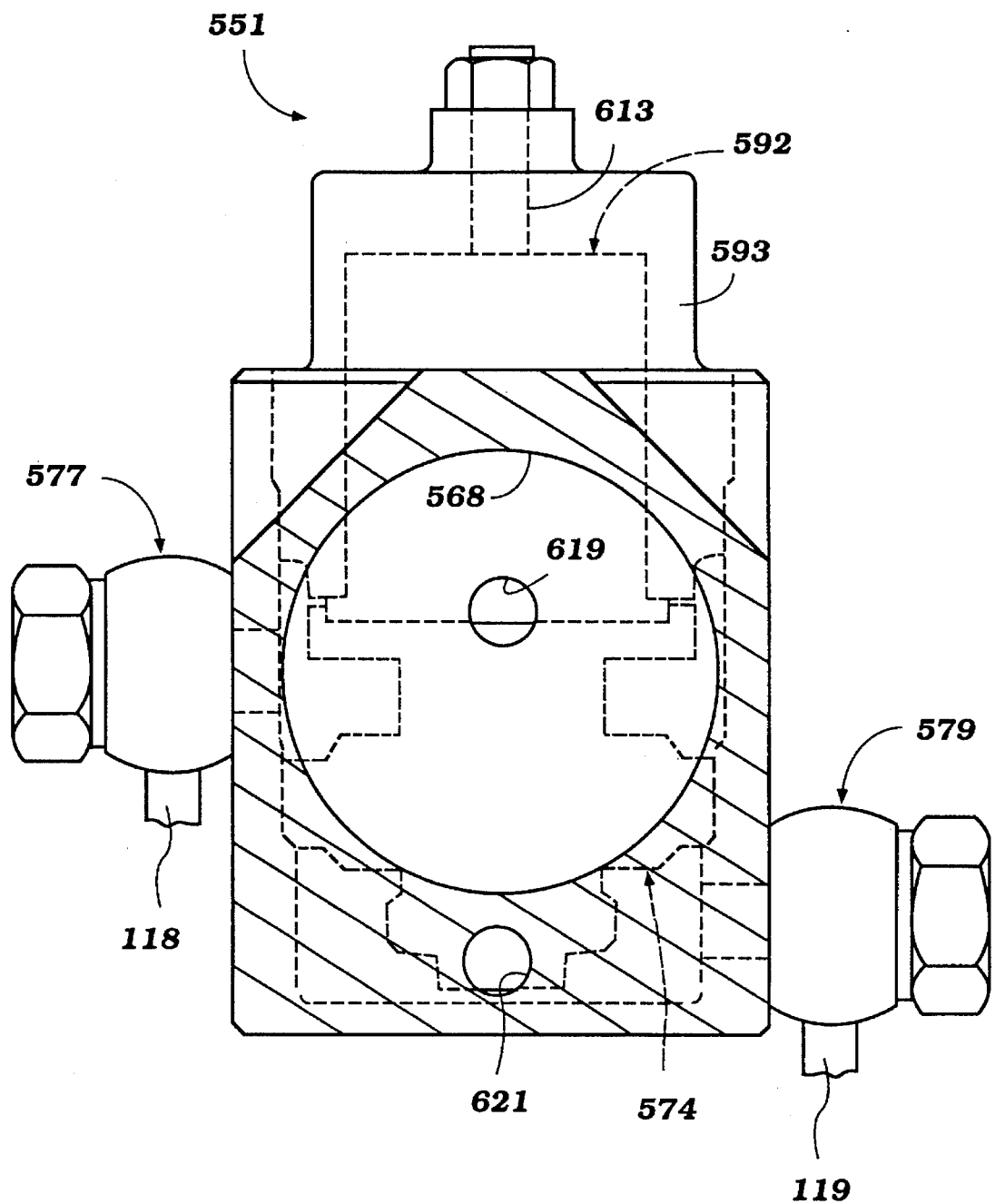
FIG. 31 is a cross-sectional view taken along the line 31—31 of FIG. 29.

The chamber 575 communicates with the chamber 572 associated with the cylindrical piston portion 569 through a passage 619 (FIGS. 29 and 31) formed integrally in the housing member 553. The chamber 576 communicates with the annular chamber 573 and acts on the annular piston 556 through a passageway 621 formed in the housing closure piece 553 and which terminates immediately adjacent the upper end of the cylinder bore 555 of the lower housing piece 552 (FIG. 30).

It should be readily apparent that by controlling the operation of the solenoid 597, the position of the spool valve 601 and the flow resistance between the chambers 575 and 576, and accordingly the side-to-side damping characteristics of the system, can be controlled externally and in response to actual vehicle conditions. Since the manner in which this damping occurs is the same as that described in conjunction with the previously described embodiments, it is not believed necessary to repeat this description.

Figure 32:
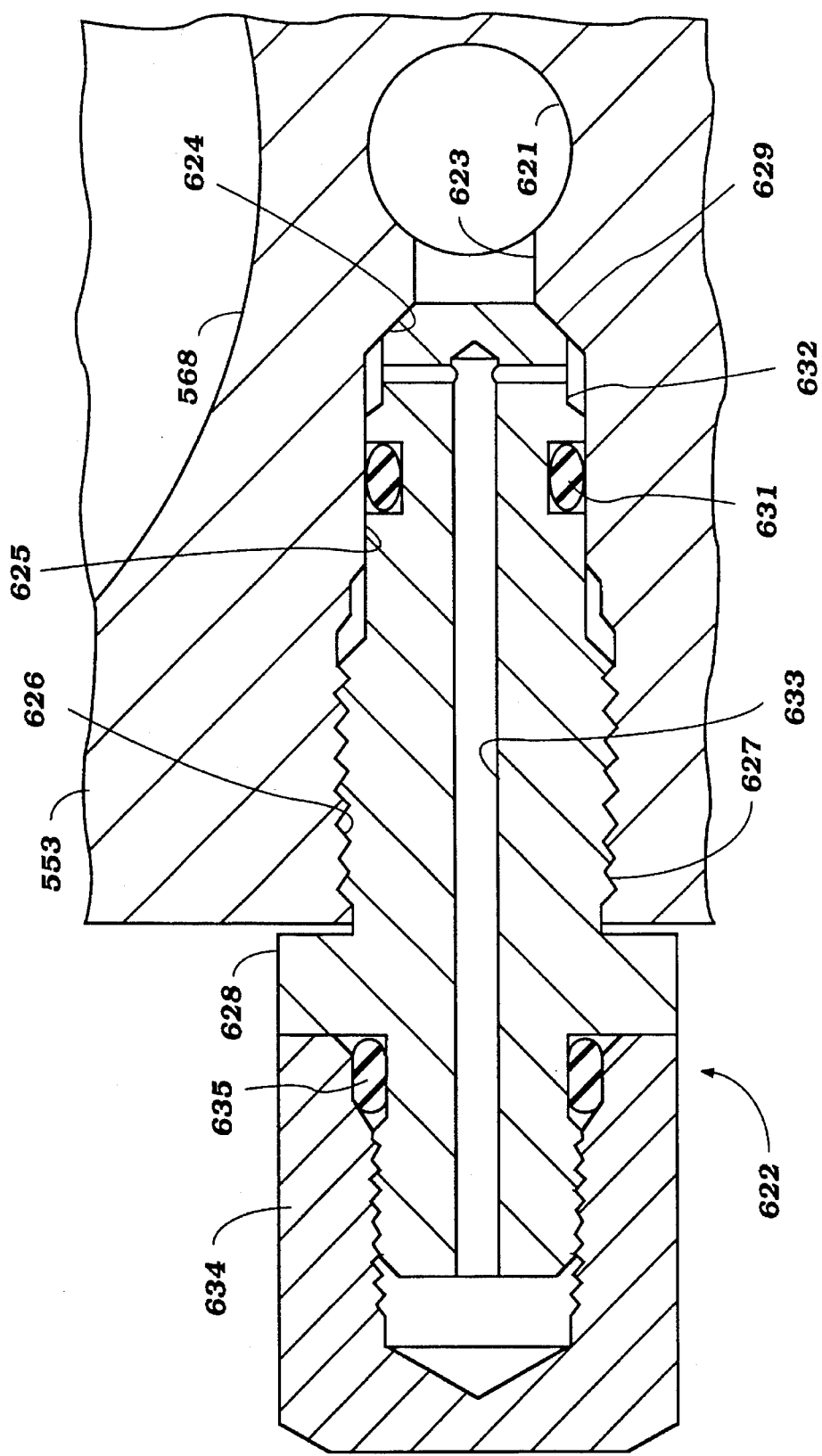
FIG. 32 is an enlarged cross-sectional view taken along the line 32—32 of FIG. 29.
Figure 33:
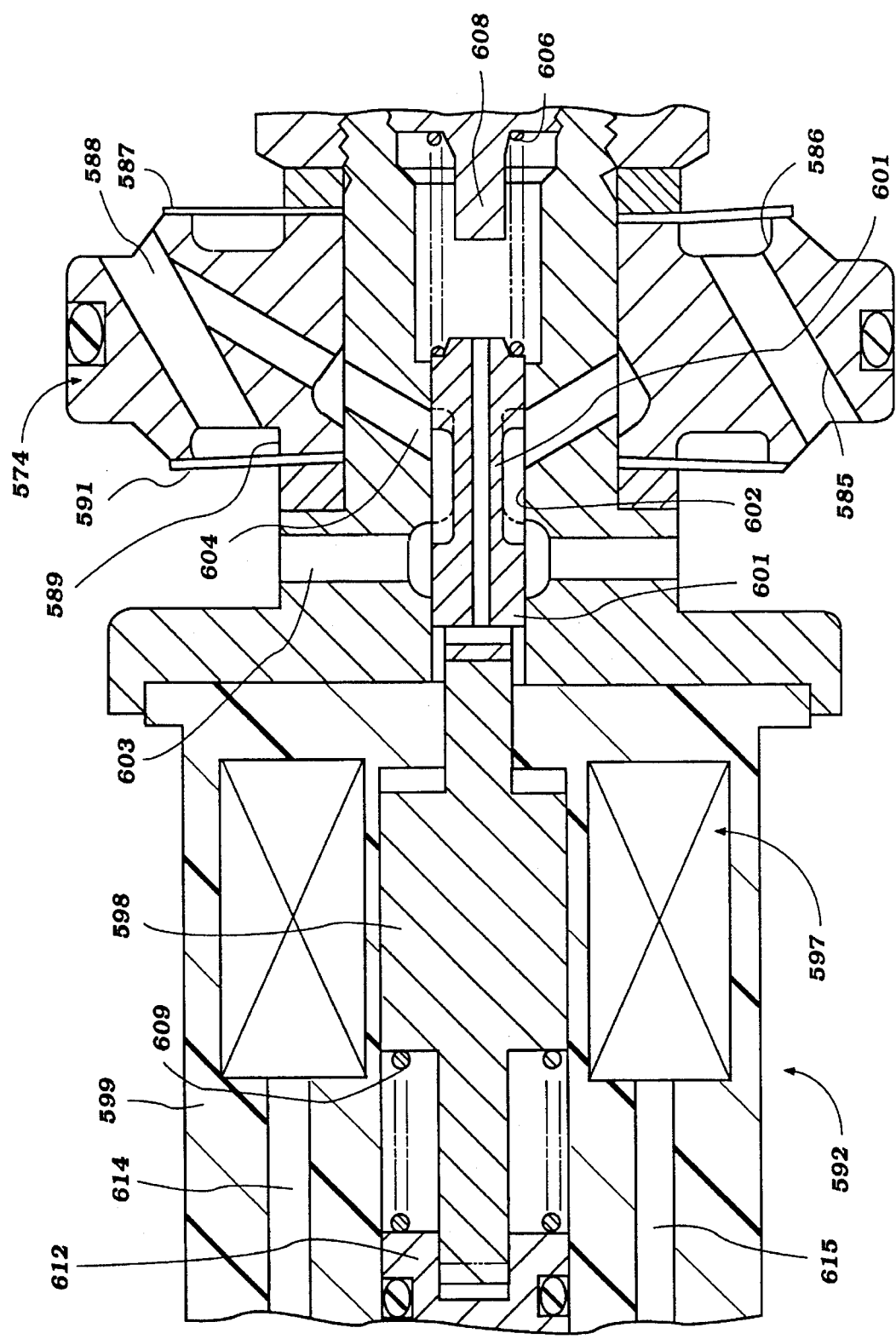
FIG. 33 is a further enlarged cross-sectional view taken along the same plane as FIG. 29 but shows in more detail the valving arrangement.

A fill fitting, shown in most detail in FIG. 32 and indicated generally by the reference numeral 662, is provided for charging the hydraulic chambers of the accumulator 551 with hydraulic fluid. This fill fitting 662 is comprised of a counterbored passage formed in the housing cover piece 553 that is comprised of a first portion 623 that intersects the passage 621 and which terminates at its other end in a tapered base 624 which acts, in a manner to be described, to form a valve seat. A larger diameter bore 625 extends through the housing piece 553 from the smaller diameter portion 623 and terminates in a tapped opening 626. A threaded portion 627 of a fill fitting element 628 is received in this opening 626 and has a head portion 629 that acts against the seat 624 so as to close it when in the position shown in FIG. 32. An O-ring seal 631 is provided in the inner end of the fill piece 628 for sealing purposes. The end adjacent the seat 629 is provided with a relief portion 632 to which fluid can be delivered through a passageway 633 extending axially through the fitting 628. The outer end of this passageway is normally closed by a closure cap 634 and O-ring seal 635.

Figure 34:
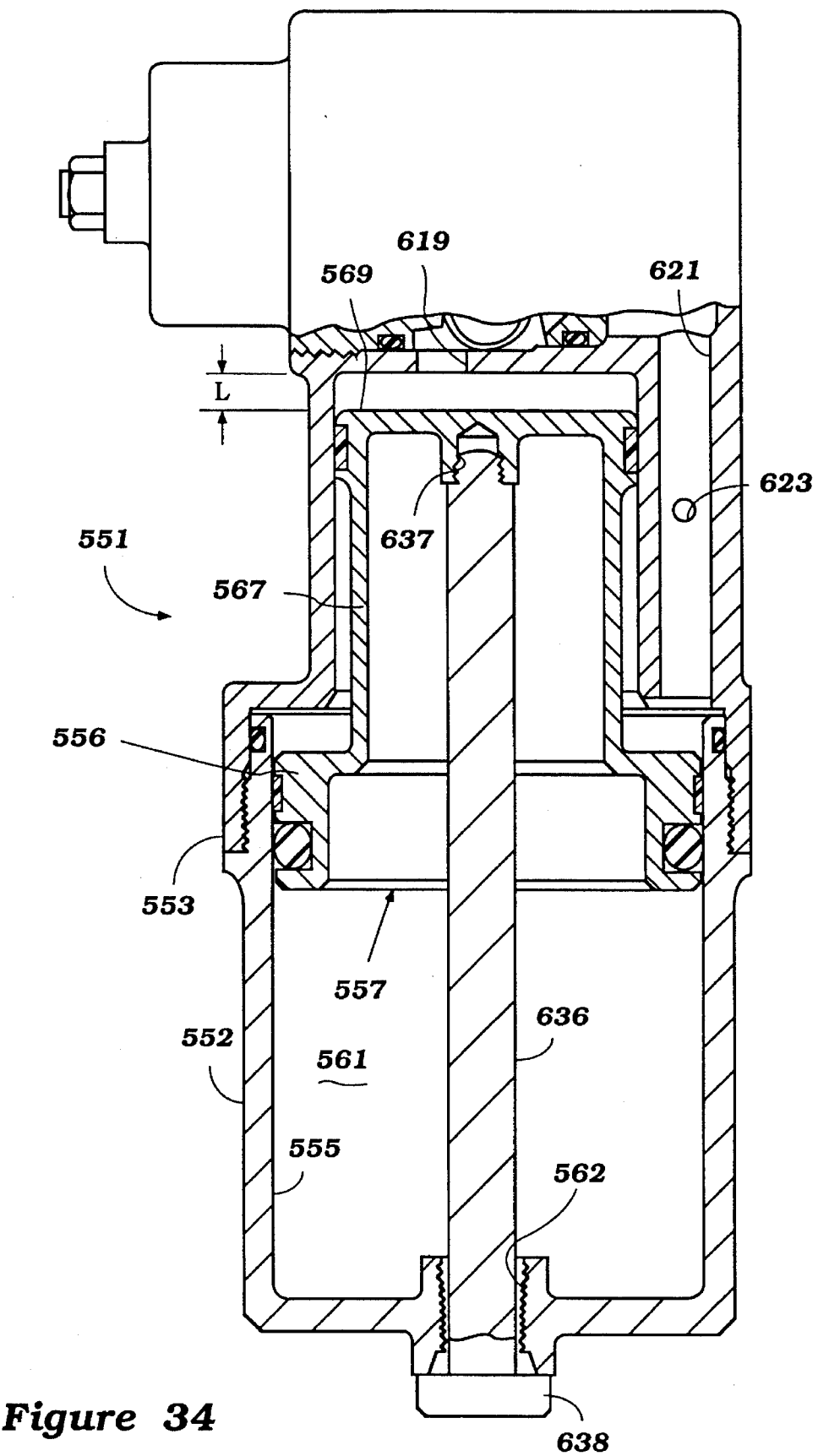
FIG. 34 is a view in part similar to FIG. 30 but on a smaller scale and shows the assembly method in accordance with a feature of the invention.

One type of assembly and fill routine which may be employed with this embodiment will be described by particular reference to FIGS. 32 and 34. The valve assembly including the piston 574 and solenoid actuator 592 are assembled to the cover piece 553. The compound piston 556 is positioned with its lower end 556 in the cylinder bore 555 of the housing piece 552. An attachment fitting comprised of an elongated post 636 is threaded into a tapped opening 637 formed in the bottom of the portion 569 of the piston 557. This attachment fitting 636 is passed through the opening 562 in the housing piece 555 by removal of the plug assembly 563.

A head 638 of the attachment fitting 636 is brought into abutting engagement with the end of the housing piece 552 and the housing pieces 552 and 553 are screwed together. As a result of the use of the attachment fitting 636, the head portion 569 of the piston 557 never contacts the end of the cover portion 563 as there is a gap "L" established by the attachment fitting 563. The system is then charged with hydraulic fluid.

One manner in which the filling can be accomplished is to elongate the shock absorbers 102 to their extreme stroke positions as shown in the solid line view of FIG. 27 and to remove the cap 634 of the fill assembly 622 (FIG. 32). An evacuate and fill apparatus is then attached to the fitting 628 after it has been screwed partially to an open position. A conventional evacuate and fill technique is then employed wherein a vacuum is first drawn on the entire hydraulic system to remove any air from it. Then hydraulic fluid is permitted to flow through the fitting 628 and fill the system. The fitting 628 is then closed, the evacuate and fill apparatus removed and the cap 634 put in position.

Because of this filling technique, the piston 557 will not be at the end of its stroke and hence there will be an initial amount of fluid in the system which can make up for any fluid which may be lost from the shock absorbers 102 in use. Of course, after the system is filled with hydraulic fluid, the system is charged with the inert gas. This is done by inserting the plug 563 (FIG. 30) and removing the small closure plug 566. A needle is then passed through the member 564 and the system is pressurized with the inert gas to the desired pressure. The needle is then removed and the opening will be sealed by the material 564. The closure plug 566 can then be reinserted.

Figure 35:
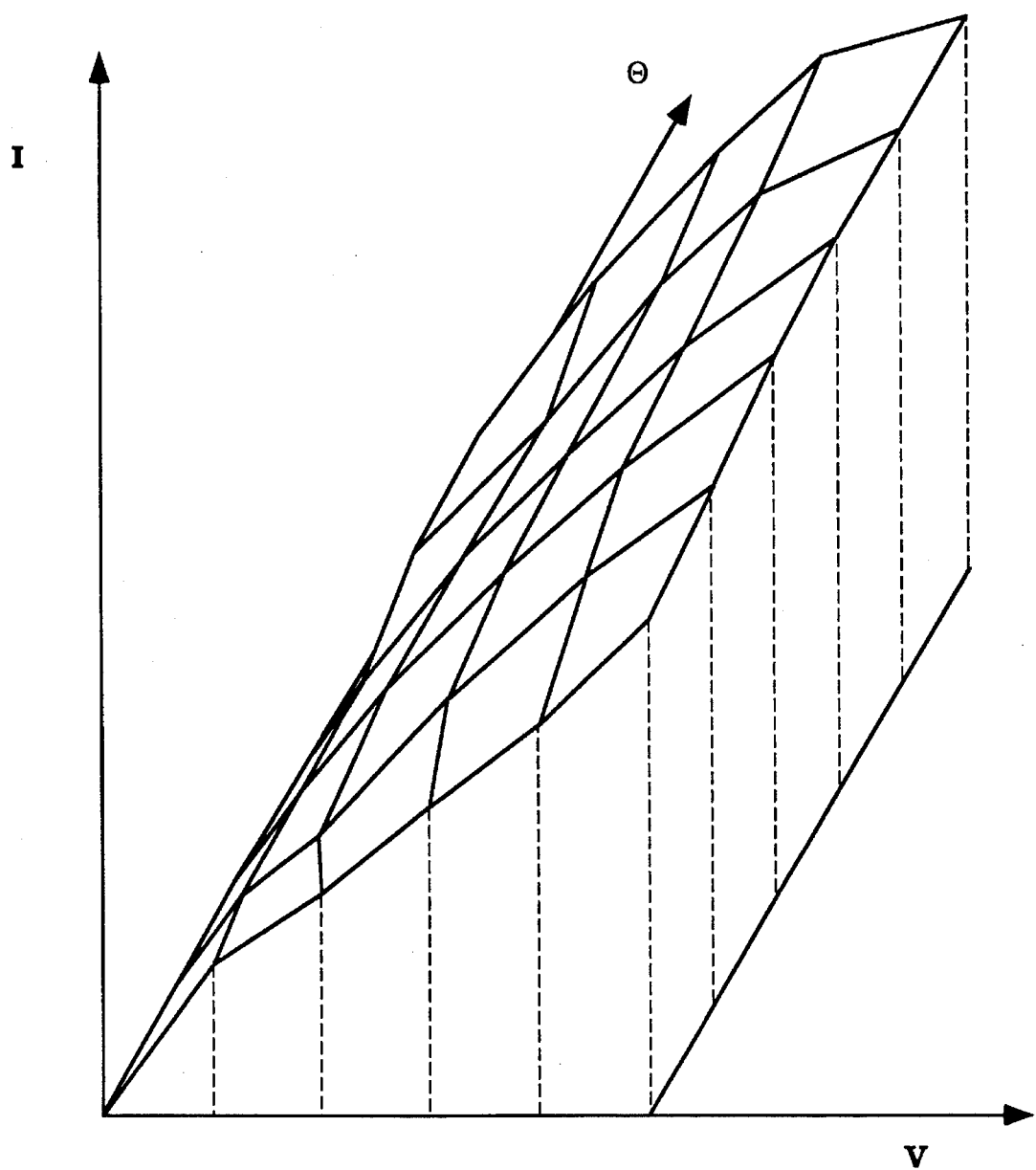
FIG. 35 is a graphical view showing the three dimensional map of the damping characteristics of this embodiment.

It has been noted that the damping characteristics through the interconnecting passageway can be controlled electrically by actuating the solenoid arrangement 592. The one way in which this may be done will now be described by reference to FIGS. 29, 33 and 35. FIG. 35 is a map showing the solenoid current I in response to the sensed vehicle conditions which, in the described embodiment, are vehicle velocity V and steering angle $\beta$ sensed by the sensors 617 and 618, respectively. As may be seen in FIGS. 29 and 33, when no current flows through the solenoid coil 597, the valve element 601 will be moved to a fully closed position since the spring 609 is stronger than the spring 607. As greater amounts of electric current are passed through the solenoid lining 597, the valve elements 601 will be opened progressively and this will reduce the flow resistance between the chambers 575 and 576. Of course, this control routine may be varied depending upon the vehicle application.

Vehicle Applications

Like the previously described embodiments, this embodiment may be employed a number of different ways in an associated motor vehicle. In addition, rather than having the upper chambers 106 of the shock absorbers 102 interconnected through the pressure compensating accumulator 551 as shown in these figures, the lower chambers may be connected as shown in the phantom line view of FIG. 26. The connecting passages 118' and 119' can be utilized in lieu of the passages 118 and 119 of the previous embodiment.

Figure 37:
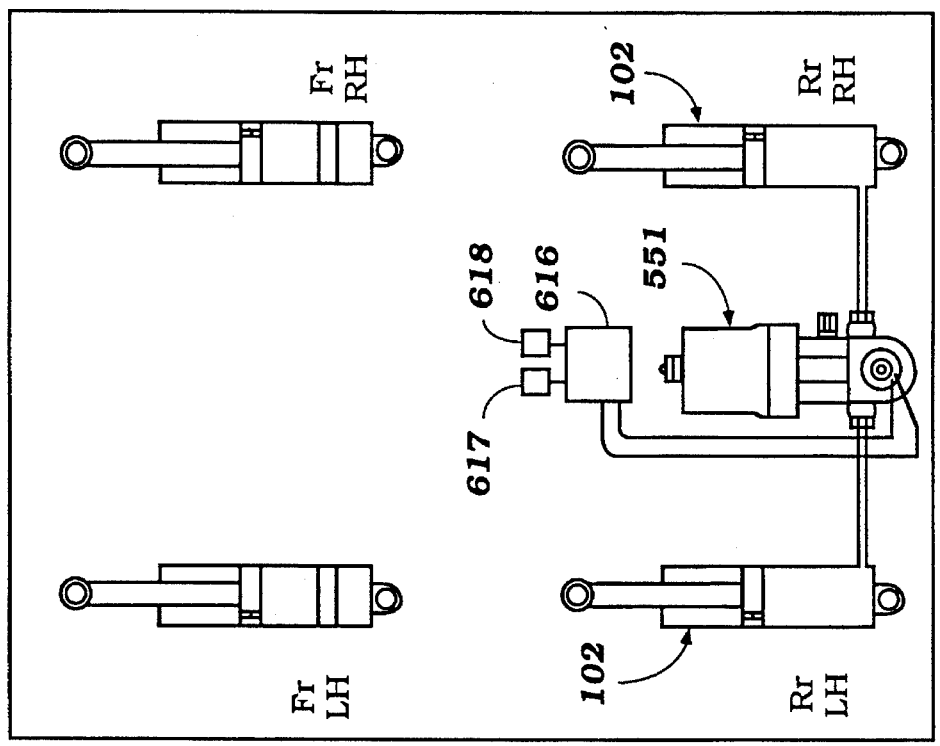
FIGS. 36–42 are schematic views of automotive suspension system showing various ways in which the embodiment of FIGS. 26–35 may be incorporated in an automotive suspension system.
Figure 36:
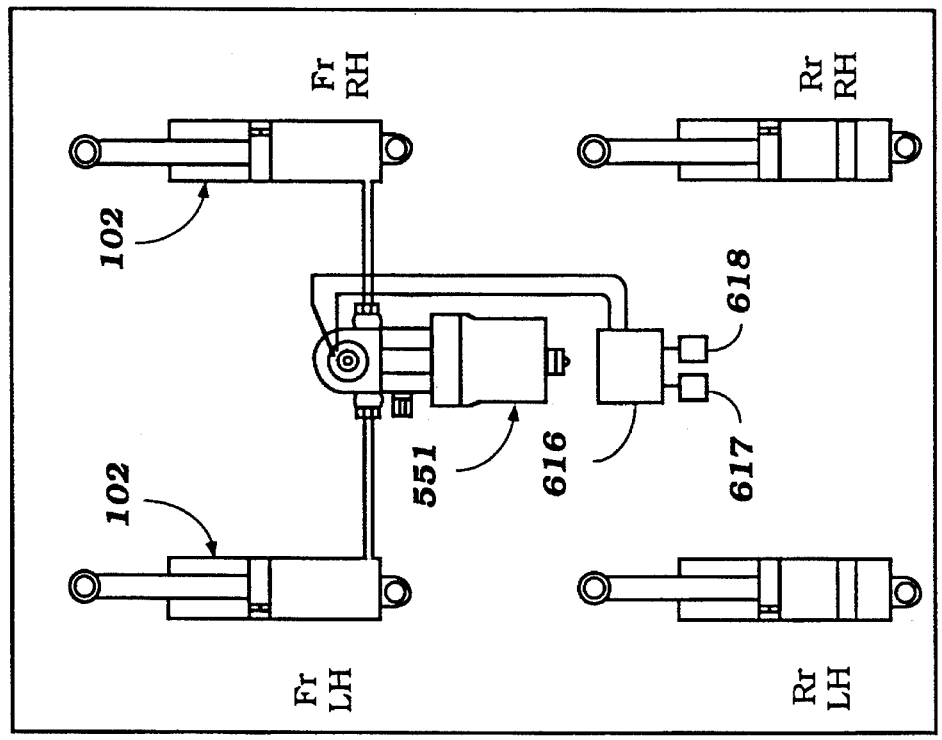

Also, the application to the vehicle can be varied and FIGS. 36–42 show various arrangements wherein the unit 551 is interposed in various vehicular relationships to achieve various purposes. For example, FIG. 36 shows a connection between the front wheels of a four wheel vehicle and thus shows the remaining wheels of the embodiment already described. FIG. 37 shows a connection between the rear wheels. These two embodiments are useful in providing for roll resistance.

Figure 38:
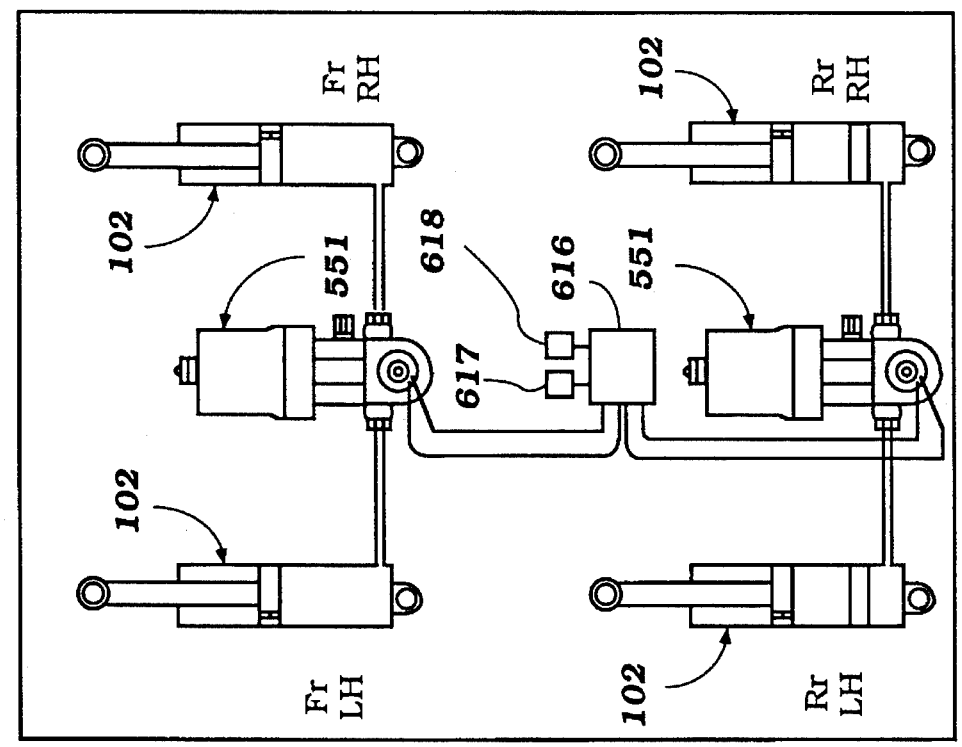

FIG. 38 is another embodiment wherein roll resistance can be achieved and in this embodiment there is a connection between both the front and rear wheels each having its own pressure compensating accumulator 551.

Figure 39:
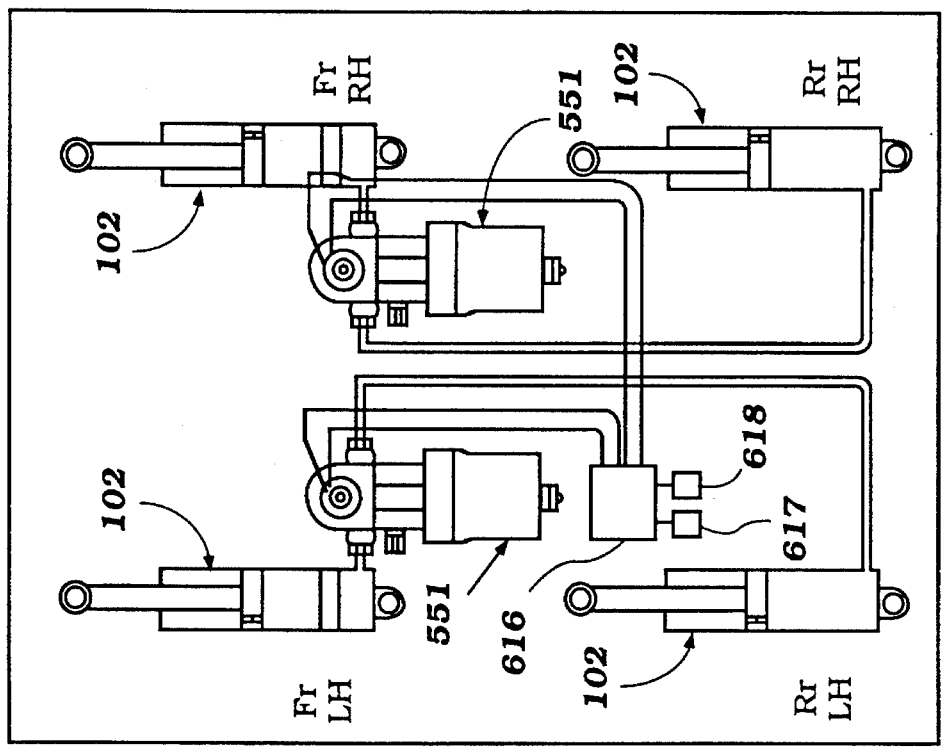

FIG. 39 shows an embodiment wherein pitching control is provided. In this embodiment, the shock absorbers 102 at each side of the vehicle are connected to respective pressure compensating accumulators 551 each of which is controlled by the same ECU 616 in response to various vehicle inputs.

Figure 40:
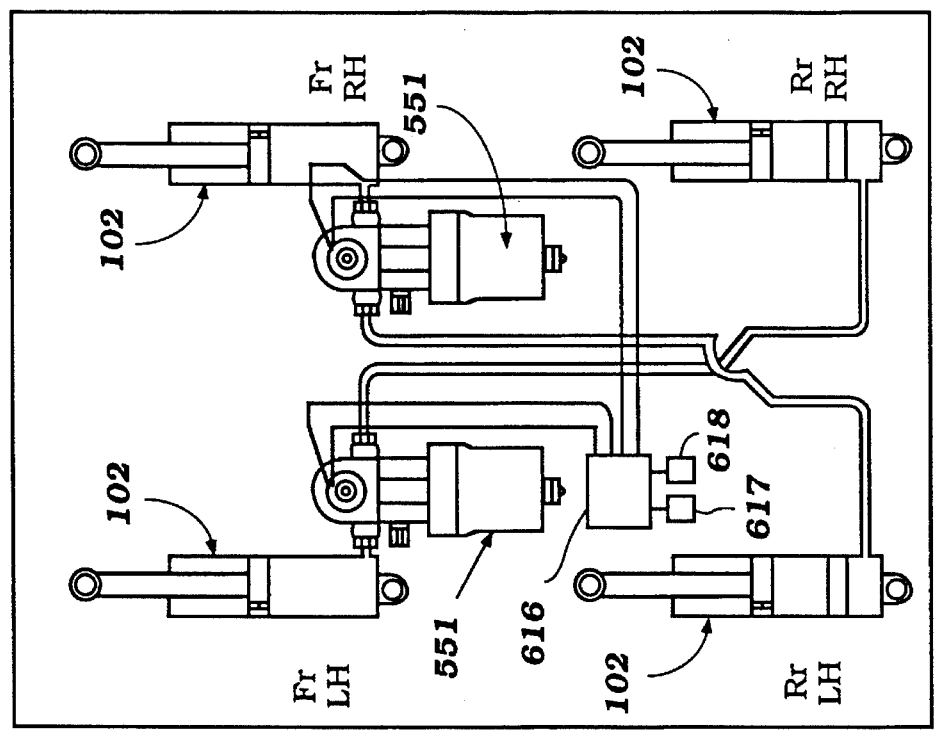

FIG. 40 shows an embodiment wherein the shock absorbers at the corners of the vehicles are cross-connected. That is, the left front is connected through an accumulator chamber 551 to the right rear and the right front is connected through a separate pressure compensating accumulator 551 to the left rear. This arrangement, as has been previously noted, is effective for controlling both pitch and roll.

Figure 41:
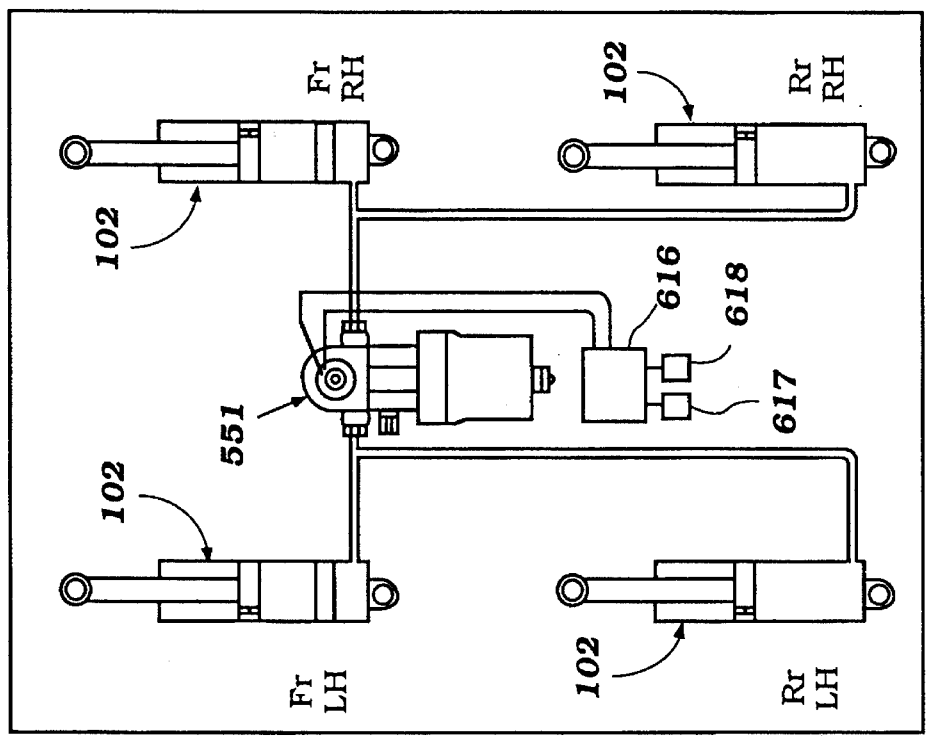

FIG. 41 shows an arrangement wherein a single pressure compensating accumulator 551 controlled by a single controller 615 is connected between pairs of shock absorbers at the left- and right-hand side of the vehicle so as to provide roll resistance using only a single pressure compensating accumulator. This system, as also previously described, also permits improvement in individual wheel damping.

Figure 42:
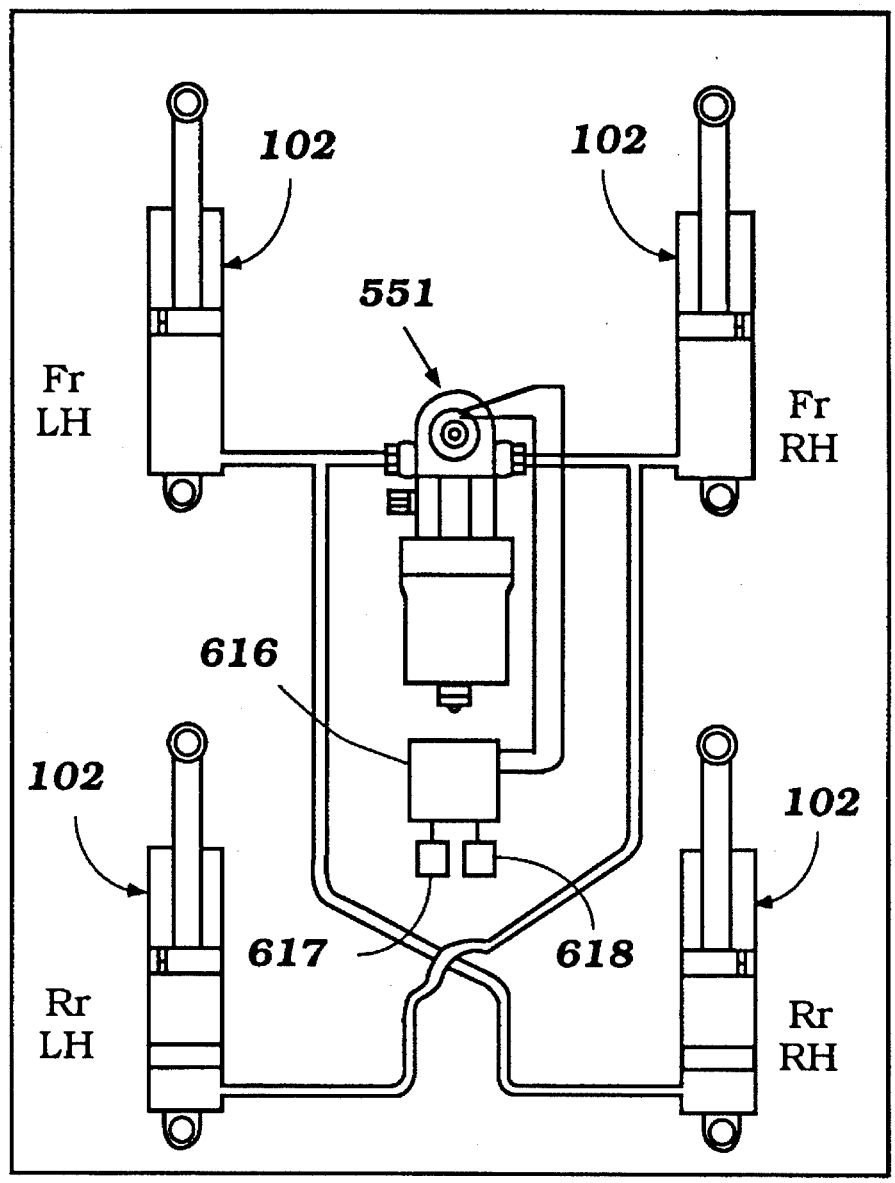

FIG. 42 is another embodiment wherein only one pressure adjusting accumulator 551 is employed with one branch of the accumulator being communicated with the shock absorbers at the front and crossed side rear (left front right rear, right front left rear) arrangement.

Figure 43:
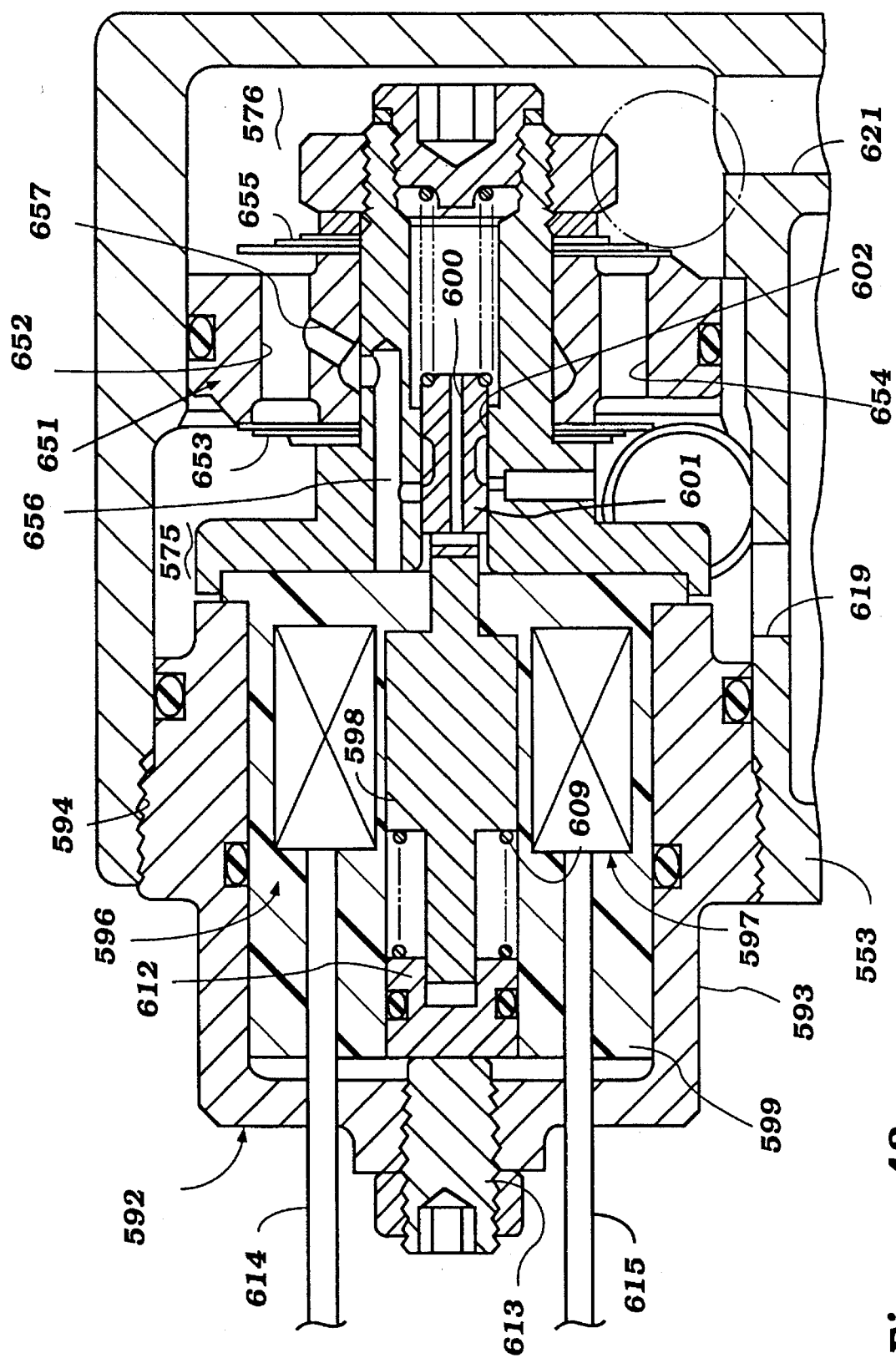
FIG. 43 is a cross-sectional view, in part similar to FIG. 29 and shows another embodiment of the invention.

Embodiment of FIG. 43

FIG. 43 is a cross-sectional view, in part similar to FIG. 29, and shows a still further embodiment of the invention.

This embodiment differs from the embodiment of FIGS. 26–35 only in the construction of the piston which divides the chambers 575 and 576 from each other and its check valve arrangement. For that reason, only a single figure of drawings is necessary to show this embodiment. In addition, where components are the same or substantially the same as the previously described embodiment, they have been identified by the same reference numerals and will not be described again, except where necessary to understand the construction and operation of this embodiment.

This embodiment employs a stepped-type piston 651 having a first series of axially extending passages 652 that are controlled by a plate-type check valve assembly 653. These check valves control the flow from the chamber 576 to the chamber 575.

A second series of axial passages 654 extend through the piston 651 from the chamber 575 to the chamber 576 and have their opening controlled by a plate-type check valve assembly 655.

In this embodiment, a bypass passageway 656 extends from a transverse drilling 657 in the piston 651 to the valve element 601. This passageway 656 extends through to the end of the body so that the end of the spool-type valve 601 will be exposed to the hydraulic pressure so that the pressure will not act upon the valve 601 to urge it in one direction or the other. Like the previously described embodiment, the valve element 601 has a through passage 600 so as to ensure that it will also not act as a piston when it operates.

Figure 44:
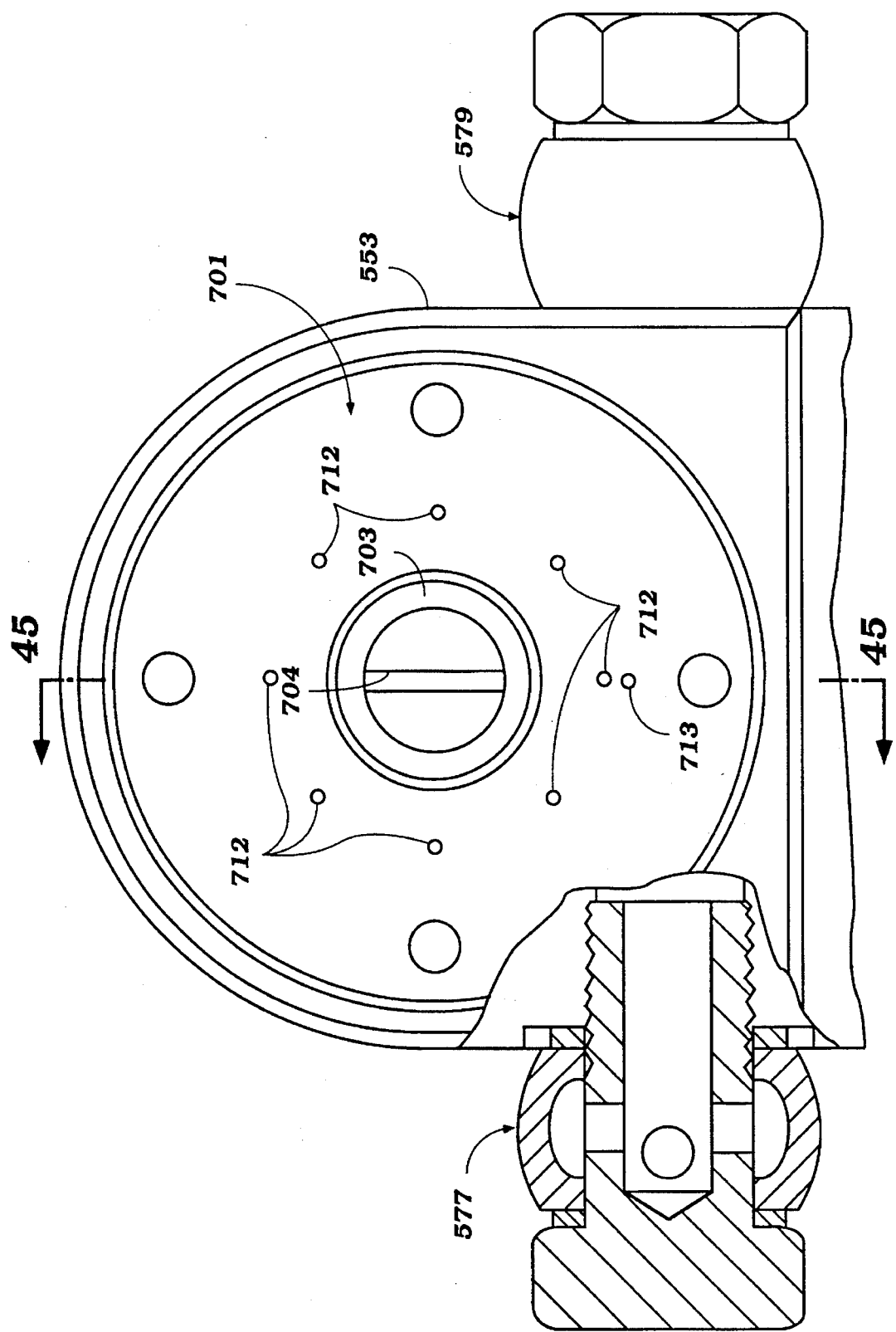
FIG. 44 is a top plane view, with a portion broken away, of another embodiment of the invention.
Figure 45:
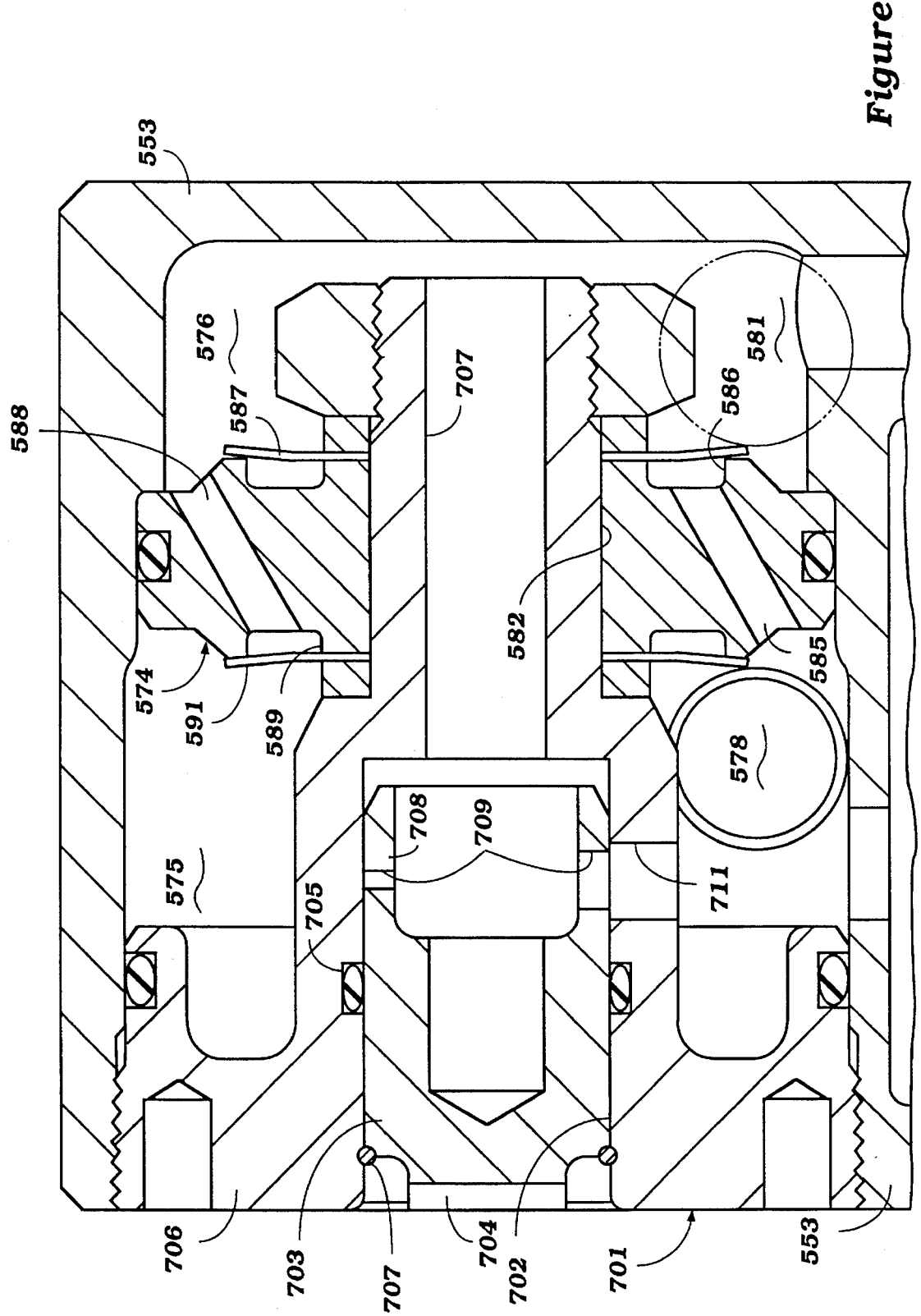
FIG. 45 is a cross-sectional view taken along the line 45—45 of FIG. 44.

Embodiment of FIGS. 44 and 45

FIGS. 44 and 45 show another embodiment of the invention which is generally similar to the embodiment of FIGS. 26–35. However, in this embodiment, the electrically controlled bypass valve is not employed and a rotary manual type of valve is utilized. Because of the similarity of this embodiment to that previously described, only two views are believed to be necessary to understand the construction and operation of this embodiment. These two views comprise FIG. 44 which is a view looking in the direction of FIG. 27 and FIG. 45 which is a cross-sectional view taken along the line 45—45 of FIG. 44. Because of the similarity to the previous embodiment, components which are the same have been identified by the same reference numerals and will not be described again.

In this embodiment, the solenoid assembly 592 is replaced by a closure plate 701 that has an internal bore 702 that journals a rotary valve element 703 that has a slotted end 704 so that it can be turned by a suitable tool.

An O-ring seal 705 is contained within a groove formed in an end part 706 of the end piece 701 and provides a fluid tight seal with the valve element 703. In addition, this O-ring seal 705 will put sufficient drag on the valve element 703 so that it will not rotate unless manually turned. A circle clip 707 retains the valve element 703 in the bore 704.

In this embodiment, the post 582 is formed integrally with the end plate 701 and has a bore 707 which communicates with the cavity 576 and the bore 702 in which the valve element 703 is positioned. The valve element 703 has a hollow end portion 708 through which a plurality of radially extending holes of different size 709 are formed. In the illustrated embodiment, there are eight radially extending circumferentially spaced holes 709 each having a diameter different from the others.

By rotating the valve element 703, a selected one of the holes 709 may be brought into registry with a passageway 711 that is formed in the end plate 701 and which terminates in the cavity 575. Accordingly, the size of the opening 709 will control the flow restriction between the cavity 575 and the cavity 576 through the flow path comprised of the bore 707, bore 702, opening 708 in the valve element 703 and the selected passageway 709.

A series of index openings 712 are formed around the periphery of the end closure 701 outwardly of the valve element 703 so as to permit the operator to determine the setting of the valve element 703 and to adjust it, if desired. A further index hole 713 is positioned adjacent one of the holes 712 so as to indicate a home or start position.

Embodiment of FIGS. 46–49

FIGS. 46–49 show another embodiment of the invention as may be utilized in a suspension system for a vehicle. This embodiment differs from the previously described embodiments in that the pressure compensating accumulator, which has been shown as a separate element in most of the preceding embodiments (all but the alternative embodiment of FIG. 20), is formed integrally within one of the shock absorbers.

In this embodiment, the shock absorbers comprise a first shock absorber 751 and a second shock absorber 752, each associated with a respective wheel of the vehicle in a manner previously described. In this embodiment, however, the shock absorbers 751 and 752 may have their outer cylinders, indicated generally by the reference numeral 753, formed with a trunion portion 754 for attachment to the vehicle wheel or a suspension element for the vehicle wheel. Each of the shock absorbers 751 and 752 is provided with a piston 755 which divides the internal chamber of the cylinder 753 into first and second fluid chambers 756 and 757, respectively. The piston 755 is connected to a piston rod 758 which extends through the chamber 757 and which has its outer end 759 constructed so as to accommodate attachment to the frame or body of the vehicle in a well known manner.

The piston 755 for each shock absorber 751 and 752 has a first series of passages 761 the flow through which is controlled by a plate-type check valve 762. The passages 761 and check valve 762 permits flow from the chamber 756 to the chamber 757. Another series of passages 763 extend through the piston 755 and are valved by a plate-type check valve 764. These passages permit flow from the chamber 757 to the chamber 756 but preclude reverse flow.

The piston rod 758 is formed with a bore 765 that communicates the chamber 756 with the chamber 757. A needle-type metering valve 766 controls the effective size of the passage 765 and is slidably supported within the piston rod 758. The needle valve 766 has an elongated shank portion 767 which extends to the top of the piston rod adjacent the connecting end 759. The upper end of this connecting rod 767 is threaded as at 768 so that it can be adjusted so as to adjust the size of the bypass flow passage between the chambers 756 and 757 to provide tuning for the shock absorbers 751 and 752. A removable end cap 769 is threaded into the piston rod end 759 so as to protect the screw 768 and avoid inadvertent adjustment thereof.

The pressure balance accumulator assembly constructed in accordance with this embodiment of the invention is indicated generally by the reference numeral 771 and is formed integrally with the left-hand shock absorber 751, although obviously it could be formed integrally with either shock absorber 751 or 752. To achieve this construction and facilitate it, the cylinder 753 of the shock absorber 751 is formed with an end piece 772 which also forms a housing for the pressure balance accumulator 771. A first cylinder bore 773 is formed in this housing piece 772 and is open at its upper end.

A cylindrical sleeve portion 774 is affixed to the upper end of the housing 772 in an appropriate manner. An end closure 775 closes the upper end of the tubular member 774 and it includes a fill device including an elastic body 776 that is received in an opening 777 in the end piece 775 and in which a removable closure 778 is provided for filling in the manner already described.

The housing piece 775 is held in place by a circle clip 779 and an O-ring seal 781 is disposed below it so as to seal a further cylinder bore 782 formed by the tubular member 774 which has a larger diameter than the cylinder bore 773 of the lower housing 772.

A compound piston, indicated generally by the reference numeral 783, is positioned internally in the accumulator 771. This piston 783 includes a first, larger diameter annular piston 784 that carries a piston ring 785 and O-ring seal 786 for sealing engagement with the cylinder bore 782. The piston portion 784 defines an accumulator chamber 786 between the end closure 775 and the cylinder bore 782 that is filled in the manner already described with an inert pressurized gas such as nitrogen.

The piston 783 has a downwardly extending projection 787 that extends into the cylinder bore 773 and on which a second piston, indicated generally by the reference numeral 788, is affixed by means of a nut 789. The piston 788 defines a pair of fluid chambers comprised of a lower fluid chamber 791 and an upper fluid chamber 792. The chamber 792 communicates with the chamber 756 of the shock absorber 751 via a passage 793 formed integrally in the housing piece 772. This fluid chamber acts over an effective piston area of the piston portion 787 which is equal to its outer diameter less the effective cross-sectional area of the lower piston 788, as with the other similar embodiments.

The lower chamber 791 and specifically the housing portion 772 is provided with an opening 794 to which a fitting 795 is attached so as to be connected to a fluid conduit 796 that extends to the lower chamber 756 of the interconnected shock absorber 752.

A first series of passages 797 extend from the chamber 792 to the chamber 791 through the piston 788. An annular groove 798 is formed at the lower end of the piston and communicates with the passages 797. A plate-type check valve 799 is fixed between the piston 788 and nut 789 and controls the flow through the passages 797 from the chamber 792 to the chamber 791.

A second series of passages 801 extend through the piston 788 from the chamber 791 to the chamber 792 and terminate in an annular groove 802. A second pressure responsive check valve of the plate-type 803 is fixed between the piston 788 and the extending portion 787 of the composite piston assembly 783 and controls the pressure at which fluid is permitted to flow from the chamber 791 to the chamber 792.

If desired, an appropriately sized bleed passage 804 may extend through the piston 788 from the chamber 791 to one of the passages 797 so as to permit restricted flow between the chamber 791 and 792 regardless of whether the check valves 799 or 803 are open. This performs the same function as the needle valve of fixed size bypass passages in the previous embodiments.

Figure 47:
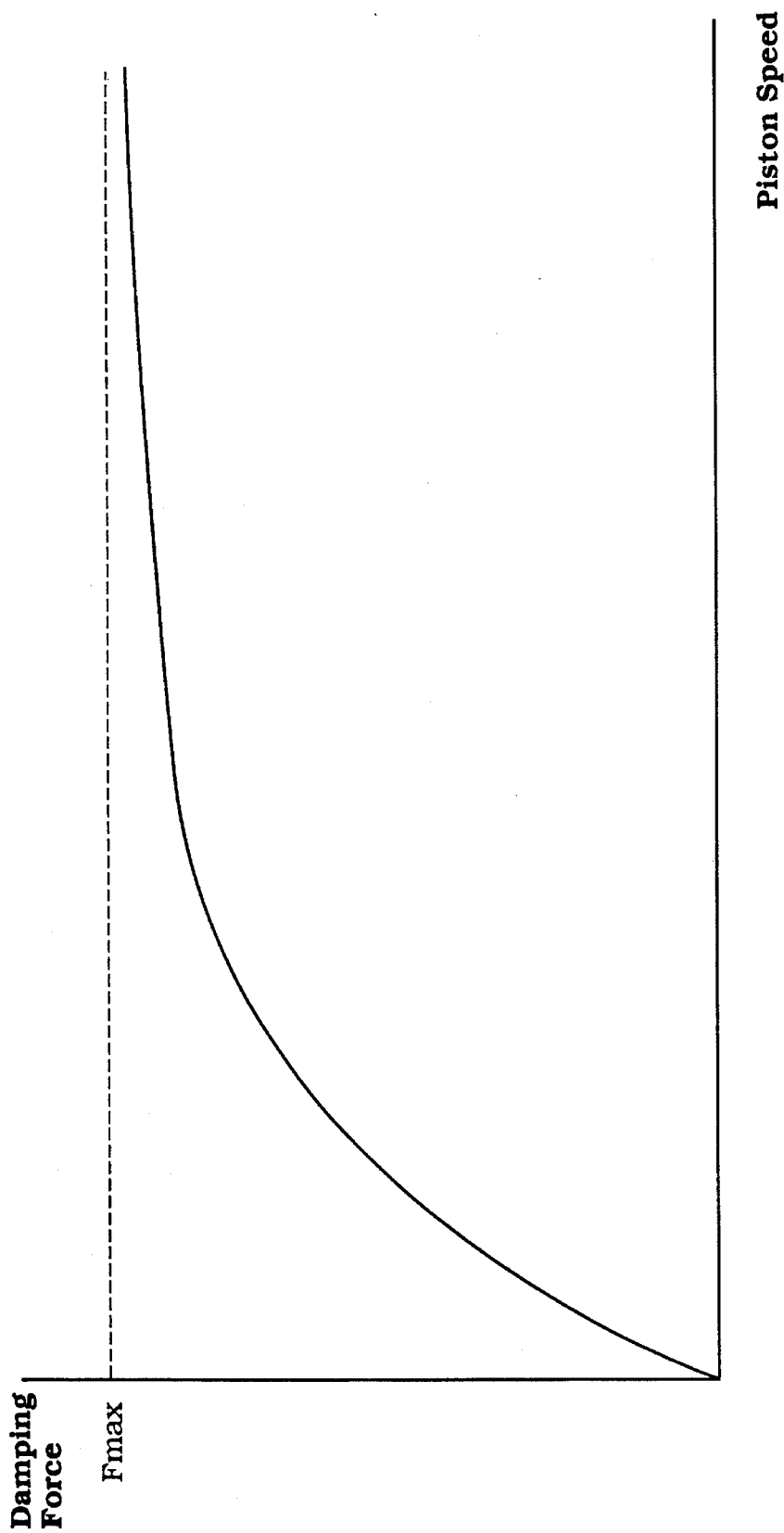
FIG. 47 is a graphical view showing the damping force in relation to piston speed difference between the two interconnected hydraulic cylinders in accordance with this embodiment.
Figure 48:
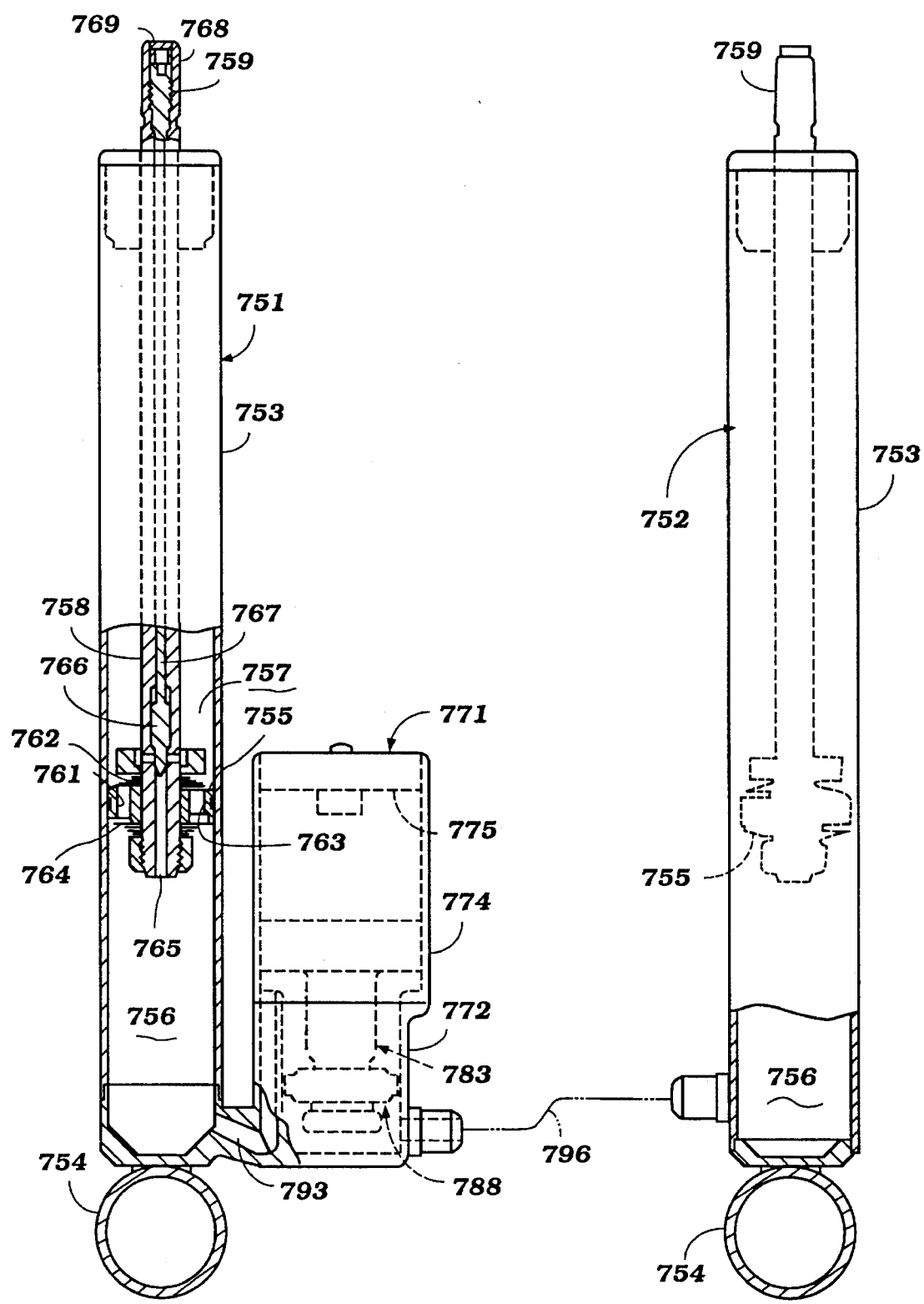
FIG. 48 is a more detailed view of the system shown schematically in FIG. 46 with a portion broken away to more clearly show the damping arrangement in the shock absorber.
Figure 49:
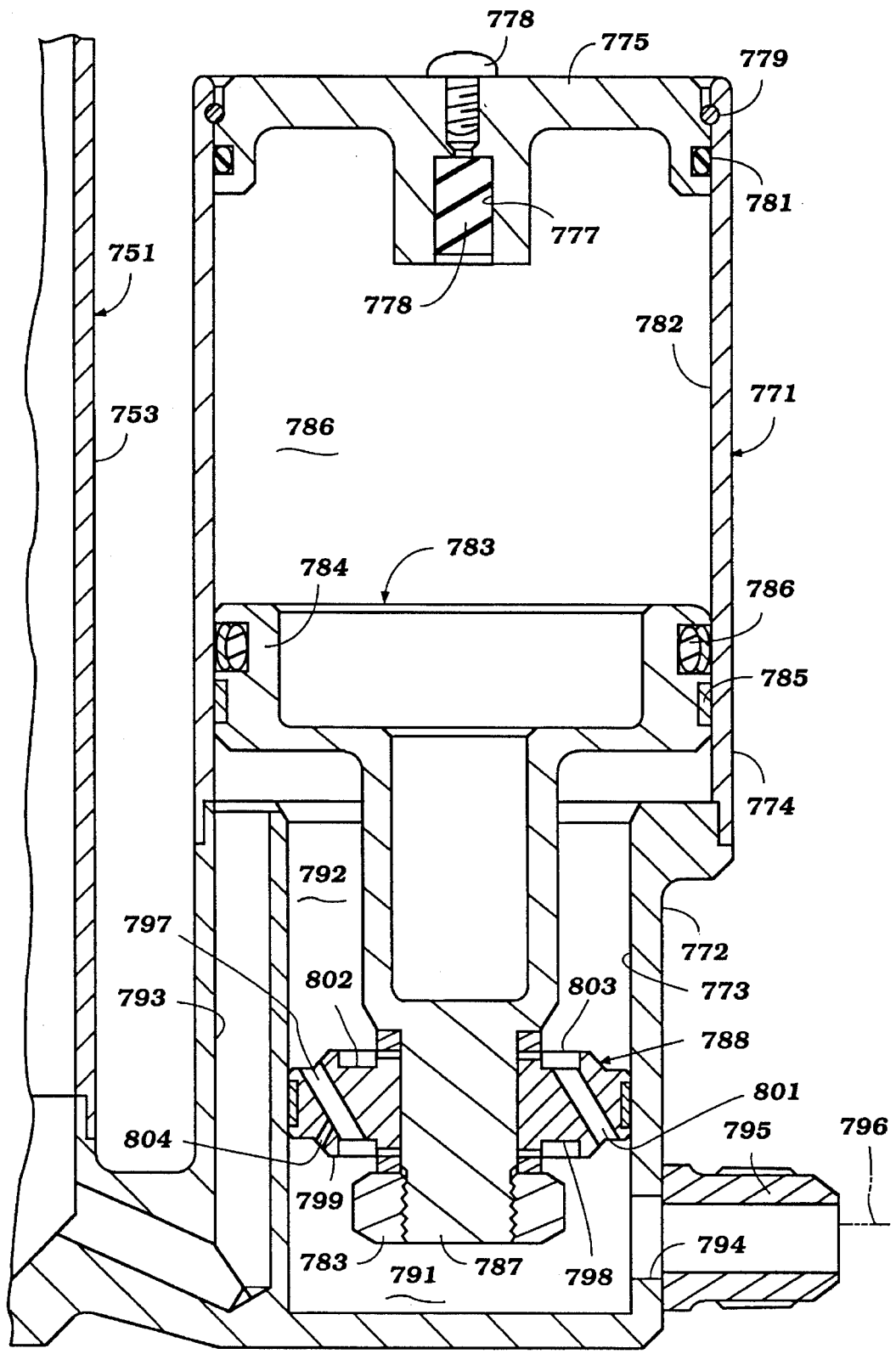
FIG. 49 is an enlarged cross-sectional view taken through the accumulator pressure balance arrangement of this embodiment.

The damping characteristics resulting from this structure relates to damping force to piston speed are shown in FIG. 47.

Figure 46:
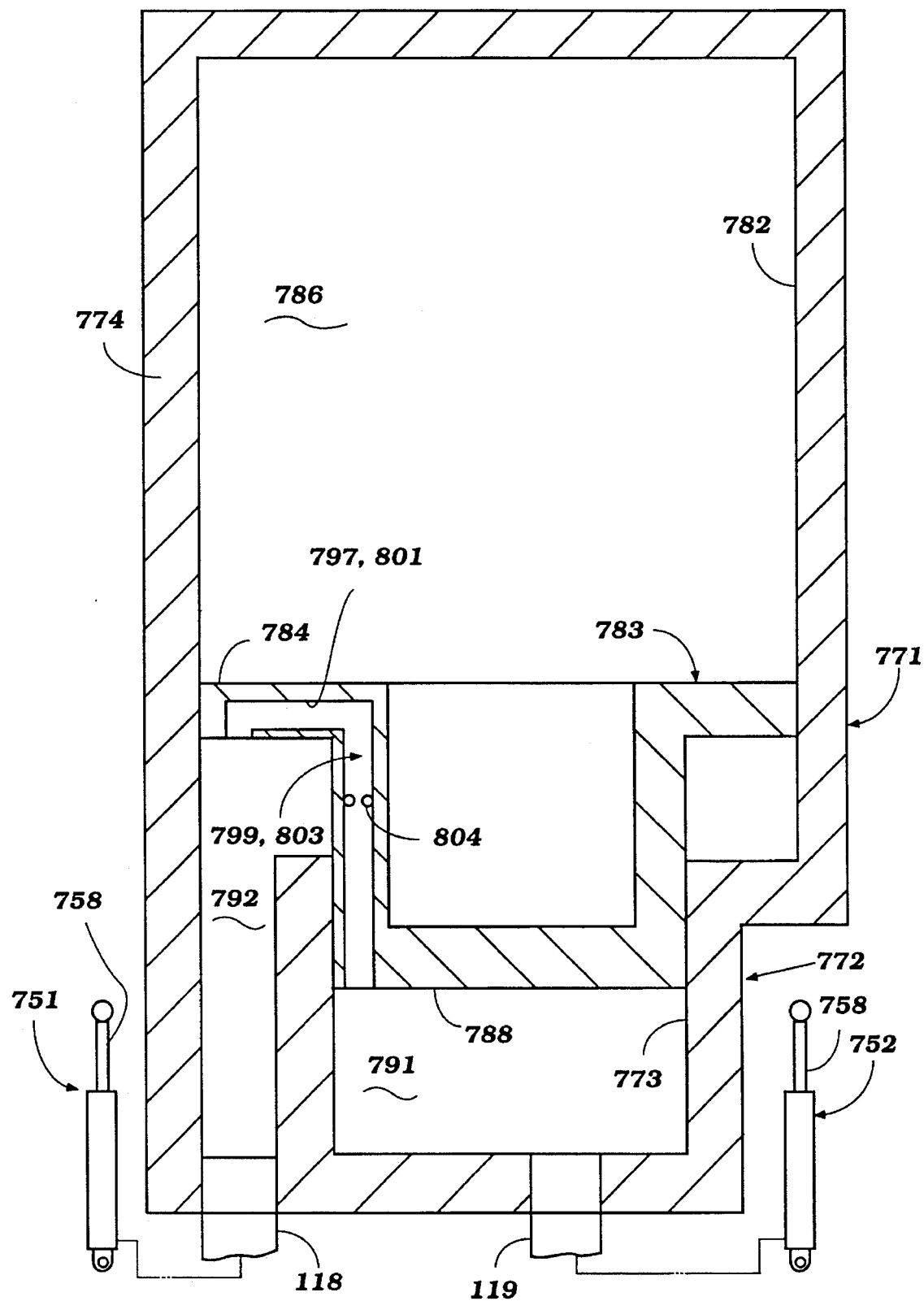
FIG. 46 is a partially schematic cross-sectional view of another embodiment of the invention showing in detail the pressure balancing accumulator arrangement of this embodiment.

In this embodiment, unlike most of the embodiments thus far described, except for that of FIGS. 23–25, the piston in which the valving is provided also moves during operation and thus the operation of this embodiment will be described only briefly. FIG. 46 is a schematic view of the assembly and in this view the passages 797 and 801 are shown schematically and the flow controlling throttle valve is provided by the check valves 799 and 803 is reflected by the arrow and the fixed flow restriction of the passage 804 is also indicated in a schematic fashion in this figure. If the wheels with which the shock absorbers 751 and 752 are associated strike the same shaped object at the same time and both wheels deflect equally, fluid will be displaced from the chamber 756 in a greater amount of each shock absorber than can be accommodated in the chamber 757. When this occurs, there will be equal pressures in the chambers 791 and 792 and as a result there will be no flow through any of the passages 801 or 804. However, the entire piston assembly 783 will move upwardly so that both chambers 791 and 792 may accommodate the fluid displaced from the respective shock absorbers 752 and 751.

If both wheels fall into a depression at the same time, flow will occur in the opposite direction and the piston 783 will move downwardly as should be readily apparent. Hence, the pressure compensating accumulator 771 will not perform any damping function between the two units and the individual shock absorbers 751 and 752 and their internal damping characteristics will provide the total and sole damping force for the wheels.

If there exists a situation when one wheel tends to move upwardly relative to the other wheel or the body tends to lean when rounding a curve, then fluid will be displaced from one shock absorber 751 or 752 and required by the other as previously described. Assuming that the vehicle is turning to the right and that the shock absorbers 751 and 752 are associated with the left- and right-hand sides of the vehicle, respectively, the piston 755 associated with the shock absorber 751 will move downwardly to compress the fluid in the chamber 756, while the piston associated with the shock absorber 752 will move upwardly. Hence, fluid will want to flow into the chamber 792 and out of the chamber 791 and there will be a pressure difference therebetween which will cause the check valve 799 to open in this embodiment, and also there will be flow through the bleed passage 804. Hence, the unit will act to provide side-to-side or anti-rolling controlling, as with the previously described embodiments.

In should be noted that the unit is designed so that the maximum damping force as shown in FIG. 47 is somewhat less than the force $F_{MAX}$. This force is obtained by multiplying the gas pressure in the high pressure accumulator chamber 786 by the cross-sectional area of the piston rod 758. This is because the damping force to be obtained by the system cannot be greater than that maximum damping force $F_{MAX}$, or cavitation would occur in the hydraulic passage and make it impossible to obtain stable damping forces.

Since this embodiment otherwise works like those previously described, further description of it are not believed to be necessary. However, by making the pressure compensating accumulator chamber 771 integral with the end housing 772 of one of the shock absorbers, external hydraulic control lines can be reduced and the likelihood of leakage further ensured against. As with all of the previously described embodiments, although a side-to-side arrangement is shown in the interconnection between the connected wheels, the connection can be of any of the types previously described.

Figure 50:
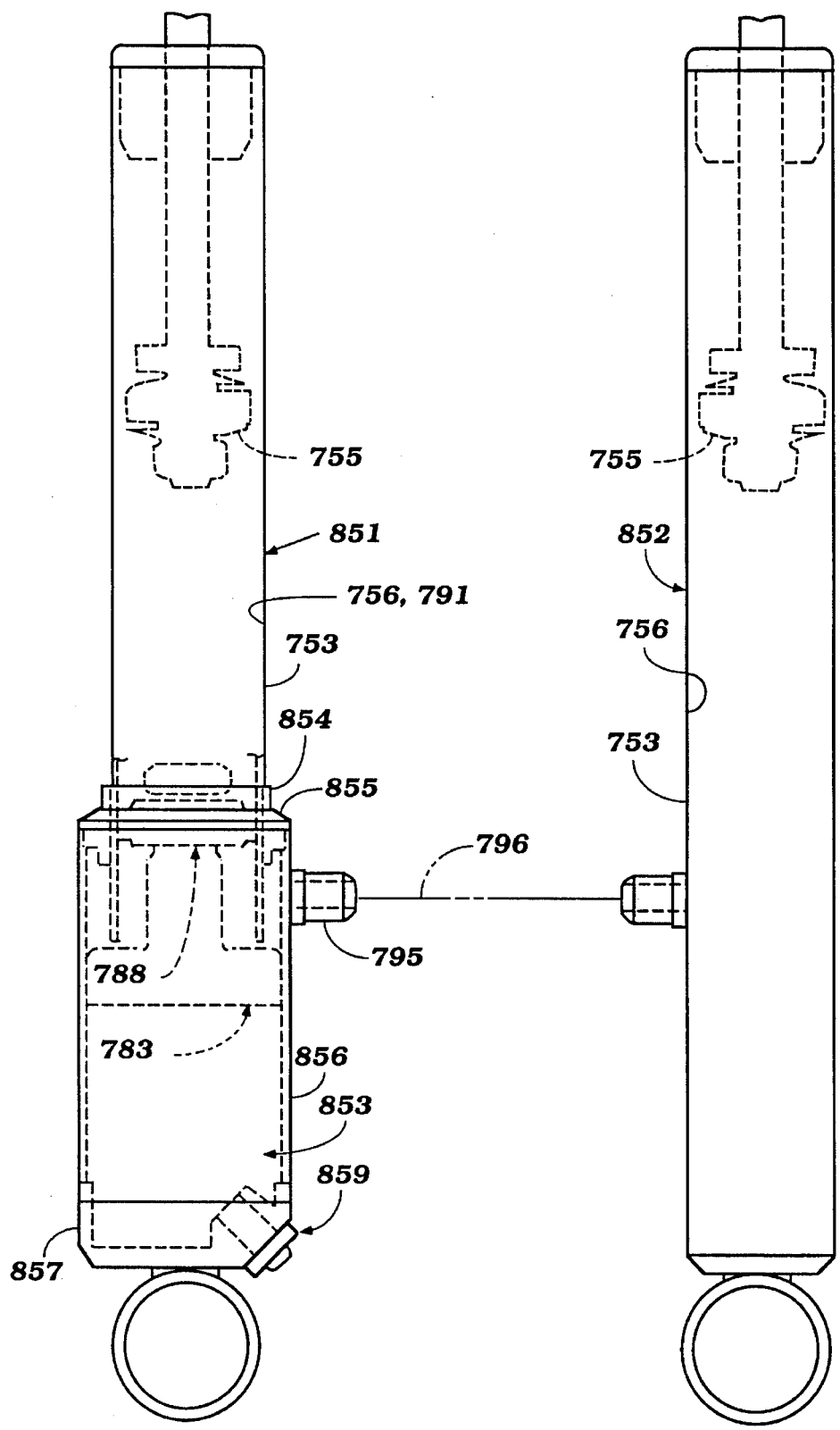
FIG. 50 is an elevational view showing a still further embodiment of the invention.
Figure 51:
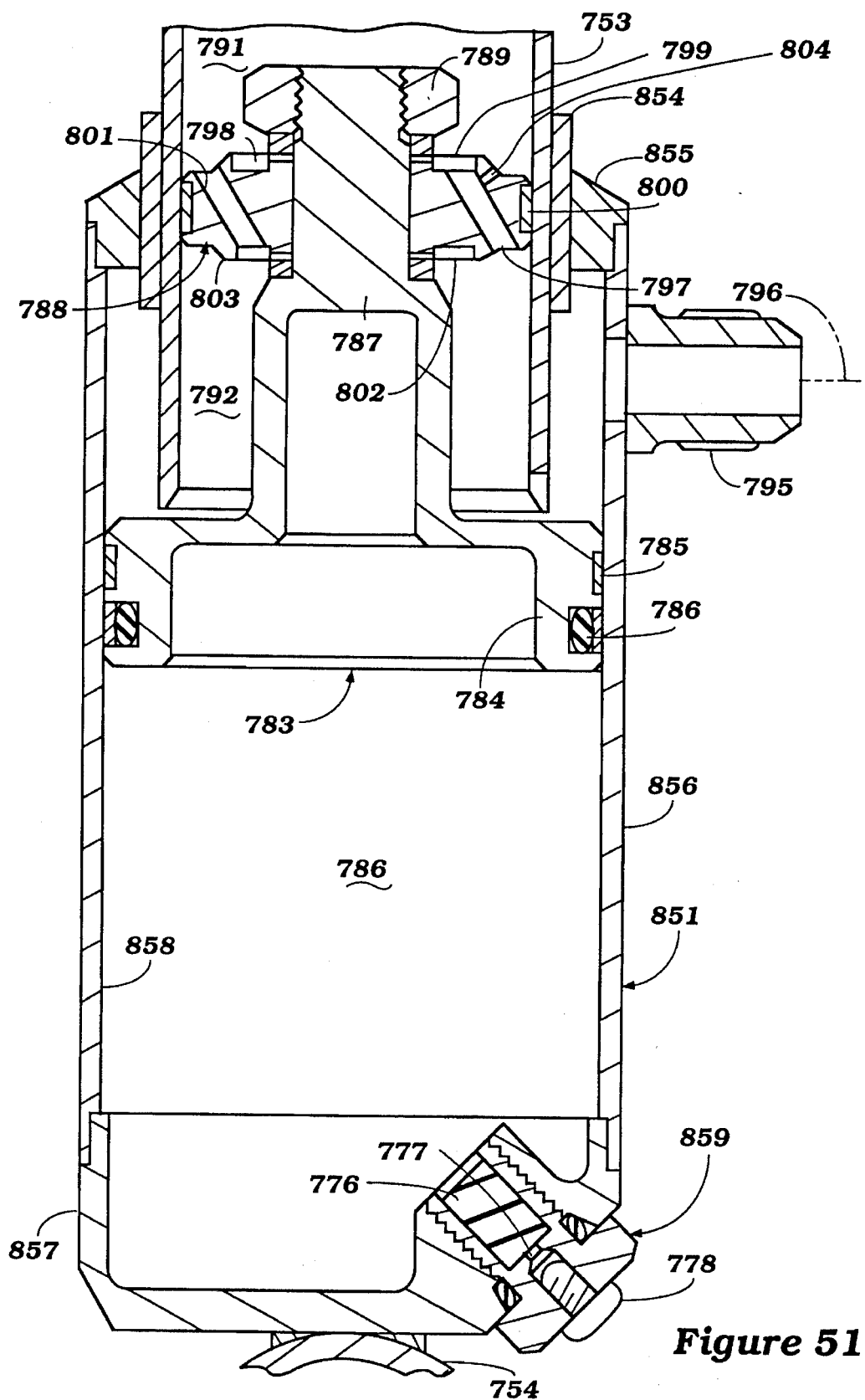
FIG. 51 is an enlarged cross-sectional view showing the pressure balance accumulator of this embodiment.

Embodiment of FIGS. 50 and 51

FIGS. 50 and 51 show another embodiment of the invention wherein the pressure compensating accumulator is formed integrally with one of the shock absorbers. In this embodiment the shock absorbers are indicated generally by the reference numerals 851 and 852, and the pressure compensating accumulator, which is embodied in the shock absorber 851, is identified generally by the reference numeral 853.

In the previously described embodiment of FIGS. 46–49, the pressure compensating accumulator was formed at one side of the shock absorber 751, but in this embodiment the pressure compensating accumulator 853 is formed at the end of and coaxial with its shock absorber 851. However, the construction and operation of the device is substantially the same, and for that reason, components of the assemblage which are the same or substantially the same have been identified by the same reference numerals and will not be described again, except insofar as is necessary to understand the construction and operation of this embodiment.

In this embodiment the cylindrical outer housing 753 of the shock absorber 851 has a sleeve 854 affixed to it so as to strengthen it, and an annular collar 855 is formed around this sleeve 854. The annular collar 855 receives one end of a tubular housing 856. The other end of the tubular housing 856 is closed by a closure plug 857. The tubular housing 856 defines a cylinder bore 858 in which the piston portion 784 of the composite piston assembly 783 is slidably supported, with the piston ring 785 and O-ring seal 786 sealingly engaging this bore 858. The area below the piston portion 784 forms the accumulator chamber 786, which is filled with a pressurized inert gas in the manner previously described. However, in this embodiment the fill assembly includes a removable plug 859 in which the filling media is contained, like the embodiments previously described, except for that of FIGS. 46–49.

The piston portion 788, and specifically its sealing ring 800, is slidably engaged with the cylinder bore formed by the cylinder housing 753. Hence, the chamber 791 is coextensive with the chamber 756. Because of the similarity of this embodiment to that previously described, it is believed unnecessary to describe the functioning of this embodiment.

Figure 52:
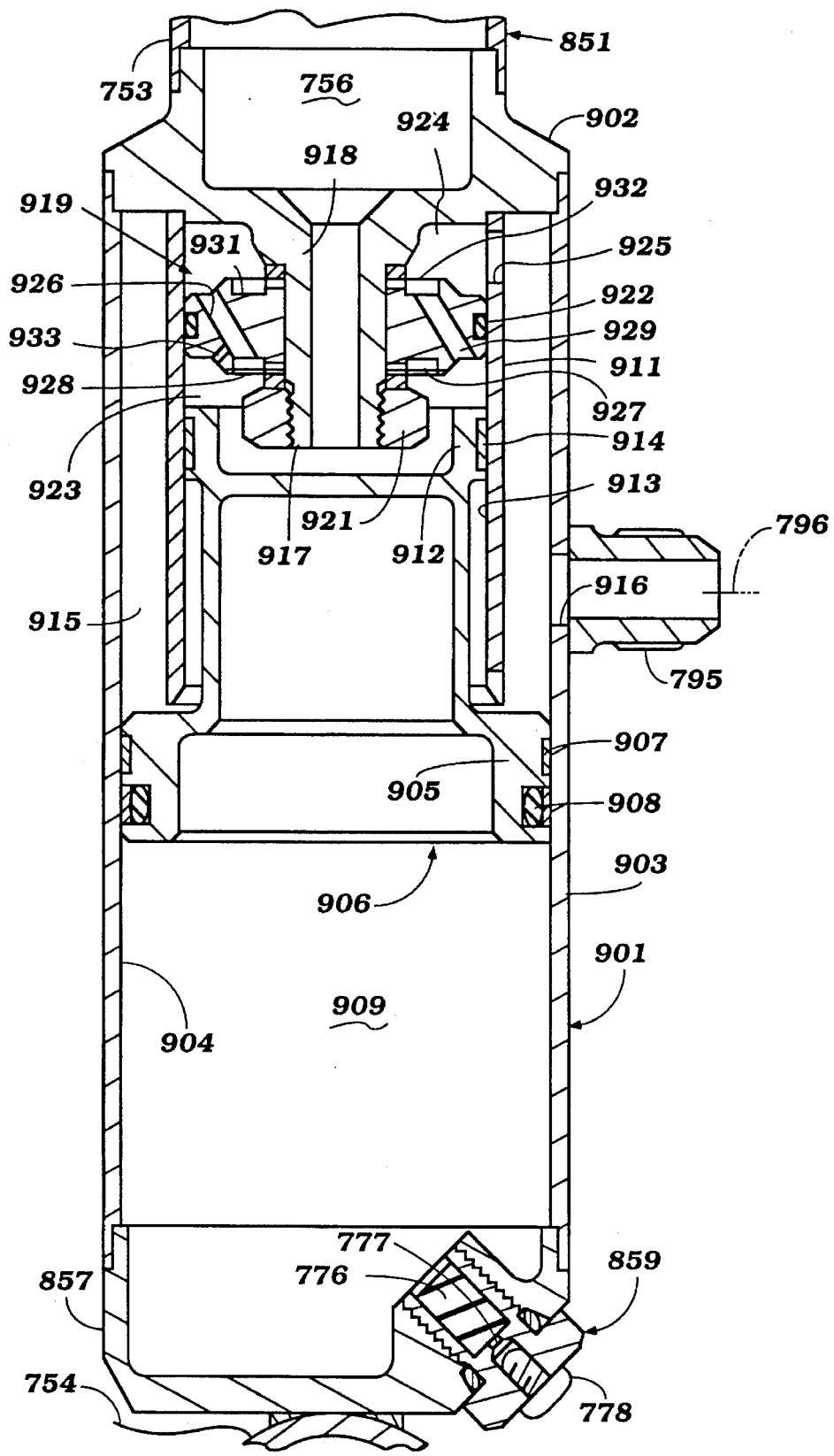
FIG. 52 is an enlarged cross-sectional view, in part similar to FIG. 51, and shows another embodiment of the pressure balance accumulator arrangement.

Embodiment of FIG. 52

Another embodiment of the invention is shown in FIG. 52, and this embodiment, like the embodiment of FIGS. 50 and 51, incorporates a pressure compensating accumulator, indicated generally by the reference numeral 901, which is provided in coaxial relationship with one of the shock absorbers, such as the shock absorber 851. This embodiment differs from the embodiment of FIGS. 50 and 51 only in the construction of the pressure compensating accumulator and in the end construction of the shock absorber 851. Therefore, the remaining components of the system have not been illustrated, and where any components are the same or substantially the same as those components which have been previously described, they will be identified by the same reference numerals and will be described again only insofar as is necessary to understand the construction and operation of this embodiment.

An end closure 902 is affixed to the lower end of the tubular member 753 of the shock absorber 851. This end closure 902 also forms an end closure for a tubular housing member 903 of the pressure compensating accumulator 901. This tubular member 903 has a cylinder bore 904 that receives a first piston portion 905 of a composite piston assembly, indicated generally by the reference numeral 906. The piston portion 905 has a piston ring 907 and O-ring seal 908 that provide sealing engagement with the cylinder bore 904 so as to define an accumulator volume 909 that is filled with high pressure inert gas through the fill fitting 859 in the manner previously described.

The end closure 902 further supports a second smaller diameter tubular member 911 that is received concentrically in the cylinder bore 904 and which receives a second smaller diameter piston portion 912 of the composite piston 906. The tubular member 911 also has a cylinder bore 913 in which the piston portion 912 is received. A piston ring 914 carried by the piston portion 912 sealingly engages the cylinder bore 913.

A first fluid chamber 915 is formed by the cylinder bore 904 of the tubular member 903 and is filled with a hydraulic fluid. This chamber 915 communicates with the chamber 756 of the associated shock absorber through a conduit 796, fitting 795, and an opening 916 formed in the tubular member 903.

The end closure 902 has an extending portion 917 in which a passage 918 is formed so that hydraulic fluid may pass from the chamber 756 of the shock absorber 851 into the pressure compensating accumulator assembly 901 as thus far described.

A fixed piston 919 is held on the extension 917 by a nut 921. The piston 919 has an O-ring seal 922 that divides the area above the piston portion 912 into a first or lower chamber 923 within which the opening 918 extends and an upper chamber 924. The upper chamber 924 communicates with the chamber 915 through an opening 925 formed in the inner tubular member 911. Hence, the chamber 923 cooperates with the effective area of the piston 912, while the chamber 924 cooperates with the area of the piston portion 905 that is effective. This effective area is the area of the piston 905 less the area of the piston portion 912. Like the previously described embodiments, these two areas are equal so that equal amounts of fluid will be displaced from each chamber 924 and 923 upon like movement of the two connected shock absorbers.

A first series of passages 926 extend through the piston 919 from the chamber 924 to the chamber 923. These passages 926 end in an annular valve seating relief 927 across which a plate-type check valve 928 extends so as to provide for flow from the chamber 924 to the chamber 923 when sufficient pressure is exerted, but precludes flow in the reverse direction.

A second series of passages 929 extend through the piston 919 from the chamber 923 to the chamber 924. These passages 929 terminate in an annular valve seat relief 931 across which a plate-type check valve 932 extends. The check valve 932 will open on sufficient pressure difference between the chambers 923 and 924 to permit flow from the chamber 923 to the chamber 924.

In addition, and is with some of the previously described embodiments, a small bleed orifice 933 is formed in the piston 919 and extends from the chamber 923 to one of the passages 926 so as to provide a restricted communication between the chambers 923 and 924 which are not valved.

From the foregoing description, it is believed that the operation of this embodiment will be readily apparent to those skilled in the art. Like the other embodiments, when both interconnected shock absorbers are loaded in the same direction and at the same amount, the composite piston 906 will move to accommodate the changes in volume in the respective chambers, but there will be no flow between the chambers 923 and 924. Hence, each shock absorber operates independently in response to individual wheel loadings, and the flow restricting valve arrangement carried by the piston 919 will function to dampen vehicle movements and avoid rolling or pitching, again depending on how the shock absorbers are interrelated.

In the description as thus far made, it should be apparent that there have been disclosed embodiments wherein the pressure compensating accumulator has been formed as a separate unit from the shock absorbers and, as with the immediately preceding described embodiments, where the pressure compensating accumulator is formed integrally with the body of one of the shock absorbers. In each instance it should be readily apparent to those skilled in the art that the actual construction and operation of the pressure compensating accumulator can be employed either in integral constructions or in separate constructions.

Figure 53:
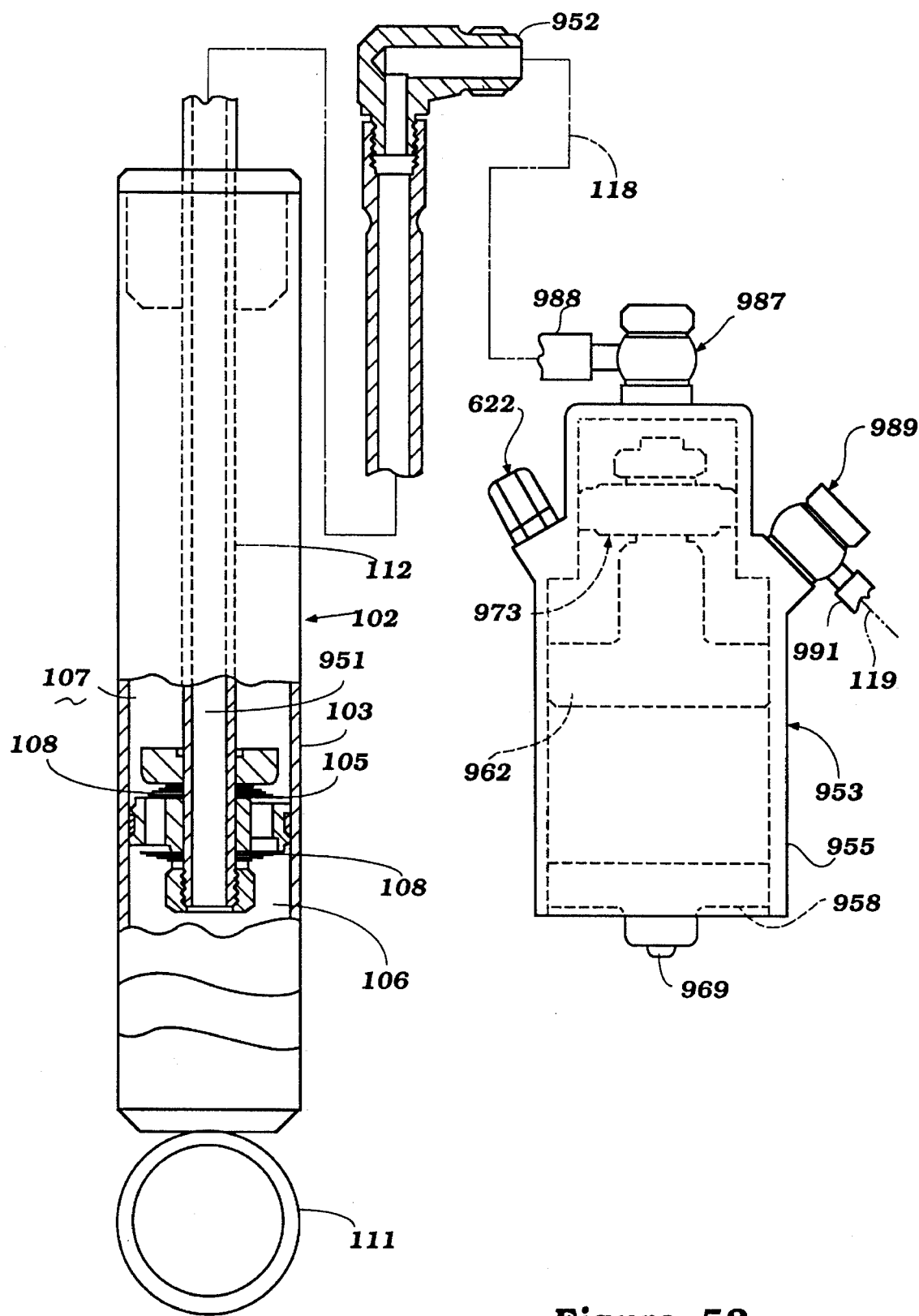
FIG. 53 is a partial view showing another embodiment of the invention with portions broken away and shown in section.
Figure 54:
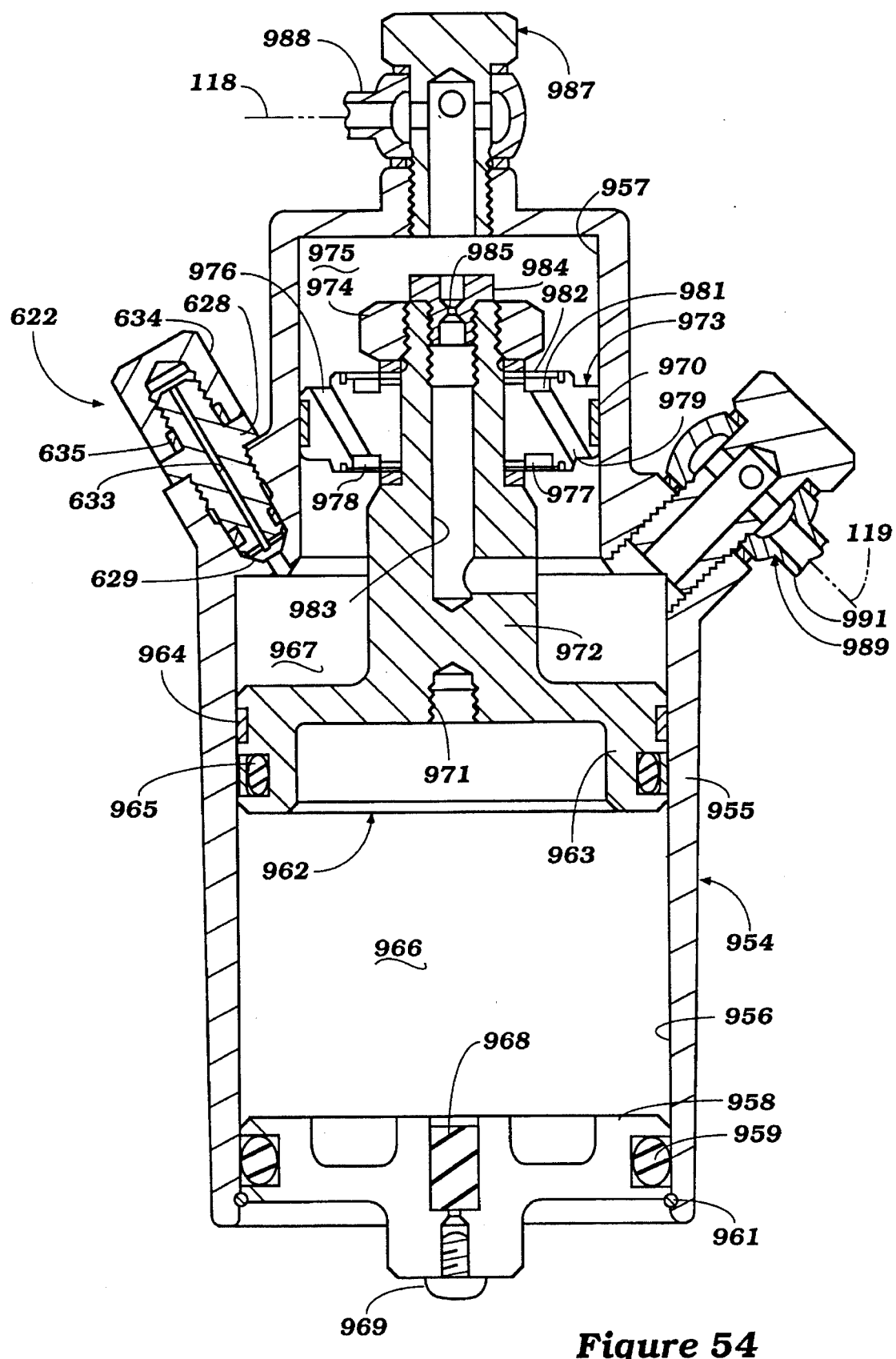
FIG. 54 is an enlarged cross-sectional view of the pressure balance accumulator employed in the embodiment of FIG. 53.

Embodiment of FIGS. 53 and 54

FIGS. 53 and 54 show another embodiment of the invention, wherein the pressure compensating accumulator structure and control valve are slightly different from those previously described and also wherein a slightly different type of shock absorber is employed which has an integral flow passage in its piston rod. Since the construction of the shock absorber is substantially the same as those previously described, the reference numerals applied to the embodiment of FIGS. 1–3 have been utilized to designate the shock absorber, and it will be described again further only to point out the difference between this construction and the previously described constructions.

Referring specifically to FIG. 53, the shock absorber is indicated generally by the reference numeral 102 and is mounted so that its cylinder 103 is attached to the wheel or wheel suspension element by its trunion 111. The piston rod 112 extends upwardly through the chamber 107 and is provided with an internal passageway 951 which communicates with the chamber 106. The upper end of the piston rod 112 has a fitting 952 connected thereto which is connected to the conduit 118 and thereby to the pressure compensating accumulator of this embodiment, indicated generally by the reference numeral 953 and having a construction as best shown in FIG. 54.

The pressure compensating accumulator assembly 953 has an outer housing comprised of a main housing member 955 having a lower portion with a cylinder bore 956 and an upper portion with a reduced diameter cylinder bore 957. The upper cylinder bore 957 is blind, while the lower cylinder bore 956 is closed at its lower end by means of a closure plug 958 that has an O-ring seal 959. A snap ring or circle clip 961 holds the closure plate 958 in position.

A composite piston, indicated generally by the reference numeral 962, has a first larger diameter portion 963 that is slidably supported in the cylinder bore 956. The piston portion 963 carries a piston ring 964 and O-ring seal 965 for sealing engagement with the cylinder bore 956. This forms a first gas pressure chamber 966 in the area below the piston portion 963 and above the closure plate 958 and a second hydraulic chamber portion 967 above the piston portion 963 which is filled with fluid.

The gas pressure chamber 966 may be filled in the manner previously described. As is shown, there is provided an elastic seal 968 through which a hypodermic needle may pass for charging, as previously described. The passage in which the elastic material 968 is provided is closed by a closure plug 969 after filling.

It should also be noted that the piston portion 963 is provided with a tapped opening 971 so as to receive a rod or assembly fixture, as described with the embodiment of FIGS. 26–35 for fill procedure and to ensure that there will be adequate fluid volume maintained in the pressure compensating accumulator 954 to make up for fluid leakage from the system during its life.

The composite piston 963 is further provided with an integral post 972, which at its upper end carries a second piston 973 which is held in place on the post 972 by a nut 974. The piston 973 is in sealing arrangement with the cylinder bore 957 by means of a piston ring 970. The piston 973 defines the upper end of the first fluid chamber 967 and a second fluid chamber 975 formed at the upper end of the cylinder bore 957.

As with a number of the previously described embodiments, flow from the chamber 975 to the chamber 967 can occur through a first series of drilled passages 976 formed in the piston 973 and which terminate at an annular seating groove 977, with the flow therethrough being controlled by a first plate-type check valve 978. A second series of passages 979 extend through the piston 973 from the chamber 967 to the chamber 975. These passages terminate in a circumferential groove 981, the flow through which is controlled by a plate type check valve 982.

As with the previously-described embodiments, the effective area of the piston 963 in the chamber 967 is equal to the effective area of the piston 973 in the chamber 975 so that when the composite piston 962 moves, equal amounts of fluid will be displaced from the chambers 975 and 967 for the reasons already noted.

In addition to the check valves 978 and 982 and their associated passages, there is further provided a flow passage 983 which extends through the post 972 from the chamber 975 to the chamber 976. A metering jet 984 is provided at the end of this passage communicating directly with the chamber 975 and it is provided with a sized metering orifice 985 so as to control the effective flow that will bypass the check valves 978 and 982 as with the previously described embodiments.

The left-hand shock absorber 102 which is shown in FIG. 3 communicates with the chamber 975 through the conduit 118 that is connected to its fitting 952. Furthermore, a banjo fitting 987 has a portion 988 to which the conduit 118 is connected so as to insure that the chamber 975 is in fluid communication with the chamber 106 of the shock absorber.

In a similar manner, a banjo fitting 989 has a portion 991 that is connected to the conduit 111 of the right-hand shock absorber which is not shown in these figures but which has already been described in conjunction with the other embodiments and will have the same construction as the shock absorber 102 illustrated in FIG. 53. This banjo fitting 989 extends through the housing member 954 and enters the chamber 967.

Finally, the hydraulic system may be charged in a manner as was described in conjunction with the embodiment of FIGS. 26–35, as already described. A fill fitting of the type shown in FIG. 32 and designated by the same reference numerals 622 et al. is provided in the housing 956 in communication with the chamber 967 so as to permit fluid charging. Because of the previous description of this construction, it is not believed necessary to describe it again.

Figure 55:
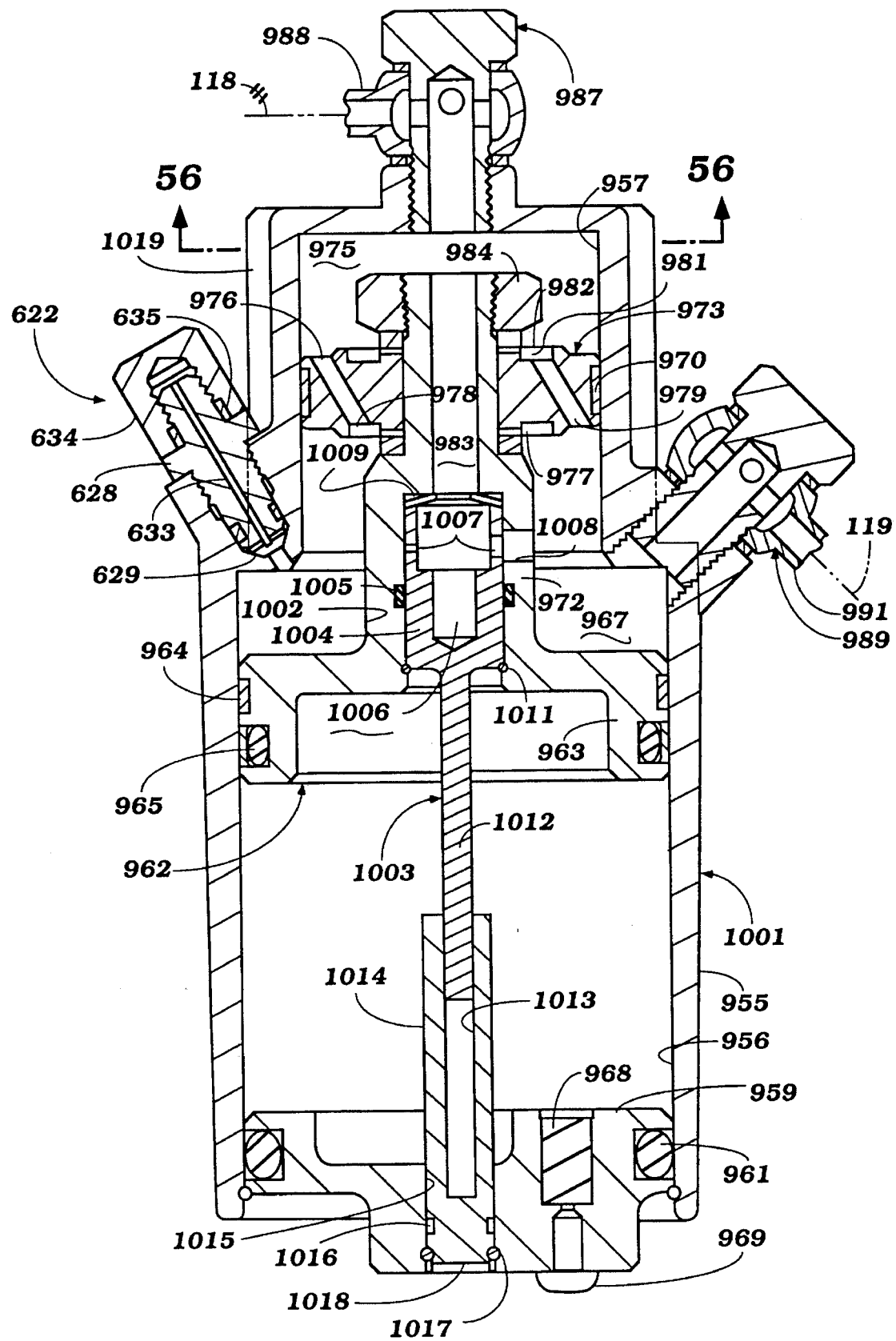
FIG. 55 is an enlarged cross-sectional view, in part similar to FIG. 54, and shows another embodiment of the pressure accumulator.
Figure 56:
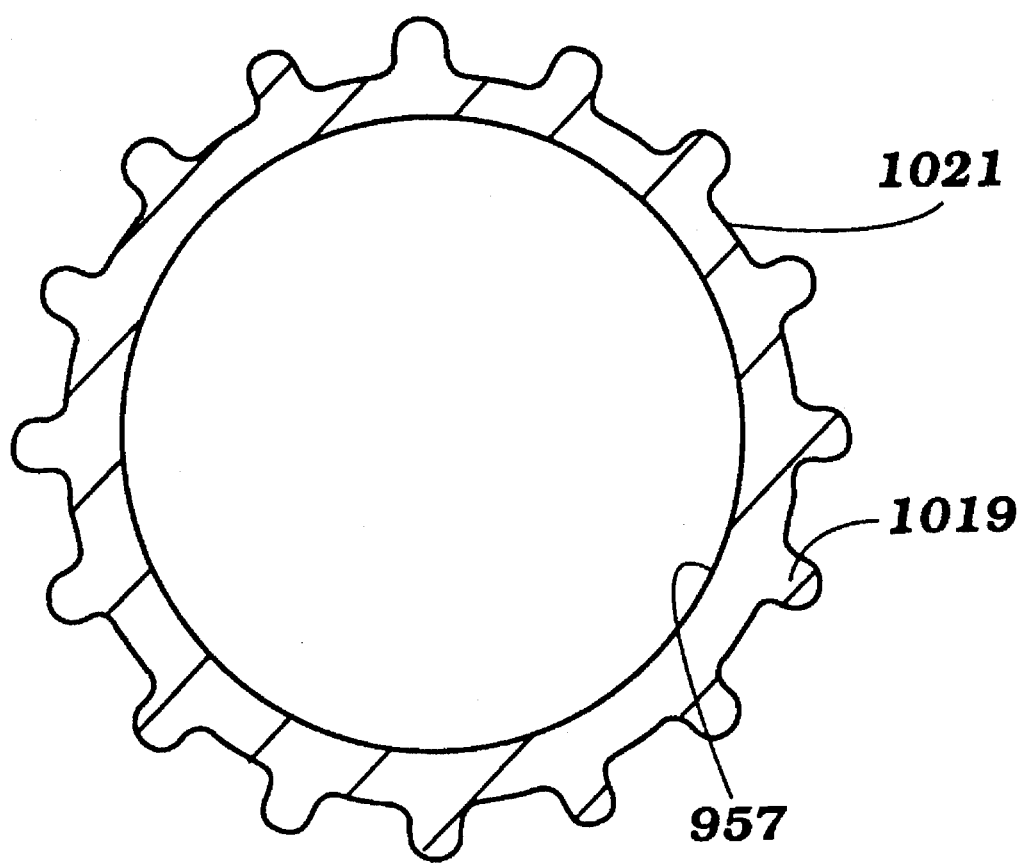
FIG. 56 is a cross-sectional view taken along the line 56—56 of FIG. 5.

Embodiment of FIGS. 55 and 56

As has been noted, in the embodiment of FIGS. 53 and 54, to change the effective size of the bypass opening 985 between the chambers 967 and 975, it is necessary to remove the metering jet 984 and replace with one of a different size. This requires at least partial disassembly of the arrangement.

FIGS. 55 and 56 show a pressure compensating accumulator construction in accordance with another embodiment of the invention, which is indicated generally by the reference numeral 1001 and which differs from the unit 954 of FIGS. 53 and 54 only in the bypass passage between the chambers 975 and 967 and the way in which it can be externally adjusted. For this reason, only this portion of the construction will be described and other components which have the same or substantially the same construction have been identified by the same reference numerals.

This embodiment incorporates an adjusting mechanism which is constructed and operates very similar to that of the embodiment of FIGS. 44 and 45. However, since it is structurally somewhat different, it will be described separately by reference to these figures and will be identified by a new series of reference numerals.

It should be noted that the composite piston 962 and particularly its post portion 972 is formed with a cylindrical bore 1002 at the base of the passage 983. A rotary valve element, indicated generally by the reference numeral 1003 has a cylindrical portion 1004 that is received in this bore and which is sealed thereto by an o-ring 1005. The o-ring 1005 also serves the function of retaining the rotary valve 1004 in its adjusted position in the manner previously described.

The cylindrical portion 1004 is provided with an internal cavity 1006 including a series of metered openings of different sizes 1007 which register with a portion 1008 of the passage 983 and particularly the portion which enters into the chamber 967. A Bellville type spring 1009 is interposed between the base of the counterbore 1002 and the head of the valve portion 1004 to hold it in position against a circle clip or retainer ring 1011.

The valve element 1003 has a polygonal shaped shank portion 1012 that is received within a complementary opening 1013 of an adjusting member 1014. The adjusting member 1014 is cylindrical in outer shape and is journaled for rotation in a bore 1015 of the end closure 959. This bore 1015 is on the center of the cylinder bores 956 and 957 and thus the fill arrangement 968, 969 is offset to one side in this embodiment.

An o-ring seal 1016 and snap or retainer ring 1017 hold the adjusting member 1014 in position and also assist in retaining it in its adjusted position. The adjusting member 1014 has a slotted head 1018 that can be turned by a screwdriver or other similar flat bladed tool so as to achieve the adjustment in the size of the bypass flow passage and, accordingly, tailor the damping characteristics of this unit and specifically the interconnection between the two connected wheels.

In this embodiment, the housing 955 is also provided with a ribbed upper portion 1019 (see particularly FIG. 56) along the part 1021 which surrounds the cylinder bore 957. These ribs 1019 will help dissipate the heat which is generated during extreme suspension movements.

Figure 57:
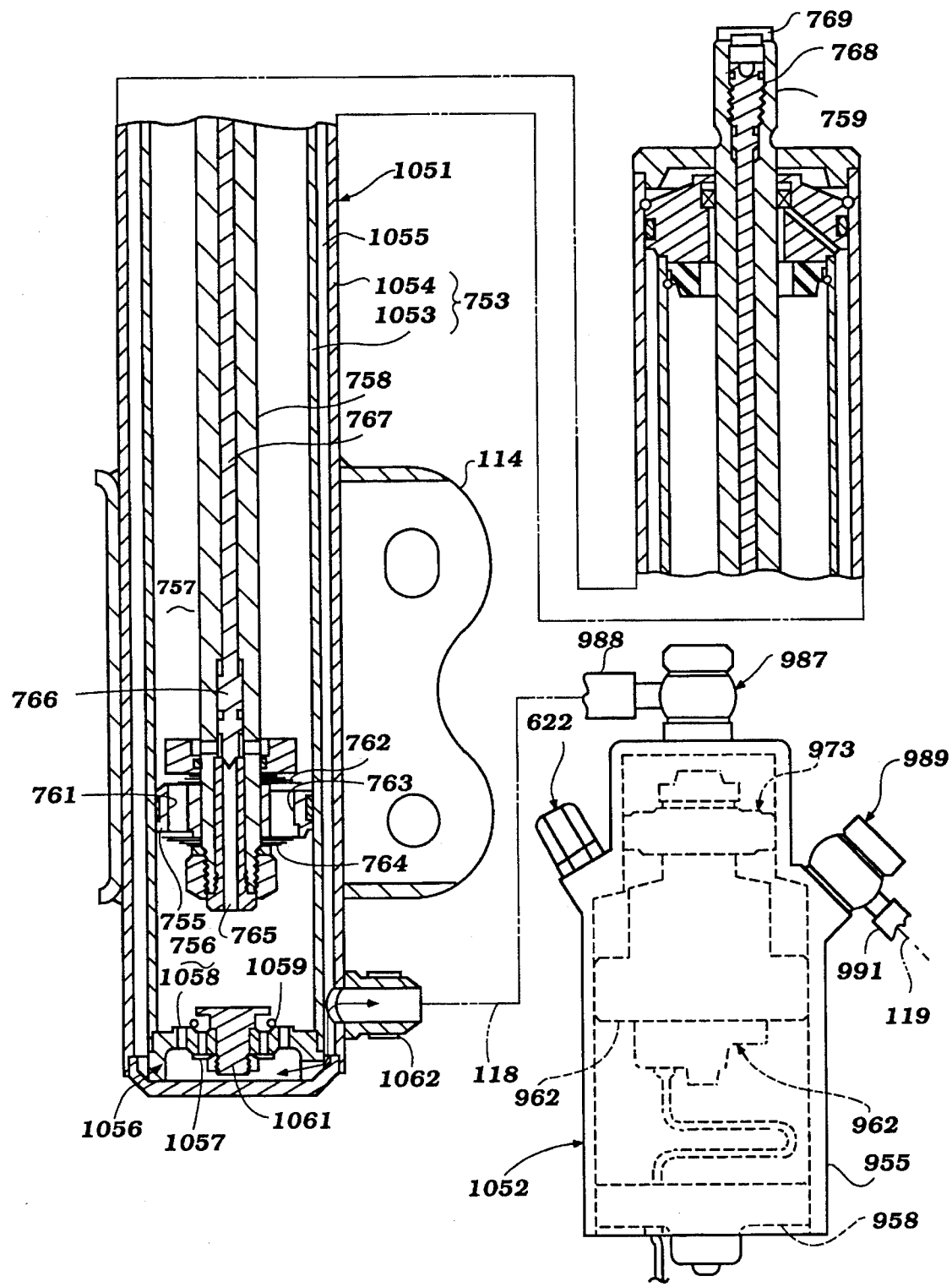
FIG. 57 is a partial view of a further embodiment of the invention with portions of one of the shock absorbers broken away and shown in section.
Figure 58:
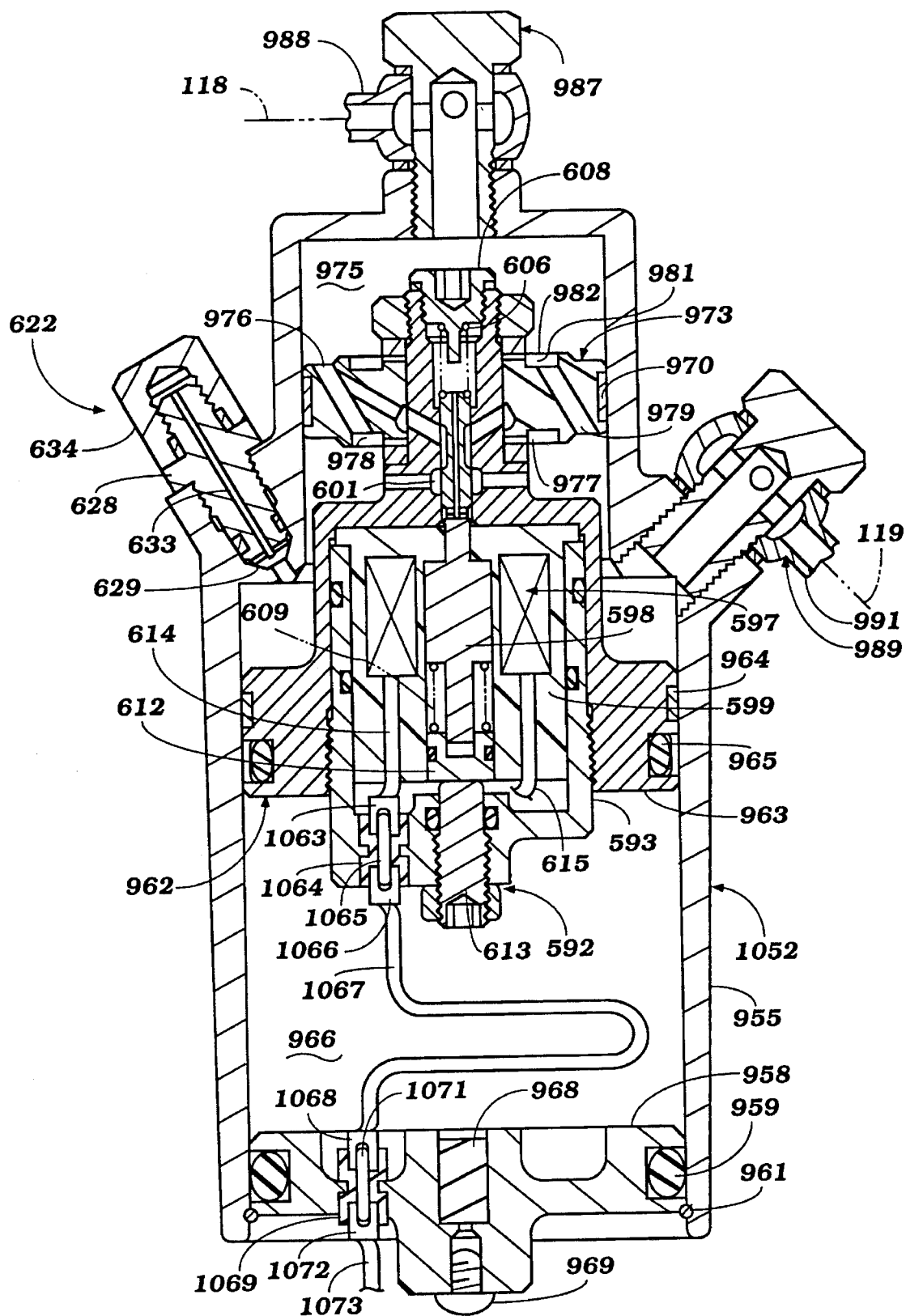
FIG. 58 is an enlarged cross-sectional view of the pressure balancing accumulator of this embodiment.

Embodiment of FIGS. 57 and 58

A final illustrated embodiment is shown in FIGS. 57 and 58 and it includes a pair of interconnected shock absorbers having the same general construction and, for that reason, only one of them is shown and is identified generally by the reference numeral 1051. The shock absorbers 1051 have a construction of the type shown in the embodiment of FIGS. 46–49, except as will hereinafter be noted and for that reason, components of the internal construction of the shock absorbers 1051 have been identified by these same reference numerals as applied in that embodiment. Briefly summarized, these shock absorbers 1051 incorporate externally adjustable bypass passages in addition to their normal check valve, shock absorbing arrangement.

The shock absorbers 1051 are interconnected via a pressure compensating accumulator, indicated generally by the reference numeral 1052 and which has a construction of the general type shown in the embodiment of FIGS. 53 and 54 and, for that reason, components which are the same as that construction have been identified by the same reference numerals. In addition, the pressure compensating accumulator structure 1052 incorporates an electrically controlled bypass valve of the type generally shown in the embodiment of FIGS. 26 through 35 and, for that reason, this bypass valve construction have been identified by the same reference numerals as utilized in that figure and will be described again only insofar as is necessary to understand that construction and operation of this embodiment.

The shock absorbers 1051 are of the double-cylinder type and are comprised of an inner cylinder 1053 in which the piston 755 is slidably supported and which forms the chambers 756 and 757. Received telescopically around the inner cylinder 1053 is an outer cylinder 1054 so that the cylinders 1053 and 1054 define between them an annular fluid cavity 1055.

A foot valve assembly, indicated generally by the reference numeral 1056 is provided at the lower portion of the cylinders 1053 and 1054 and controls the communication between the chamber 756 and the annular chamber 1055. The foot valve assembly 1056 includes a first check valve 1057 which controls the flow from the chamber 756 to the annular chamber 1055 and a second check valve 1058 which controls the flow from the chamber 1055 to the chamber 756. A coil compression spring 1059 acts between the check valve 1058 and a plunger 1061 to which the check valves 1057 are affixed for controlling the flow therethrough in a well known manner.

The annular chamber 1055 communicates with the pressure compensating accumulator 1056 through a fitting 1062 that is carried by the outer tube 1054 and which communicates with the conduit 118.

Referring now to the structure of the pressure compensating accumulator 1052 (FIG. 53), as has been noted its construction is generally the same as the pressure compensating accumulator 954 of the embodiment of FIGS. 53 and 54. The construction of the composite piston, check valve damping, fill arrangement and external hydraulic connections are all the same as that embodiment and, therefore, the reference numerals utilized to describe the components of that embodiment have been applied to indicate that corresponding parts of the pressure compensating accumulator 1052. Also, for those reasons, it is not believed to be necessary to explain the way in which this unit is assembled or its basic damping functions.

In addition, the bypass passage provided by the fixed orifice 985 of the embodiment of FIGS. 53 and 54 is replaced in this embodiment with an electrically controlled bypass valve of the type shown in the embodiment of FIGS. 26 through 35. However, this bypass valve rather than being mounted in a fixed relationship in the dividing piston is mounted in the composite piston assembly 962. The components and operation are the same and therefore the electric solenoid assembly 592 and its associated control valve 601 have been identified by the same reference numerals as applied, particularly in FIGS. 29 and 33 and since the operation is the same, that structure will also not be described again in detail.

The electrical terminal 614 and 615 for the solenoid winding 597 in this embodiment pass through the pressure accumulator chamber 966 for their external connection to the ECU, as previously described. In order to permit this, each conductor 614 and 615 is provided with a terminal 1063 (only one of which appears in the drawings), which passes through a seal 1064 in the solenoid case 593 and is connected by a connector 1065 to a terminal 1066 of a further conductor 1067 that passes through the high pressure gas chamber 966.

In a similar manner, each conductor 1067 has a terminal 1069 at its opposite end which extends through to a seal 1069 carried in the end plate 958 of the accumulator housing. A further terminal 1071 permits connection between the conductor 1067 and a terminal 1072 of an external conductor 1073 that passes to the ECU for control in the manner previously described.

From the foregoing it should be readily apparent that a great number of various suspension arrangements have been provided which permit each wheel of a vehicle to enjoy damping characteristics that are controlled by the shock absorber associated with that wheel when the wheel experiences road obstacles. However, pairs of wheels or more may be interconnected through the pressure compensating accumulator structures as described which functions so as to provide wheel-to-wheel control which is independent of the internal damping of the shock absorbers and which acts only to provide vehicle body control under certain types of characteristics so as to reduce rolling, pitching and compound motions thereof. Of course, the foregoing description is that of number of embodiments of the invention and various changes and modifications may be made without departing from the spirit and scope of the invention, as the defined by the appended claims.

I claim:

1. A suspension system for a vehicle having at least two wheels, each supported for suspension movement by the vehicle body, a first damping element having a pair of relatively moveable members defining a first fluid chamber and interposed between one of said wheels and the vehicle body for varying the volume of said first fluid chamber upon suspension movement of said one wheel, first damping means for damping the flow of fluid from said first fluid chamber, a second damping element having a pair of relatively moveable members defining a second fluid chamber and interposed between another of said wheels and the vehicle body for varying the volume of said second fluid chamber upon suspension movement of said other wheel, second damping means for damping the flow of fluid from said second fluid chamber, a conduit interconnecting said first and said second fluid chambers, and control means in said conduit for precluding fluid flow through said conduit in response to a first suspension condition and for providing a damped flow through said conduit in response to a second suspension condition.

2. A suspension system as set forth in claim 1, wherein the first suspension condition is a condition wherein the same amount of fluid is displaced from both of the fluid chambers at substantially the same time.

3. A suspension system as set forth in claim 2, wherein the one wheel and the other wheel are disposed in substantially the same longitudinal position along the length of the vehicle body.

4. A suspension system as set forth in claim 2, wherein the one wheel and the other wheel are disposed one in front of the other on the vehicle body.

5. A suspension system as set forth in claim 1, where at least one of the conditions is a condition wherein there is an unequal load on the damping elements at the same time.

6. A suspension system as set forth in claim 5, wherein the one wheel and the other wheel are disposed in substantially the same longitudinal position along the length of the vehicle body.

7. A suspension system as set forth in claim 5, wherein the one wheel and the other wheel are disposed one in front of the other on the vehicle body.

8. A suspension system as set forth in claim 1, wherein the relatively moveable members of each damping element define a pair of additional fluid chambers comprised of a third fluid chamber formed by the first damping element and a fourth fluid chamber defined by the second damping element and wherein the fluid flow from the first and second fluid chambers flows at least in part to the other chamber of the respective damping element.

9. A suspension system as set forth in claim 8, wherein the conduit interconnects the same respective chambers of the first and second damping elements.

10. A suspension system as set forth in claim 9, wherein the first suspension condition is a condition wherein the same amount of fluid is displaced from both of the fluid chambers at substantially the same time.

11. A suspension system as set forth in claim 10, wherein the one wheel and the other wheel are disposed in substantially the same longitudinal position along the length of the vehicle body.

12. A suspension system as set forth in claim 10, wherein the one wheel and the other wheel are disposed one in front of the other on the vehicle body.

13. A suspension system as set forth in claim 9, where at least one of the conditions is a condition wherein there is an unequal load on the damping elements at the same time.

14. A suspension system as set forth in claim 13, wherein the one wheel and the other wheel are disposed in substantially the same longitudinal position along the length of the vehicle body.

15. A suspension system as set forth in claim 13, wherein the one wheel and the other wheel are disposed one in front of the other on the vehicle body.

16. A suspension system as set forth in claim 1, wherein at least a portion of the fluid displaced from the first and second fluid chambers is displaced to respective first and second accumulator chambers, each of said first and second accumulator chambers having a respective accumulator piston.

17. A suspension system as set forth in claim 16, wherein the pistons of the accumulator chambers are interconnected to each other for simultaneous movement for maintaining the same fluid displacement for each accumulator chamber upon the displacement of fluid from the first and second fluid chambers of the first and second damping elements.

18. A suspension system as set forth in claim 17, wherein the accumulator pistons move in the same direction and are interconnected for simultaneous movement by a cross bar.

19. A suspension system as set forth in claim 17, wherein the pistons of the first and second accumulators move in opposite directions in response to the same fluid displacement and wherein the accumulator chamber pistons are interconnected for simultaneous movement in opposite directions by a linkage system.

20. A suspension system as set forth in claim 17, wherein the accumulator chamber pistons are comprised of concentric pistons one comprising a cylindrical piston and the other comprising an annular piston integrally connected with each other.

21. A suspension system as set forth in claim 17, wherein the conduit means permits damped flow between the damping element chambers in response to the unequal displacement of fluid from the first and second fluid chambers of the first and second damping elements under certain types of loading.

22. A suspension system as set forth in claim 21, wherein the means for providing the damped flow through the conduit comprises an orifice.

23. A suspension system as set forth in claim 22, wherein the orifice has a fixed size.

24. A suspension system as set forth in claim 22, wherein the orifice size is variable.

25. A suspension system as set forth in claim 22, wherein the conduit provides different damping rates to flow in different directions.

26. A suspension system as set forth in claim 25, wherein the conduit is comprised of a pair of oppositely acting check valves.

27. A suspension system as set forth in claim 26, wherein the orifice size is adjustable.

28. A suspension system as set forth in claim 27, further including an electric solenoid for varying the effective size of the orifice in response to a sensed vehicle condition.

29. A suspension system as set forth in claim 22, further including a further accumulator chamber through which the flow between the damping element fluid chambers must pass having a volume in which a floating piston is contained and which floating piston is urged by a gas under pressure to pressurize the fluid.

30. A suspension system as set forth in claim 29, further including check valve means in the conduit between the respective chambers and the further accumulator chamber.

31. A suspension system as set forth in claim 30, wherein the check valves control the flow between the further accumulator chamber and the respective fluid chambers of the damping elements in both directions.

32. A suspension system as set forth in claim 31, wherein the check valves require a different force to open in each direction of flow.

33. A suspension system as set forth in claim 32, further including an orifice extending between the chambers in addition to the check valved passages.

34. A suspension system as set forth in claim 33, wherein the effective area of the orifice is adjustable.

35. A suspension system as set forth in claim 34, further including an electric solenoid for adjusting the effective area of the orifice.

36. A suspension system as set forth in claim 9, wherein the vehicle has at least four wheels comprised of two front wheels and two rear wheels each supported for a suspension movement by the vehicle body and each having a respective damping element therebetween and wherein the control means is provided in a conduit interconnecting two of the damping elements.

37. A suspension system as set forth in claim 36, wherein the control means controls the flow between the front damping elements.

38. A suspension system as set forth in claim 36, wherein the control means controls the flow between the rear damping elements.

39. A suspension system as set forth in claim 38, further including a second conduit extending between the front damping elements and second control means for controlling the flow through said second conduit.

40. A suspension system as set forth in claim 36, wherein conduits extend between the front and rear damping elements of the wheels of the vehicle.

41. A suspension system as set forth in claim 40, wherein the conduits extend between the front and rear damping elements at the same side of the vehicle.

42. A suspension system as set forth in claim 40, wherein the conduits interconnect the front damping element at one side of the vehicle to the rear damping element at the other side of the vehicle.

43. A suspension system as set forth in claim 40, wherein the conduit interconnects conduits connecting the front and rear damping elements at each side of the vehicle.

44. A suspension system as set forth in claim 40, wherein the conduit interconnects a pair of conduits each connecting one front damping element with one rear damping element at the opposite side of the vehicle.

45. A suspension system as set forth in claim 40, wherein there are a pair of conduits each extending between the damping elements at each side of the vehicle and at opposite sides of the vehicle and the control means controls the flow through all of the conduits.

46. The suspension system of claim 1, wherein at least a portion of the fluid displaced from the first and second fluid chambers is displaced to respective first and second accumulator chambers, each of said first and second accumulator chambers having a respective first and second accumulator piston slidably supported therein and dividing each of said accumulator chambers into a fluid portion in which the fluid is received and a high pressure gas portion, means for interconnecting said accumulator pistons to each other for simultaneous movement for maintaining the same fluid displacement for each accumulator chamber upon the displacement of fluid from the first and second fluid chambers of the first and second fluid damping means, and wherein the conduit interconnecting the first and second fluid chambers interconnects the first and second accumulator chambers.

47. The suspension system of claim 46, further including flow control valve means for controlling the flow through said conduit.

48. The suspension system of claim 47, wherein the flow control valve means and the conduit is positioned externally of the accumulator.

49. The suspension system of claim 47, wherein the conduit and the flow control means is formed internally in the accumulator.

50. The suspension system of claim 49, wherein the conduit and flow control means is carried by one of the accumulator pistons.

51. The suspension system of claim 50, wherein the one accumulator piston cooperates with a floating piston with one side of the floating piston being exposed to the high pressure gas and the other side of the floating piston being exposed to the fluid in the damping elements.

52. The suspension system of claim 47, wherein the flow control valve means comprises a pair of oppositely acting check valves.

53. The suspension system of claim 52, wherein the flow control valve means further includes an orifice passage bypassing the flow controlling check valves.

54. The suspension system of claim 53, wherein the orifice has a fixed effective area.

55. The suspension system of claim 53, wherein the orifice has an adjustable effective area.

56. The suspension system of claim 55, wherein the effective area of the orifice can be adjusted externally of the device in which the orifice is formed.

57. The suspension system of claim 56, wherein the orifice size is adjusted by a needle valve.

58. The suspension system of claim 56, wherein the orifice size is adjusted by a rotary valve.

59. The suspension system of claim 56, wherein the orifice size is adjusted electrically by an electric signal from a controller that senses vehicle conditions for adjusting the effective orifice size.

60. The suspension system of claim 47, wherein the accumulator chambers, conduit and flow control valve means is formed integrally with one of the damping elements.

61. The suspension system of claim 60, wherein the damping elements comprise tubular shock absorbers and the accumulator pistons are slidably supported in bores that extend parallel to the axis of the respective shock absorber.

62. The suspension system of claim 61, wherein the accumulator pistons are comprised of concentric pistons, one comprising a cylindrical piston and the other comprising an annular piston integrally connected to each other.

63. The suspension system of claim 62, wherein the shock absorber housing defines a pair of parallel bores each receiving a respective portion of the concentric pistons.

64. The suspension system of claim 63, wherein the flow control valve means comprises a pair of oppositely acting check valves.

65. The suspension system of claim 64, wherein the flow control means further includes an orifice passage bypassing the flow controlling check valves.

66. The suspension system of claim 65, wherein the flow controlling valve assembly is carried by one of the pistons.

67. The suspension system of claim 65, wherein the flow controlling valve assembly is affixed within one of the accumulator chambers.

68. The suspension system of claim 60, wherein the accumulator chambers are formed coaxially with the shock absorber.

69. The suspension system of claim 68, wherein the accumulator chamber is positioned in the chamber of the suspension element.

70. The suspension system of claim 69, wherein the accumulator chamber is coaxial with the suspension element chamber.

71. The suspension system of claim 70, wherein the accumulator pistons are comprised of concentric pistons, one comprising a cylindrical piston and the other comprising an annular piston integrally connected to each other.

72. The suspension system of claim 71, wherein the shock absorber housing defines a pair of parallel bores each receiving a respective portion of the composite piston.

73. The suspension system of claim 72, wherein the flow control valve means comprises a pair of oppositely acting check valves.

74. The suspension system of claim 73, wherein the flow control valve means further includes an orifice passage bypassing the flow controlling check valves.

75. An accumulator and control device for interconnection between a pair of hydraulic damping units for controlling their respective damping action comprising a housing defining first and second fluid chambers each adapted to exchange fluid with a respective one of said damping units, first and second accumulator pistons each received in a respective one of said fluid chambers and defining a fluid side for exchanging hydraulic fluid with the respective hydraulic damping unit and a gas pressure side receiving a pressurized gas for maintaining a pressure in said hydraulic fluid, and a conduit having a flow control therein for interconnecting said fluid chambers and for controlling the flow therebetween.

76. An accumulator and control device as set forth in claim 75, wherein the first and second accumulator pistons have the same effective cross-sectional area.

77. An accumulator and control device as set forth in claim 75, further including means for interconnecting the first and second accumulator pistons with each other for simultaneous movement for equal displacement of fluid between the pair of hydraulic damping units and the first and second fluid chambers.

78. An accumulator and control device as set forth in claim 77, wherein the first and second fluid chambers are disposed in side-by-side relationship to each other and the means for interconnecting the accumulator pistons comprises a cross bar extending between the pistons.

79. An accumulator and control device as set forth in claim 77, wherein the fluid chambers comprise a pair of side- by-side cylinder bores and the interconnecting cross bar extends through the gas pressure side.

80. An accumulator and control device as set forth in claim 77, wherein the first and second pistons move in opposite directions in response to the same fluid displacement.

81. An accumulator and control device as set forth in claim 80, wherein the fluid chambers comprise a pair of aligned oppositely facing cylinder bores each receiving a respective one of the accumulator pistons and a common chamber portion disposed between said accumulator pistons and containing a linkage system for equal but opposite movement of the pistons in the respectively cylinder bores, the pressurized gas side being formed by said common chamber portion.

82. An accumulator and control device as set forth in claim 77, wherein the pistons are concentric pistons one comprising a cylindrical piston and the other comprising an annular piston integrally connected with each other.

83. An accumulator and control device as set forth in claim 82, wherein the accumulator chamber is formed by an outer housing having a first smaller diameter cylindrical bore portion receiving the cylindrical piston and a second larger diameter portion receiving the outer diameter of the annular piston with the inner diameter of the annular piston being integrally connected to an outer end portion of the cylindrical piston so that both fluid chambers are formed in part by the respective cylinder bores.

84. An accumulator and control device as set forth in claim 83, wherein the smaller diameter bore of the housing is formed by an end piece that is detachably connected to the larger diameter bore portion.

85. An accumulator and control device as set forth in claim 75, wherein the conduit and the flow control is disposed externally of the accumulator.

86. An accumulator and control device as set forth in claim 75, wherein the conduit and the flow control is formed within the accumulator.

87. An accumulator and control device as set forth in claim 86, wherein the conduit extends in part from one side of the one of the pistons to a further fluid chamber formed on the other side of the one piston and wherein the connecting member extends through the one piston.

88. An accumulator and control device as set forth in claim 86, wherein the conduit and flow control is carried by one of the accumulator pistons.

89. An accumulator and control device as set forth in claim 88, wherein the one accumulator piston cooperates with a floating piston with one side of the floating piston being exposed to the high pressure gas and the other side of the floating piston being exposed to the fluid in the damping elements.

90. An accumulator and control device as set forth in claim 75, wherein the flow control means comprises a pair of oppositely acting check valves.

91. An accumulator and control device as set forth in claim 90, wherein the flow control further includes an orifice passage bypassing the flow controlling check valves.

92. An accumulator and control device as set forth in claim 91, wherein the orifice has a fixed effective area.

93. An accumulator and control device as set forth in claim 92, wherein the orifice has an adjustable effective area.

94. An accumulator and control device as set forth in claim 93, wherein the effective area of the orifice can be adjusted externally of the device in which the orifice is formed.

95. An accumulator and control device as set forth in claim 94, wherein the orifice size is adjusted by a needle valve.

96. An accumulator and control device as set forth in claim 94, wherein the orifice size is adjusted by a rotary valve.

97. An accumulator and control device as set forth in claim 94, wherein the orifice size is adjusted electrically by an electric signal from a controller that senses vehicle conditions for adjusting the effective orifice size.

98. An accumulator and control device as set forth in claim 75, wherein the accumulator chambers, conduit and flow control is formed integrally with one of the damping elements.

99. An accumulator and control device as set forth in claim 98, wherein the damping elements comprise tubular shock absorbers and the accumulator pistons are slidably supported in bores that extend parallel to the axis of the respective shock absorber.

100. An accumulator and control device as set forth in claim 99, wherein the accumulator pistons are comprised of concentric pistons, one comprising a cylindrical piston and the other comprising an annular piston integrally connected to each other.

101. An accumulator and control device as set forth in claim 100, wherein the shock absorber housing defines a pair of parallel bores each receiving a respective portion of the composite piston.

102. An accumulator and control device as set forth in claim 101, wherein the flow control comprises a pair of oppositely acting check valves.

103. An accumulator and control device as set forth in claim 102, wherein the flow control means further includes an orifice passage bypassing the flow controlling check valves.

104. An accumulator and control device as set forth in claim 103, wherein the valve assembly is carried by one of the pistons.

105. An accumulator and control device as set forth in claim 103, wherein the valve assembly is affixed within one of the accumulator chambers.

106. An accumulator and control device as set forth in claim 98, wherein the accumulator chambers are formed coaxially with the shock absorber.

107. An accumulator and control device as set forth in claim 106, wherein the accumulator chambers are positioned in the chamber of the suspension element.

108. An accumulator and control device as set forth in claim 107, wherein the accumulator chambers are positioned in the chamber of the suspension element.

109. An accumulator and control device as set forth in claim 108, wherein the accumulator pistons are comprised of concentric pistons, one comprising a cylindrical piston and the other comprising an annular piston integrally connected to each other.

110. An accumulator and control device as set forth in claim 109, wherein the shock absorber housing defines a pair of parallel bores each receiving a respective portion of the composite piston.

111. An accumulator and control device as set forth in claim 110, wherein the flow control comprises a pair of oppositely acting check valves.

112. An accumulator and control device as set forth in claim 111, wherein the flow control further includes an orifice passage bypassing the flow controlling check valves.

* * * * *